Dec. 22, 1964　　　W. A. ROBISON, JR　　　3,162,405
INFORMATION HANDLING SYSTEM
Filed April 14, 1958　　　　　　　　　　　　　　　　19 Sheets-Sheet 1

*Fig. 1.*

Figure 2:
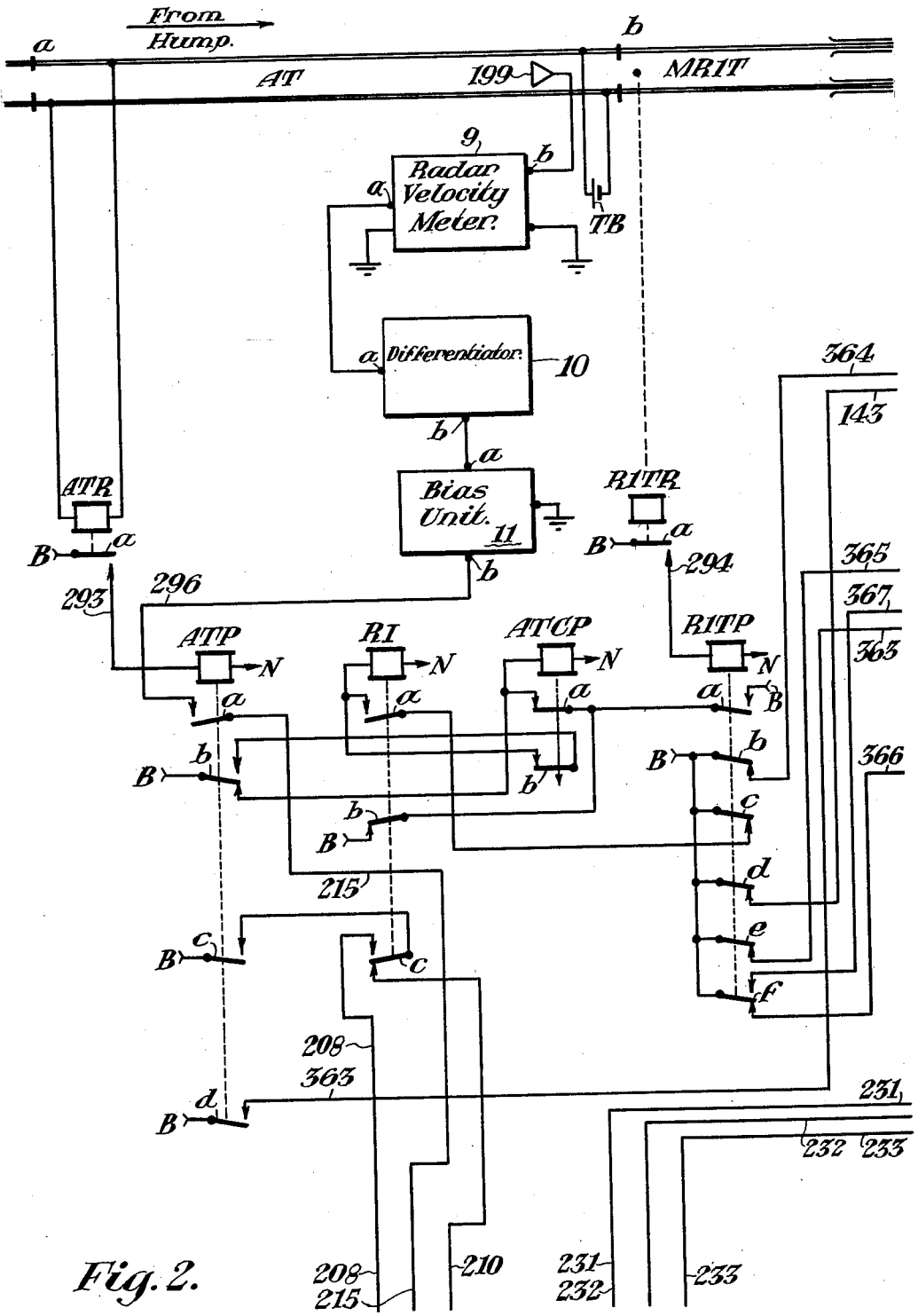
Figure 3:
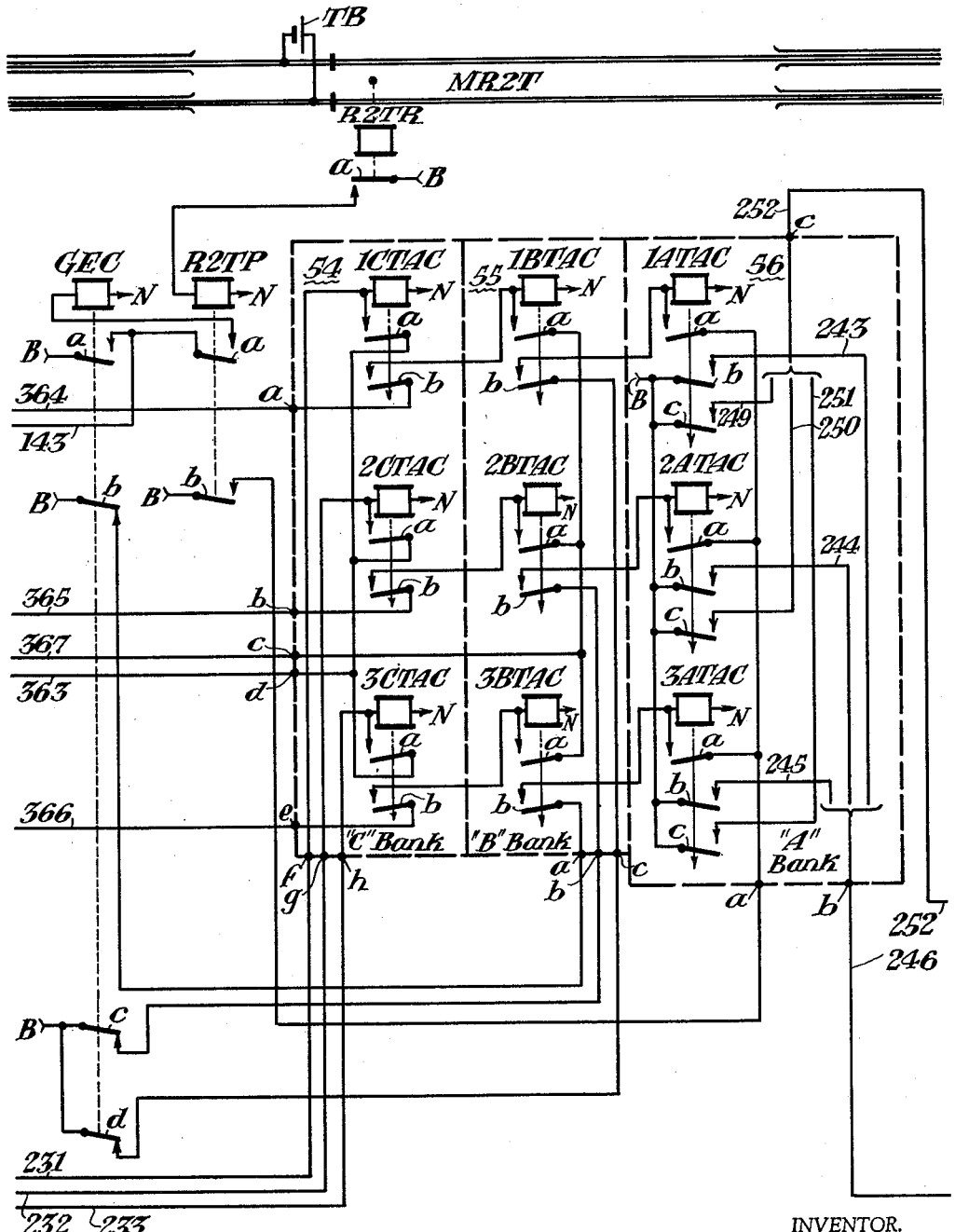
Figure 4:
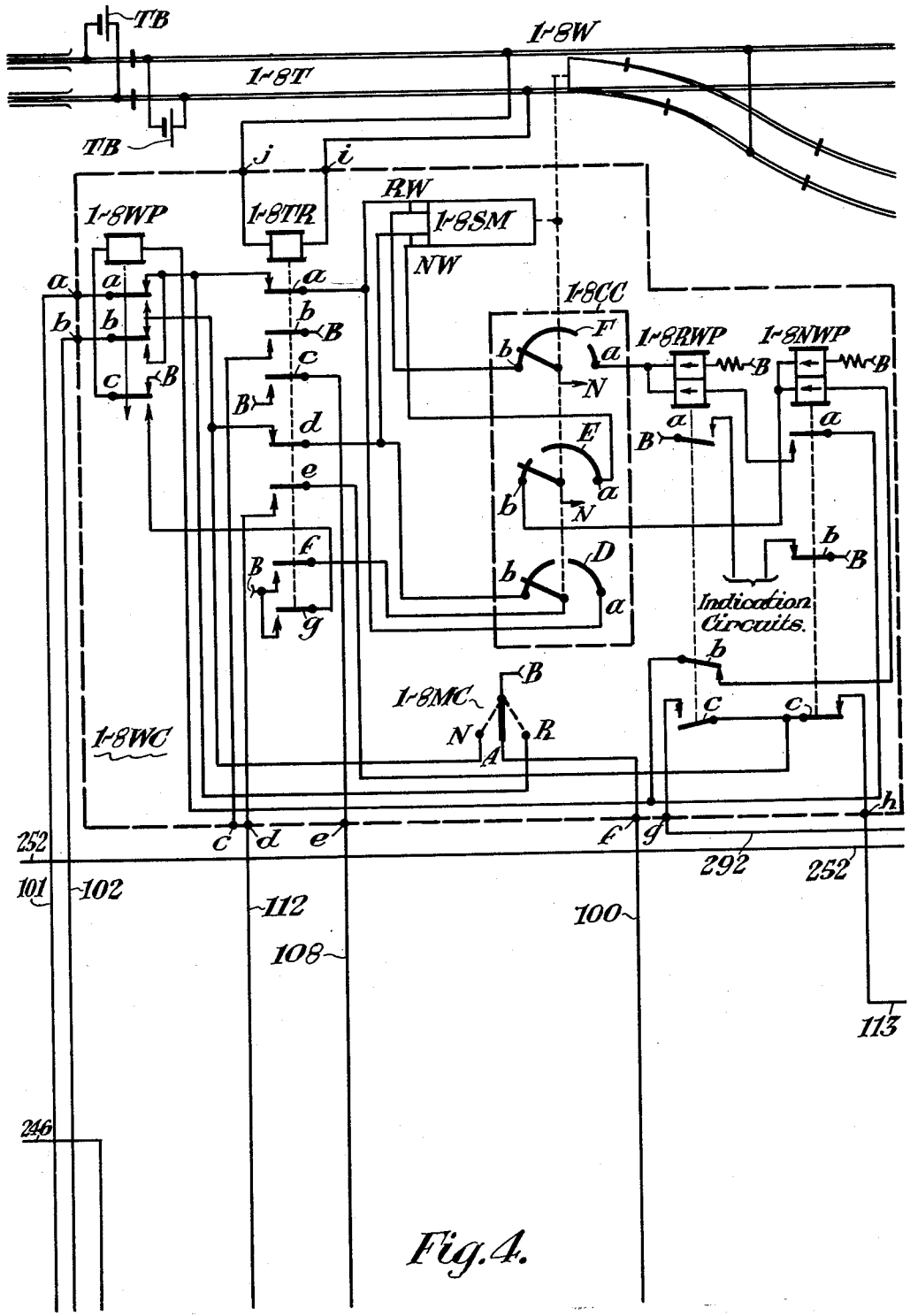
Figure 5:
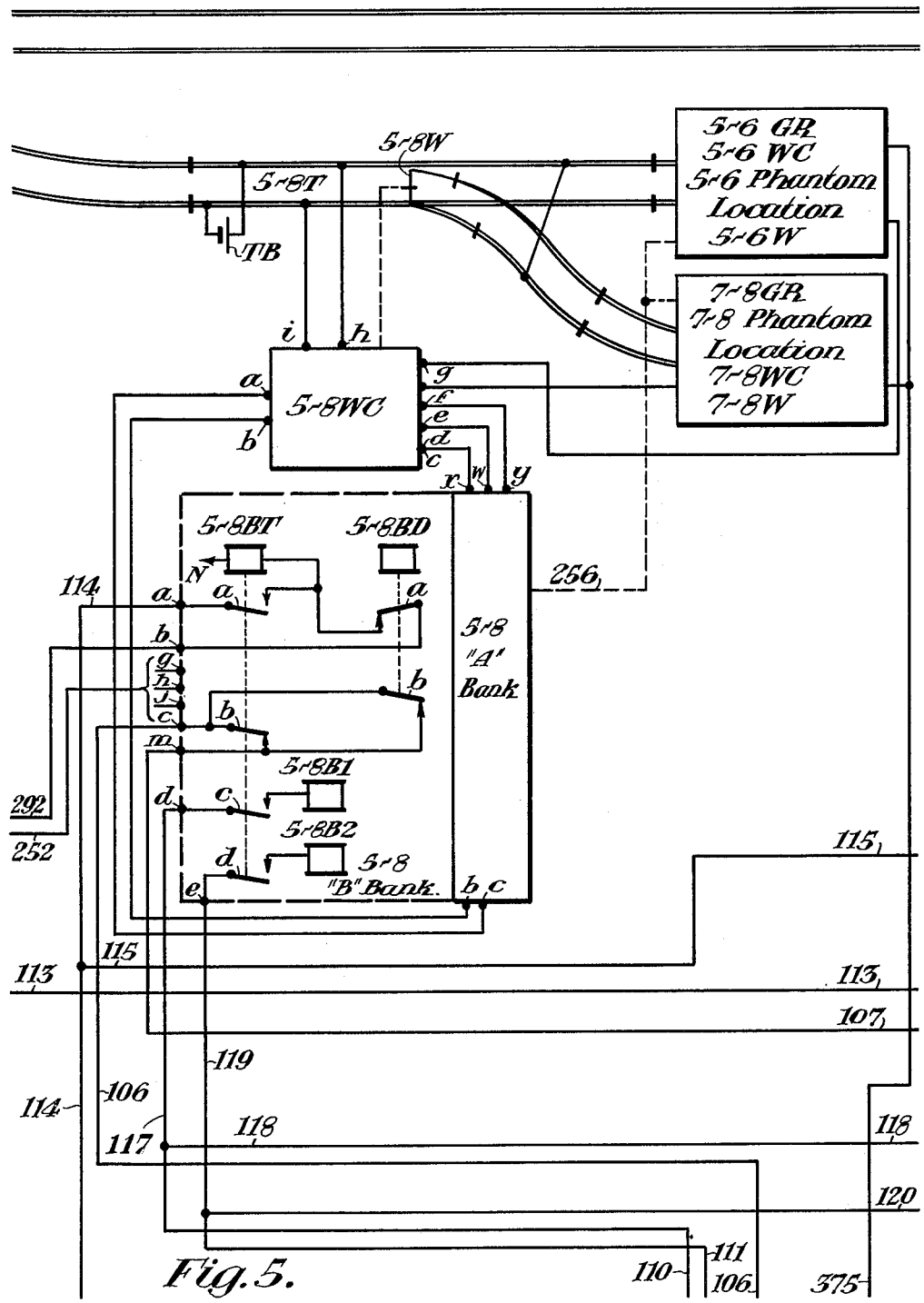
Figure 6:
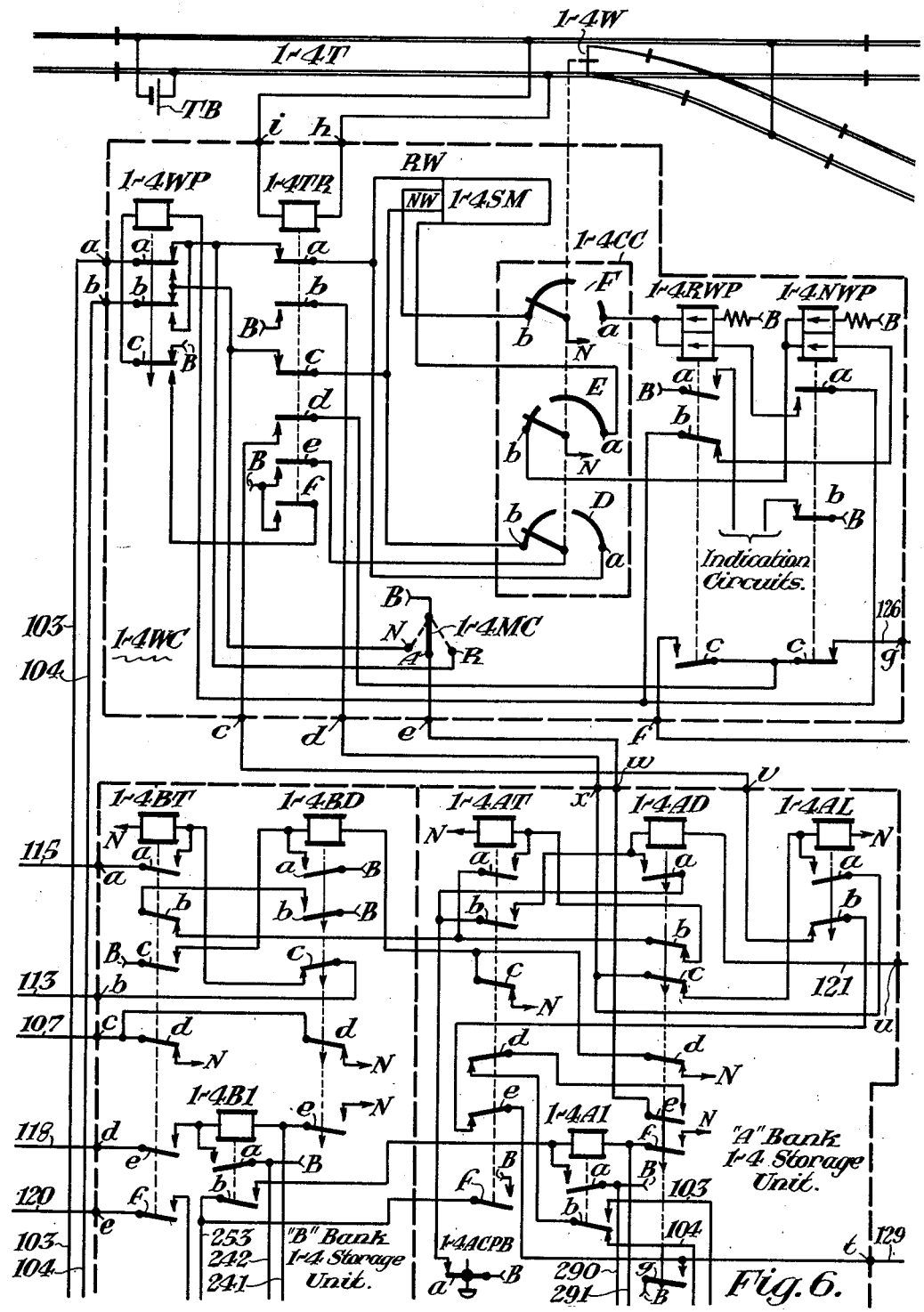
Figure 7:
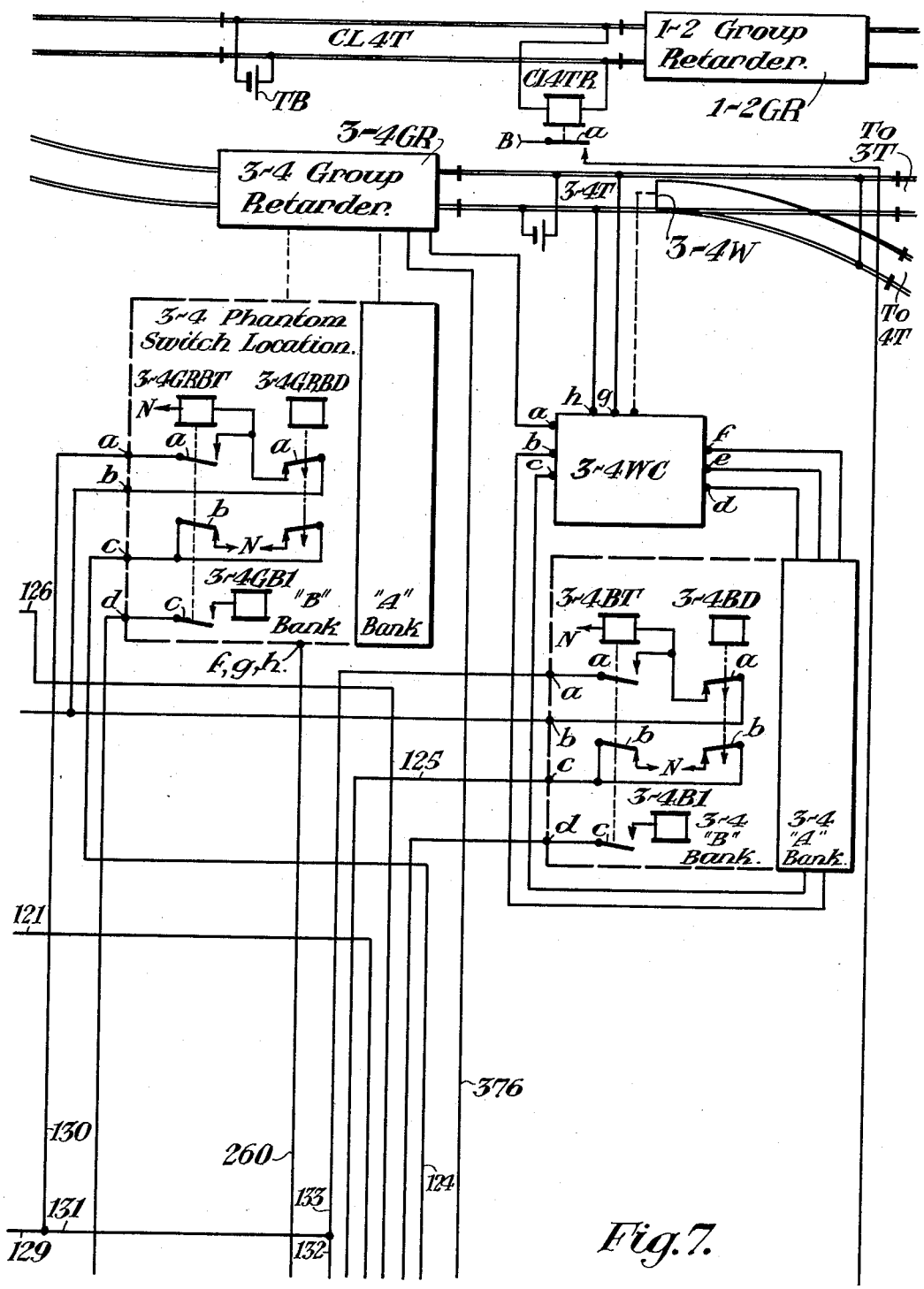
Figure 8:
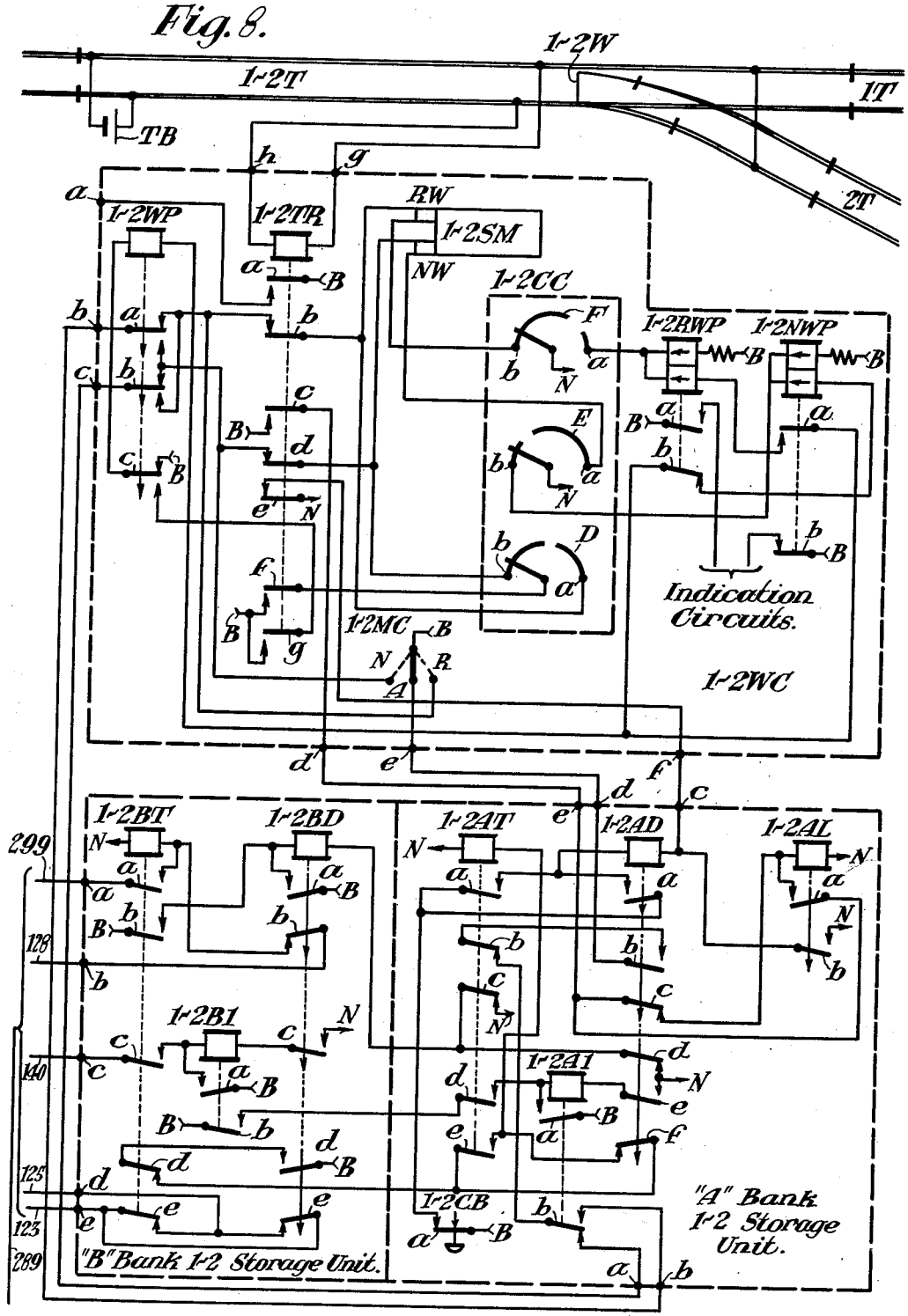
Figure 9:
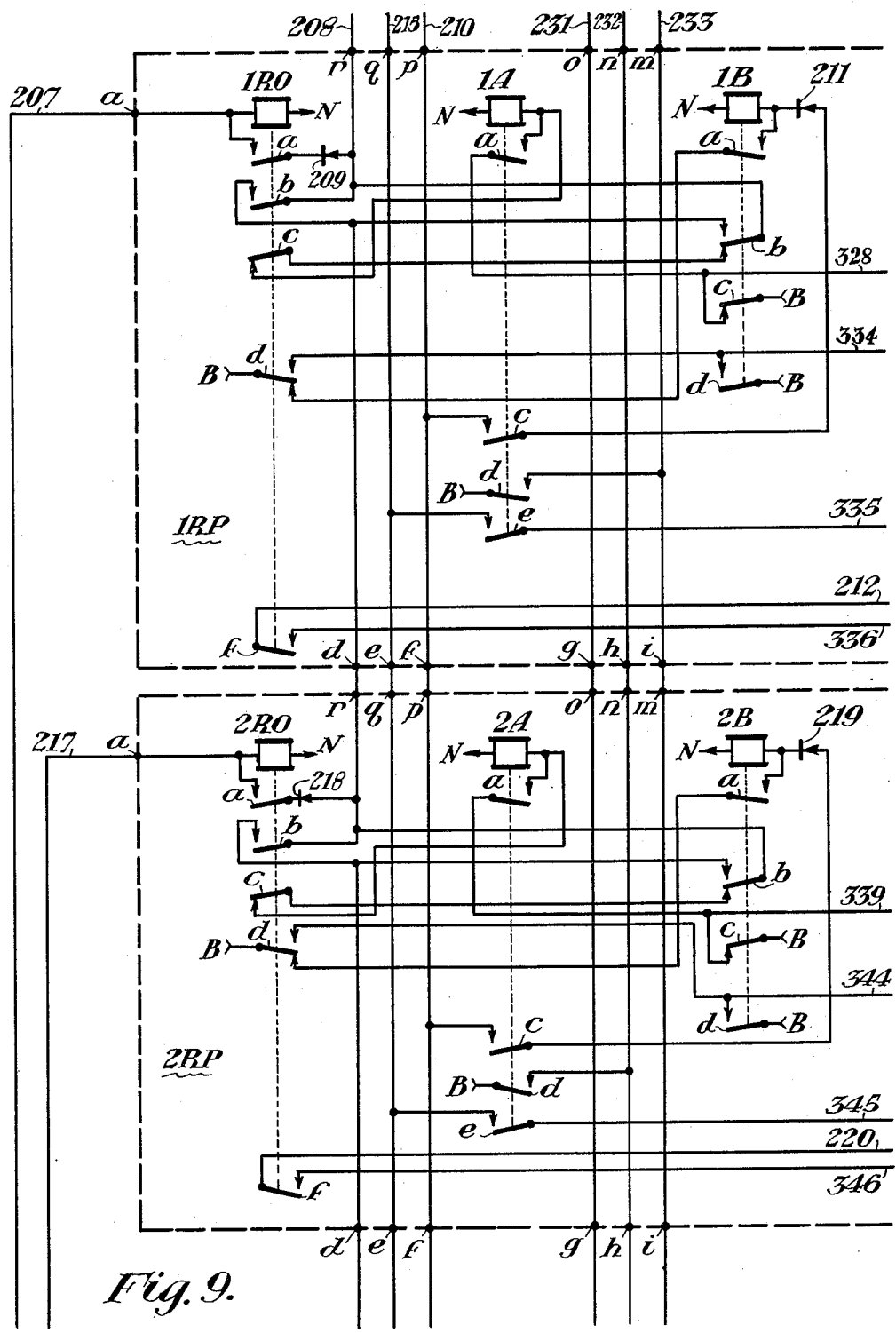
Figure 10:
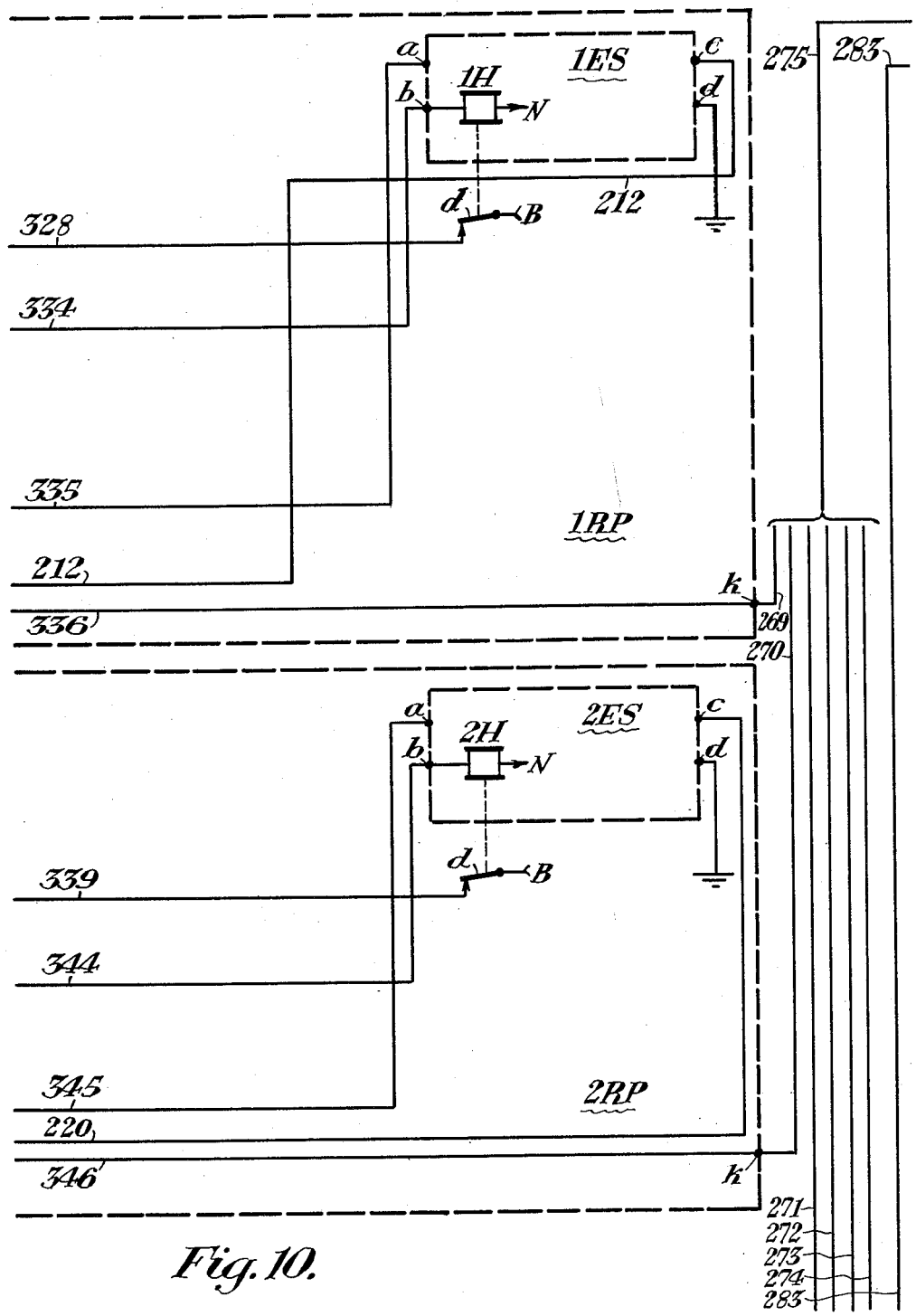
Figure 11:
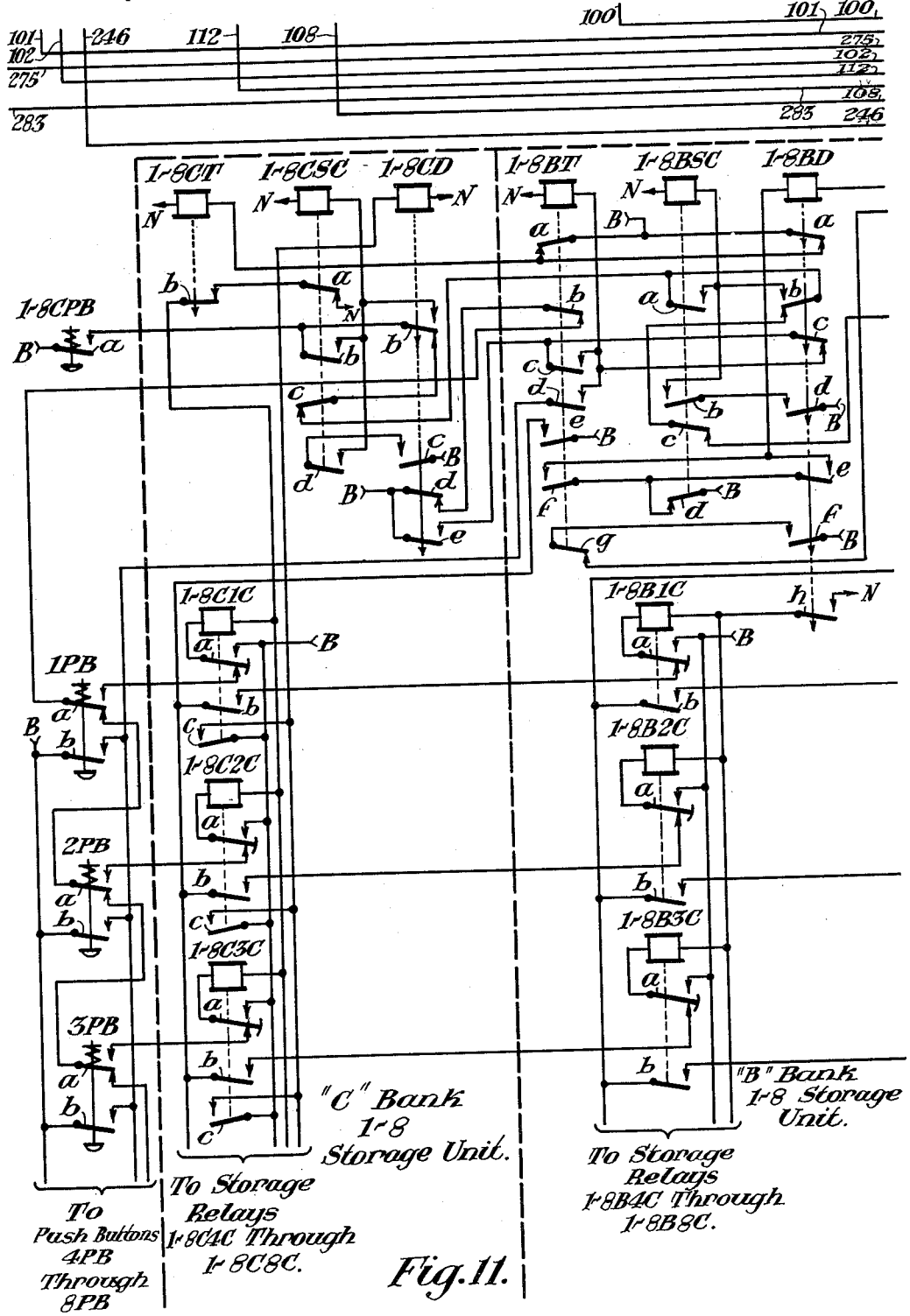
Figure 12:
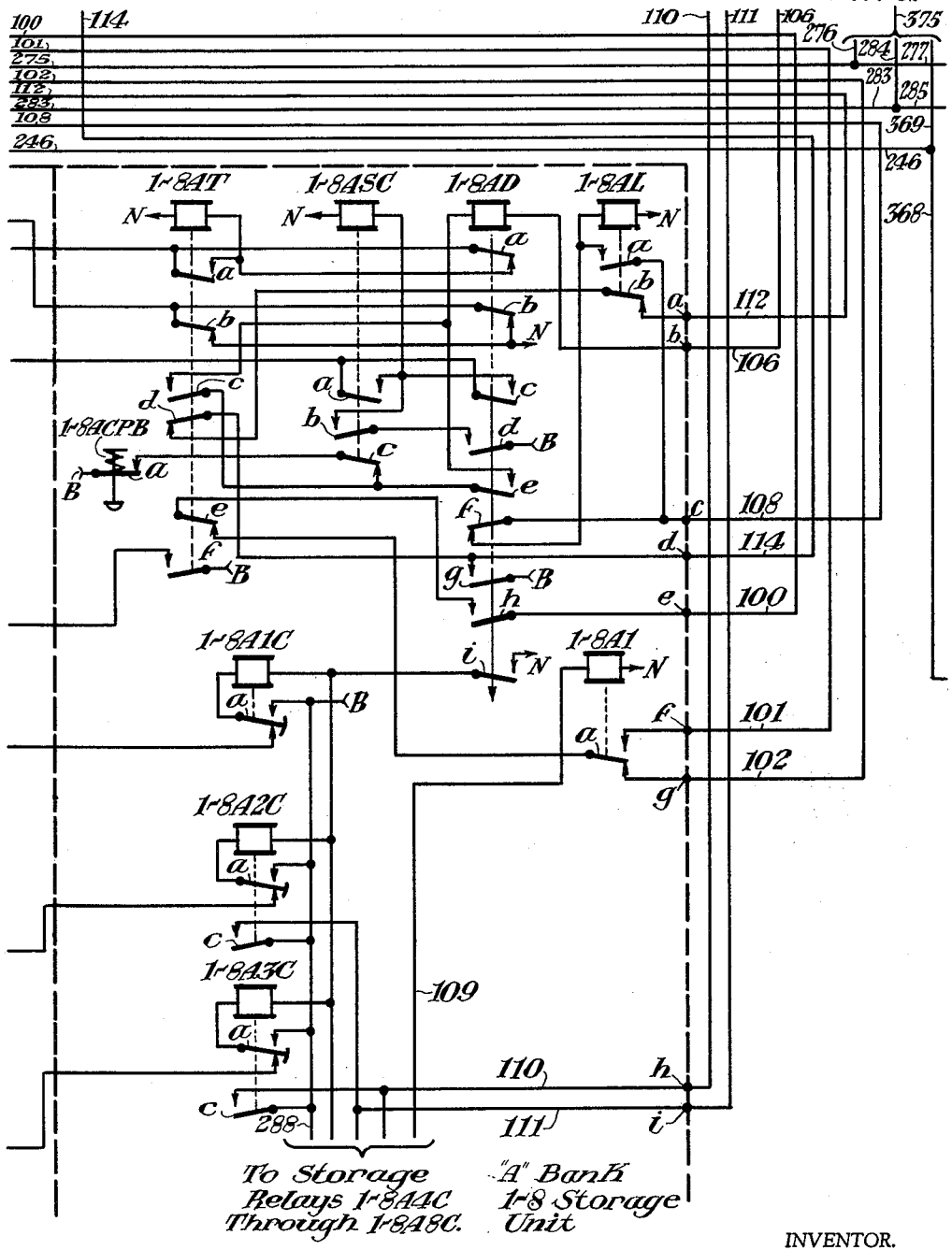
Figure 13:
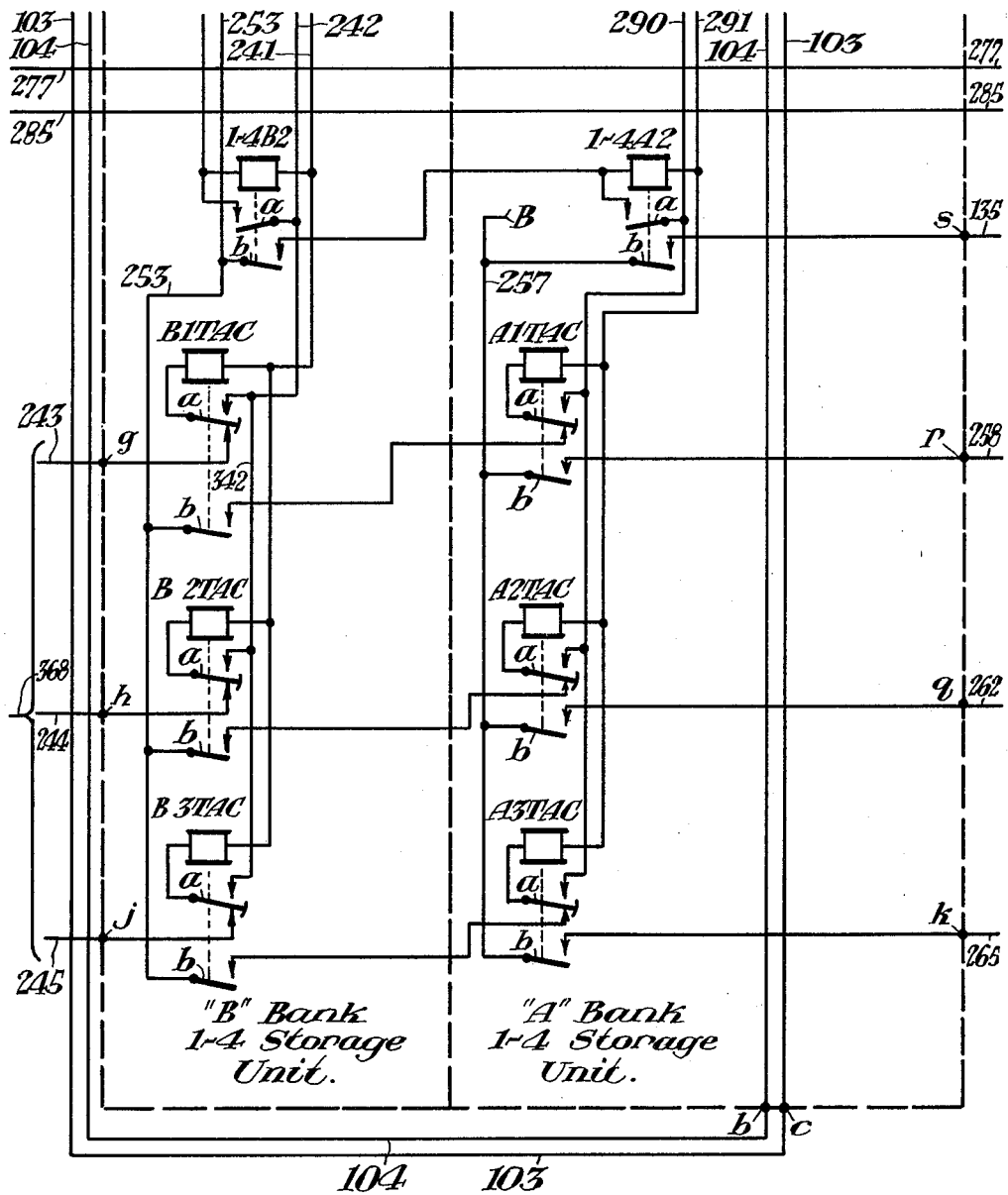
Figure 14:
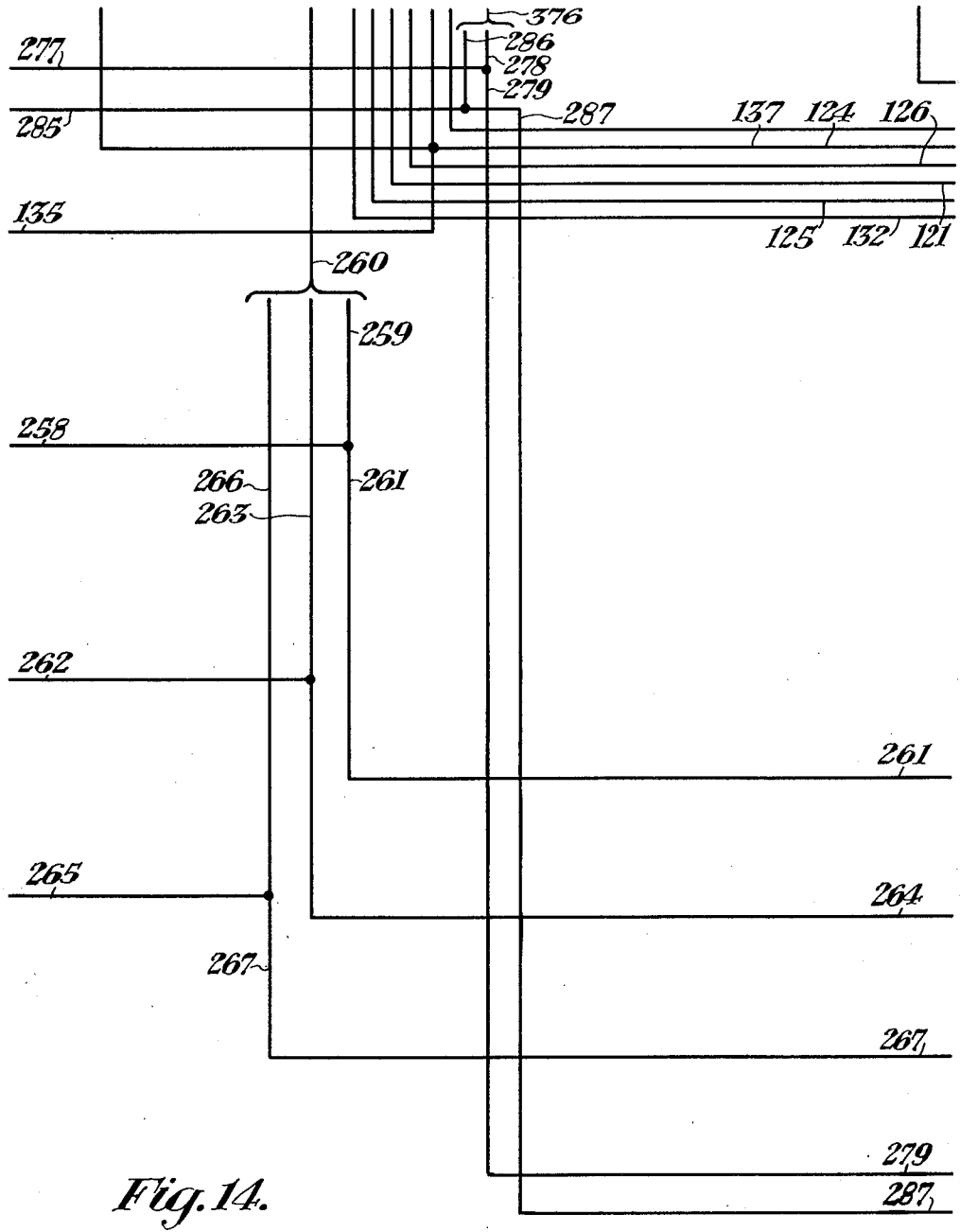
Figure 15:
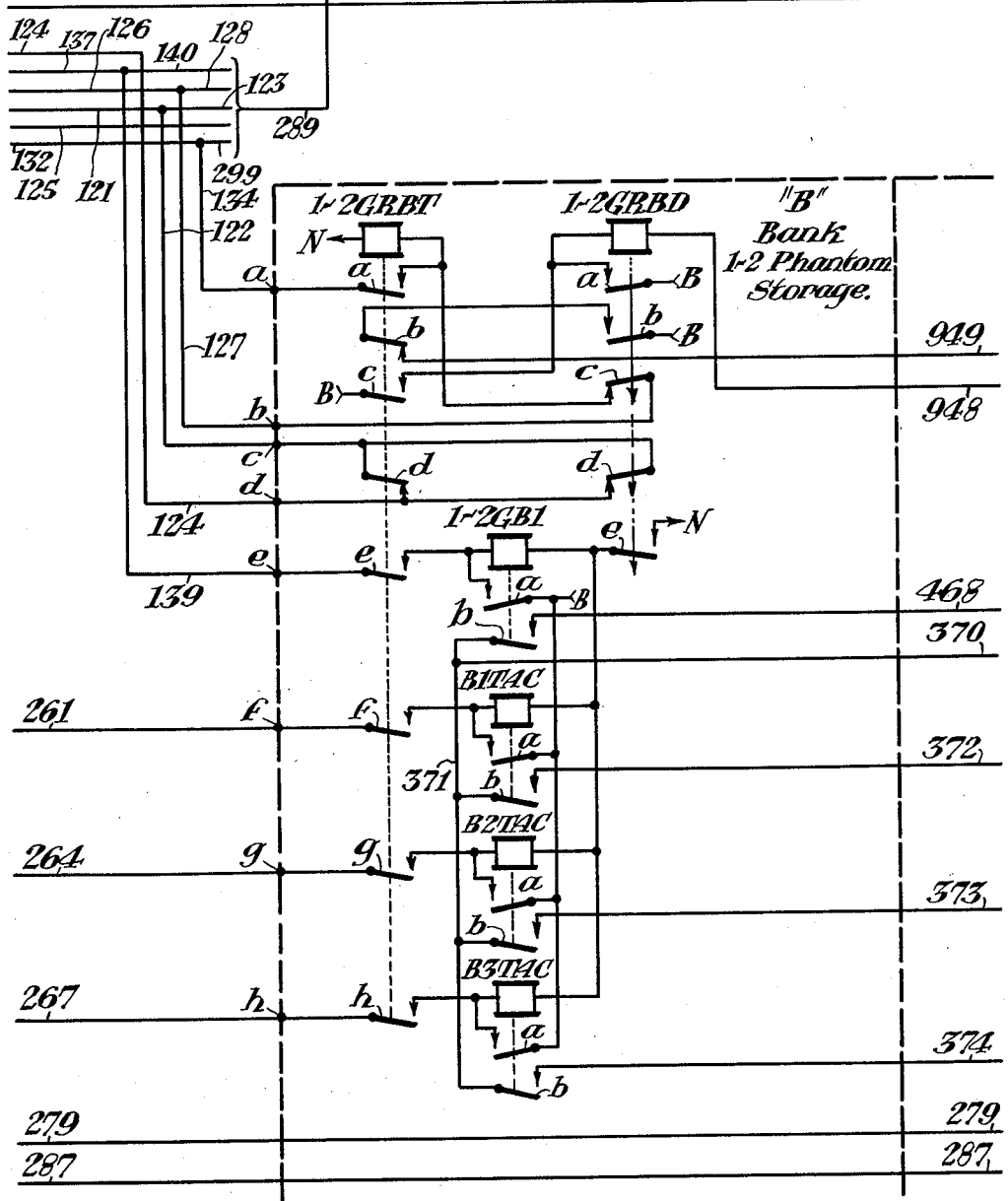
Figure 16:
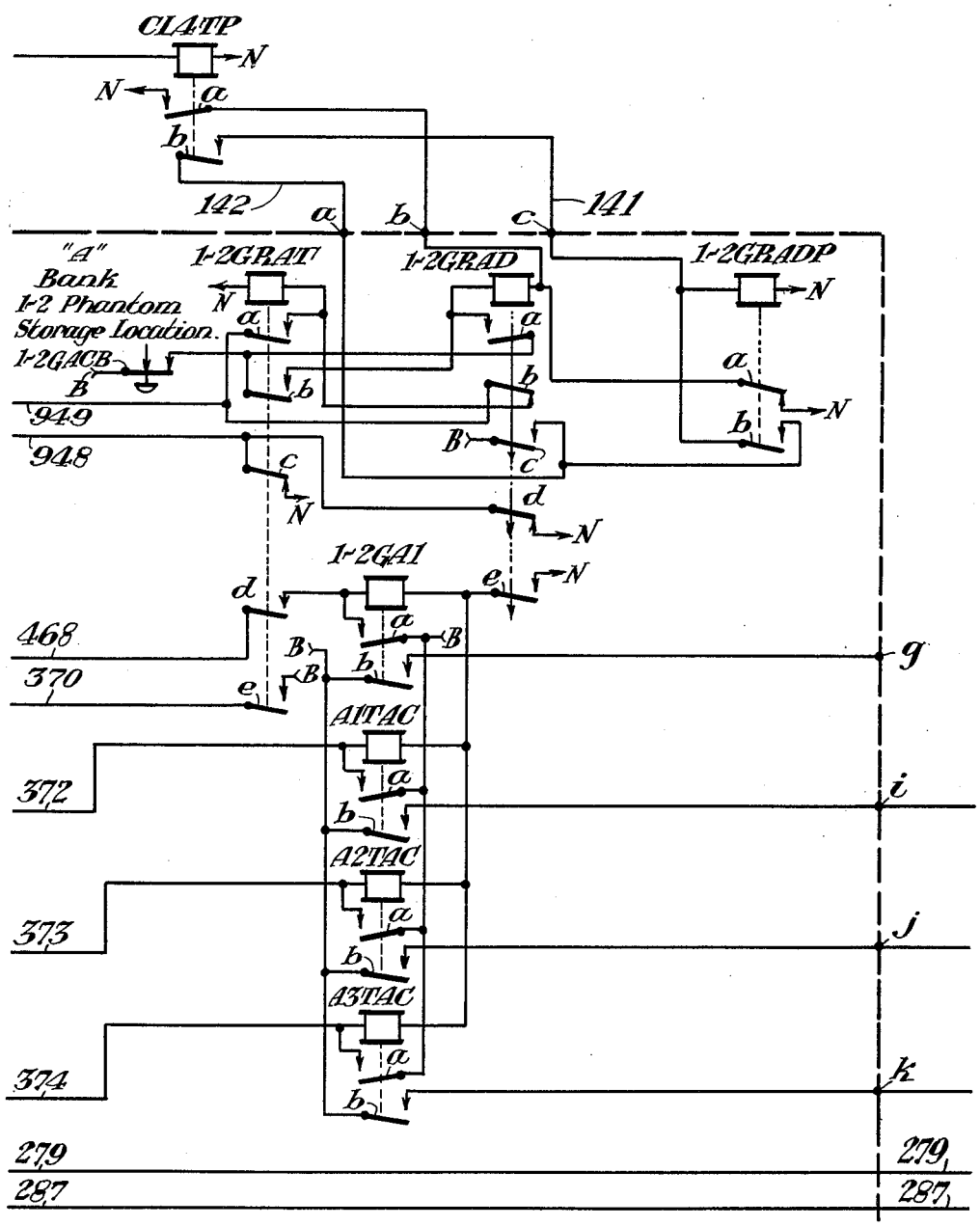
Figure 17:
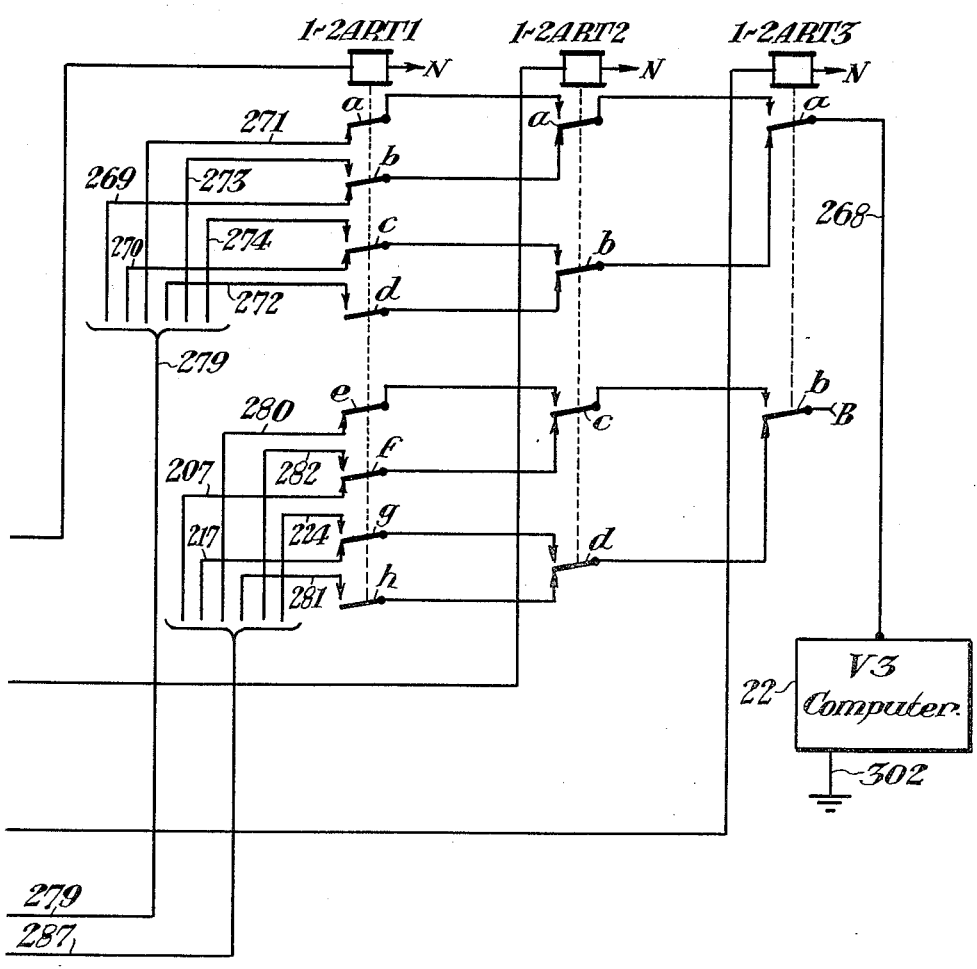
Figure 18:
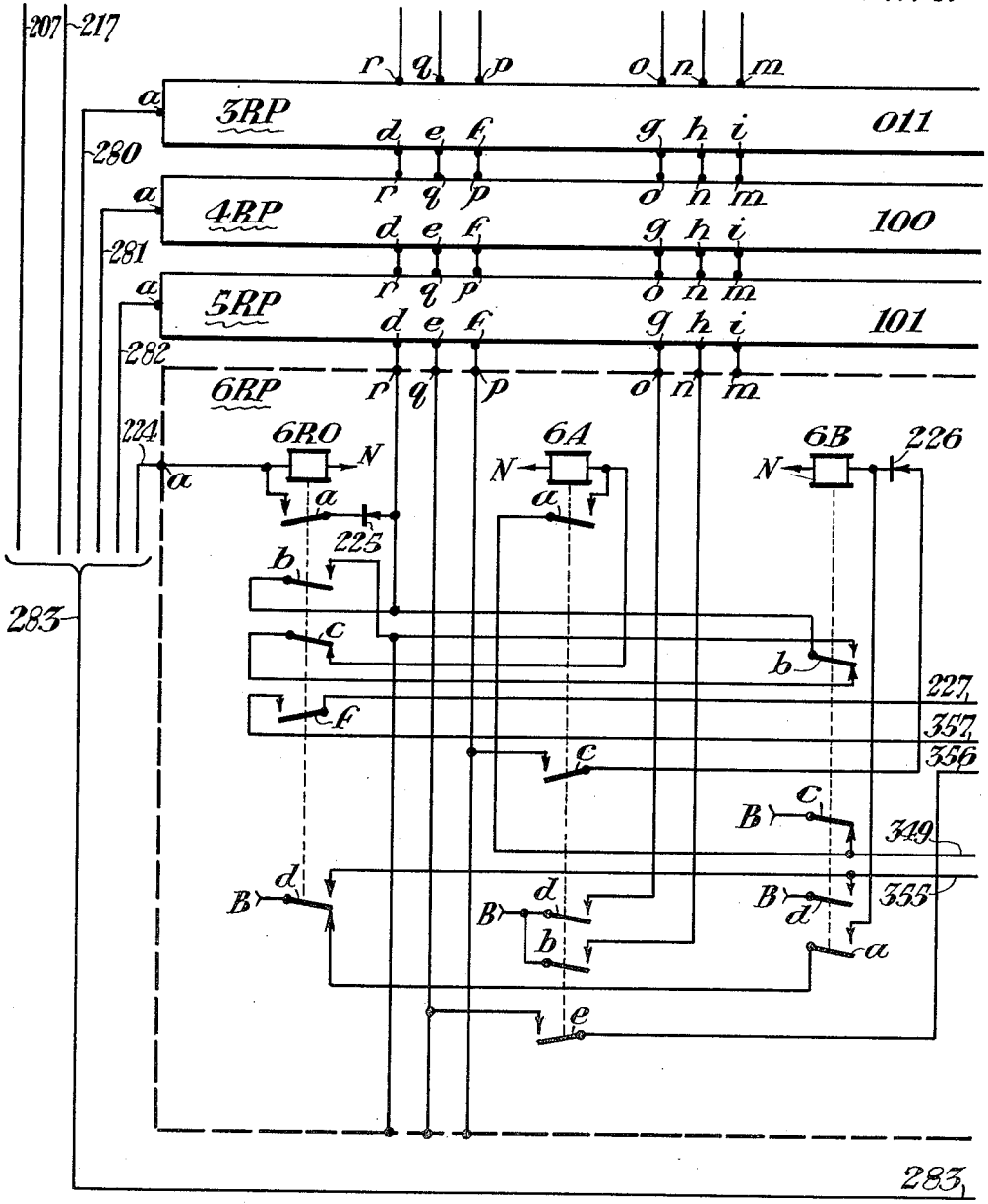
Figure 19:
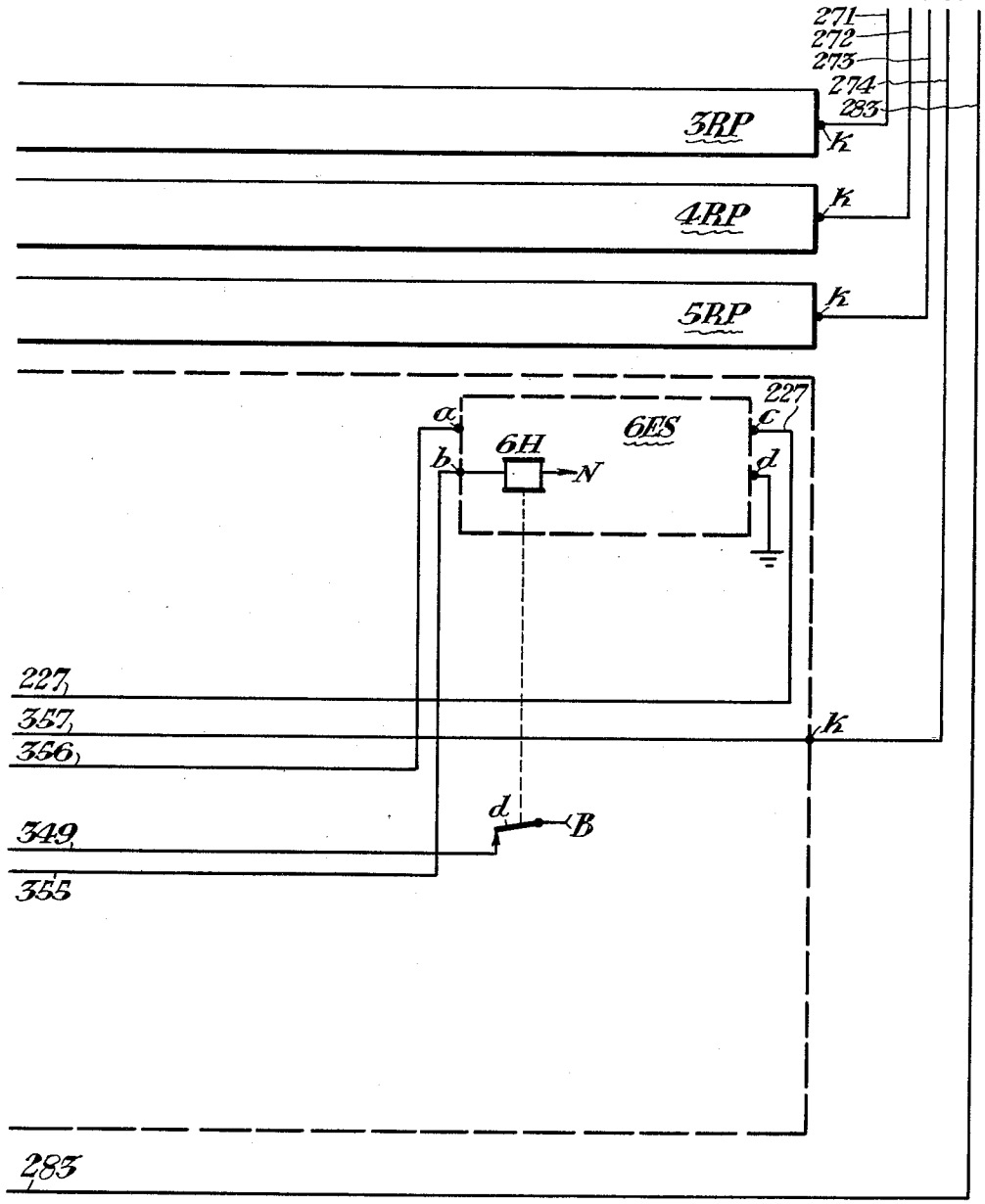

| Fig.2. | Fig.3. | Fig.4. | Fig.5. | Fig.6. | Fig.7. | Fig.8. |
| Fig.9. | Fig.10. | Fig.11. | Fig.12. | Fig.13. | Fig.14. | Fig.15. | Fig.16. | Fig.17. |
| Fig.18. | Fig.19. |

Dec. 22, 1964   W. A. ROBISON, JR   3,162,405
INFORMATION HANDLING SYSTEM
Filed April 14, 1958   19 Sheets-Sheet 3

INVENTOR.
William A. Robison Jr.
BY W. L. Stout
HIS ATTORNEY

Dec. 22, 1964   W. A. ROBISON, JR   3,162,405
INFORMATION HANDLING SYSTEM
Filed April 14, 1958   19 Sheets-Sheet 8

Dec. 22, 1964    W. A. ROBISON, JR    3,162,405
INFORMATION HANDLING SYSTEM
Filed April 14, 1958    19 Sheets-Sheet 18

INVENTOR.
William A. Robison Jr.
BY W. L. Stout
HIS ATTORNEY

United States Patent Office 3,162,405
Patented Dec. 22, 1964

3,162,405
INFORMATION HANDLING SYSTEM
William A. Robison, Jr., Pittsburgh, Pa., assignor to Westinghouse Air Brake Company, Wilmerding, Pa., a corporation of Pennsylvania
Filed Apr. 14, 1958, Ser. No. 728,230
18 Claims. (Cl. 246—2)

My invention relates to an information handling system, and in particular to apparatus for the storage and transfer of information for use in automatic control or indication.

In many control and indication problems, input data to be processed for the production of control or indication signals is not available at the time when it is required for use, or many items of information which are obtained at different times must be processed simultaneously, for example, in copending application Serial No. 676,730, filed August 7, 1957, by David P. Fitzsimmons and William A. Robison, Jr., for Automatic Control System for Railway Classification Yards, which is assigned to the assignee of my present application, a system is disclosed for automatically routing cuts of one or more cars to selected storage track destinations, while at the same time controlling the speed at which they couple with preceding cars on the storage tracks. In such a system, the group retarder offers the last opportunity for the correction of the speed of each cut of cars before it reaches the designated body track. Accordingly, the problem of selecting the leaving speed of a cut of cars from a group retarder so that it will couple with the preceding cars on the designated body track at a safe speed is essentially one of predicting the performance of the cut from the point at which it leaves the group retarder to the point of coupling. This distance traversed by each cut consists of a curved portion including one or more switches, and a tangent portion which is longer or shorter in accordance with the fullness of the body track to which the cut is directed. Since the control of the speed of the cut in the group retarder must be accomplished before the cut leaves the group retarder, there are provided suitable curved and tangent measuring sections ahead of these retarders for measuring the rolling resistances on curved and tangent track, and a computer for correlating the rolling resistances on the measuring sections with those on the tangent sections. It then becomes necessary to supply the various measured quantities to the computer at the proper time. Accordingly, it is desirable to provide means for storing the measurements as they are made and transferring them to the computer. It is an object of my present invention to provide novel storage and transfer apparatus for storing and transferring information in any desired sequence.

It is a more particular object of my invention to provide means for storing measurements of rolling resistance and transferring them to a leaving speed computer of the class disclosed in the above mentioned copending application.

Other objects and characteristic features of my invention will become apparent as the description proceeds.

In accomplishing the foregoing object of my invention, I employ apparatus comprising a plurality of storage units for storing electronic voltages, means for detecting the occupied or unoccupied condition of the storage units, means for selecting an unoccupied storage unit and applying a measured value of rolling resistance for storage in that unit, means for developing a code identifying the selected storage unit, means for transmitting the code along the route of a cut of cars the rolling resistance of which has been stored, and means for interpreting the code and interrogating the proper storage unit to select the stored value of rolling resistance pertaining to the cut when it is desired to make use of the rolling resistance measurement in calculating the desired leaving speed of the cut from the group retarder in the selected route of the cut.

I shall describe one form of apparatus embodying my invention and shall then point out the novel features thereof in claims.

I have illustrated an embodiment of my invention which is adapted to be employed in a classification yard of the type disclosed in above copending application. Only those components of the system disclosed in said copending application which are necessary to make my disclosure complete and to an understanding of my invention have been illustrated, and in several instances these components have been illustrated in block diagram form. However, the correspondence between schematically illustrated components and those shown in detail in the above mentioned copending application will be readily apparent to those skilled in the art as the description proceeds.

In order to simplify the illustration of the circuits employed in my invention, I have not shown the necessary power supplies in detail. One of these power supplies is a conventional source of D.C. voltage having positive and negative terminals, connections to which are schematically indicated on the drawings by the reference characters B and N, respectively, associated with arrow symbols indicating connections to the battery terminals. The additional power supplies required are shown schematically by a control lead carried from component to component and a ground lead which is returned to a common ground as conventionally indicated. The circuits so shown will be readily identified with those shown in detail in the copending application.

In the drawings,

FIG. 1 comprises a chart showing the manner in which FIGS. 2 through 19 should be arranged in order to disclose in detail one embodiment of my invention.

FIGS. 2 through 19, when arranged in the manner shown in FIG. 1, comprise a schematic wiring diagram of one embodiment of my invention.

Referring now to the drawings, I have illustrated several routes in a classification yard. These routes are approached from a common route comprising an entrance end including a hump and an approach track section AT, as shown in FIG. 2. Following approach track section AT is a master retarder comprising two track sections MR1T and MR2T. Following the master retarder is a switch designated 1–8W which is provided with a detector track section 1–8T. Following switch 1–8W are two track switches designated 1–4W and 5–8W and provided with detector track sections 1–4T and 5–8T, respectively. Following switch 1–4 are shown two group car retarders designated 1–2GR and 3–4GR. Retarder 1–2GR is followed by a track switch 1–2W provided with a detector track section designated 1–2T. Retarder 3–4GR is followed by a track switch 3–4W provided with a detector track section designated 3–4T. Track switches 1–8W, 1–4W, 5–8W, 1–2W and 3–4W control the routes to storage tracks 1 through 8, 1 through 4, 5 through 8, 1 and 2, and 3 and 4, respectively.

As pointed out in the above-mentioned copending application, a number of track sections will normally be provided between each group retarder and the preceding switch. However, for the sake of simplicity I have shown only a single approach track section in the approach to a group retarder. This track section is shown in the approach to group retarder 1–2GR and is designated CL4T.

Each of the track sections just described is, in practice, provided with track circuits in the manner fully disclosed in the said copending application Serial No. 676,730. Since the majority of these track circuits are not involved in the operation of this embodiment of my invention, only the track relays in the track circuits associated with track sections AT, MR1T, MR2T, 1–8T, 1–4T, CL4T and 1–2T are shown. These track relays are designated ATR, R1TR, R2TR, 1–8TR, 1–4TR, CL4TR and 1–2TR, respectively, and are controlled by conventional D.C. track circuits, including the rails of their respective track sections, in a manner well known in the art, such that the relays are picked up when their respective track sections are unoccupied and released when their respective sections are occupied. The circuits controlled by these track relays will be discussed in detail below.

Referring to FIG. 2, there is shown in block diagram form a radar velocity meter 9 whose output terminal $a$ is connected to the input terminal $a$ of a differentiator 10. The input terminal $b$ of velocity meter 9 is connected to an antenna 199 located at the exit end of approach track section AT. Velocity meter 9 supplies a velocity signal to differentiator 10 which in turn supplies, from its output terminal $b$, an acceleration signal to input terminal $a$ of a bias unit 11. This unit serves to bias by 100 volts the measured value of acceleration supplied to its input terminal $a$. This bias is required since the electronic storage units employed in the illustrated embodiment of my invention are adapted to store only positive voltages. The operation of the radar velocity meter and its antenna, the differentiator and bias unit form no part of my invention and reference is made to above-mentioned copending application Serial No. 676,730 for a full understanding of the operation of said apparatus. It is sufficient for the purposes of this description to point out that the voltage output from terminal $b$ of bias until 11 is representative of the tangent track rolling resistance measurements to be stored and transferred by the apparatus of my invention. These measurements are proportional to the acceleration of cars moving in the path of antenna 199 of velocity meter 9.

The output signal from terminal $b$ of bias unit 11 is supplied over a front contact $a$ of a relay ATP to the first empty electronic storage unit of a series of such units located in a series of storage panels as hereinafter described. Said relay ATP is a back contact repeater relay of track relay ATR and is picked up when track section AT is occupied and released when track section AT is unoccupied. The number of storage units necessary depends on the number of cuts of cars which can be in the yard between track section AT and the group retarder, but for the purposes of this description I have shown six such units as described below.

In addition to relays ATR and ATP there is also shown in FIGS. 2 and 3 of the drawings track repeater relays R1TP and R2TP, and control relays RI, ATCP and GEC. Relay ATP is energized by a circuit extending from terminal B of the battery over back contact $a$ of relay ATR, and through the winding of relay ATP to terminal N of the battery. Relays R1TP and R2TP are back contact repeaters of track relays R1TR and R2TR, respectively, and are energized by circuits extending from terminal B of the battery over back contacts $a$ of their associated track relays and through the windings of the repeater relays to terminal N of the battery. These track repeater relays are accordingly picked up when their respective track sections are occupied and are released when said sections are unoccupied. Relay RI has a pickup circuit which extends from terminal B of the battery over the front point of contact $b$ of relay ATP, front contact $b$ of relay ATCP and through the winding of relay RI to terminal N of the battery. Relay RI has a stick circuit which extends from terminal B of the battery over back contact $c$ of relay R1TP, its own front contact $a$, and through the winding of the relay to battery terminal N. Relay ATCP has a pickup circuit which extends from terminal B of the battery over the back point of contact $b$ of relay ATP and through the winding of the relay to terminal N of the battery. Relay ATCP has a first stick circuit which extends from terminal B of the battery over back contact $b$ of relay RI, its own front contact $a$, and through the winding of the relay to terminal N of the battery. Relay ATCP has a second stick circuit which extends from terminal B of the battery over front contact $a$ of relay R1TP, its own front contact $a$, and through the winding of the relay to terminal N of the battery. It is, therefore, apparent that relay RI is normally released and relay ATCP normally picked up. The purpose and operation of these relays will become apparent as this description proceeds.

End of cut relay GEC is picked up when track section MR1T is vacated by a cut of cars and remains up as long as track section MR2T is occupied by the cut. The pickup circuit for relay GEC extends from terminal B of the battery over back contact $d$ of relay R1TP, lead 143, front contact $a$ of relay R2TP and through the winding of the relay to battery terminal N. Relay GEC also has a stick circuit which extends from terminal B of the battery over front contact $a$ of relay GEC, front contact $a$ of relay R2TP and through the winding of the relay to terminal N of the battery. It is thus apparent that relay GEC picks up when section MR2T is occupied and section MR1T is unoccupied, and is held up as long as section MR2T is occupied.

The previously mentioned electronic storage units employed in my invention are units 1ES through 6ES which are located in rolling resistance storage panels 1RP through 6RP as shown in FIGS. 9, 10, 18 and 19. Since these storage panels, which include both the electronic storage panels, storage units and the storage selection, code generating, storage interrogating and storage cancellation circuits, are substantially identical, only the first, second, and last of the six panels are shown in detail. The details of panels 3RP through 5RP may be identical with panel 2RP except for an obvious progressive change in the generated code identifying the panel, as will be described. In these panels, the storage unit such as 1ES, 2ES and 6ES are shown in block form and the storage units in the remaining panels are not shown since they would be identical. For complete details of this storage unit, reference may be had to the copending application of James A. Cook, Jr., Serial No. 634,000, for Electronic Storage Circuit, filed January 14, 1957, which is assigned to the assignee of my present application and has matured into Patent No. 2,914,750, issued November 24, 1959. For present purposes, however, it is sufficient to note that terminals $a$, $b$, $c$ and $d$ on each of the storage units 1ES through 6ES are respectively identical. The voltage to be stored is applied between terminal $a$ and grounded terminal $d$. When it is desired to complete the storage, one of the relays 1H through 6H included in storage units 1ES through 6ES, respectively, is energized from terminal B of the battery over external circuitry to be described and through the winding of the selected relay 1H through 6H to terminal N of the battery. The stored voltage may be read out of the unit between output terminal $c$ and grounded terminal $d$.

Rolling resistance storage panel 1RP comprises an electronic storage unit 1ES, including relay 1H; and three additional relays 1RO, 1A, and 1B.

Relay 1RO (FIG. 9) has a pickup circuit which extends from terminal B of the battery and through a transfer tree, to be described, associated with each group retarder, over one of a set of parallel leads, to be described, to lead 207 (FIG. 9) and thence to terminal $a$ of panel 1RP, and from terminal $a$ through the winding of relay 1RO to terminal N of the battery. Relay 1RO is picked up when it is desired to read out a value of voltage stored in unit 1ES and to cancel the storage to make the panel available for a subsequent storage. When picked up, relay 1RO completes a stick circuit extending from terminal B of the battery over front contact $c$ of relay ATP in FIG. 2, previously described, the front point of contact c of relay RI, lead 208, terminal r of panel 1RP (FIG. 9), through a rectifier 209, which serves to prevent sneak circuits, and over front contact a of relay 1RO and through the winding of the relay to terminal N of the battery.

Relay 1A (FIG. 9), has a pickup circuit extending from terminal B of the battery over front contact c of relay ATP in FIG. 2, front contact c of relay RI, lead 208, terminal r of panel 1RP (FIG. 9), back contact b of relay 1B, to be described, back contact c of relay 1RO, and through the winding of relay 1A to terminal N of the battery. Relay 1A has a first stick circuit extending from terminal B of the battery over an additional back contact d of relay 1H in storage unit 1ES (FIG. 10), lead 328, its own front contact a, and through the winding of the relay to terminal N of the battery. Relay 1A has a second stick circuit extending from terminal B of the battery over back contact c of relay 1B, its own front contact a, and through the winding of the relay to terminal N of the battery.

Relay 1B (FIG. 9) has a pickup circuit extending from terminal B of the battery over front contact c of relay ATP in FIG. 2 the back point of contact c of relay RI, lead 210, terminal p of panel 1RP, front contact c of relay 1A, and through rectifier 211 which serves to prevent sneak circuits, and the winding of relay 1B to terminal N of the battery.

Relay 1B has a stick circuit which extends from terminal B of the battery over the back point of contact d of relay 1RO, its own front contact a, and through the winding of the relay to terminal N of the battery.

Relay 1H has a first pickup circuit extending from terminal B of the battery over front contact d of relay 1B and lead 334 to terminal b of storage unit 1ES and through the winding of relay 1H to terminal N of the battery. Relay 1H has a second pickup circuit extending from terminal B of the battery over the front point of contact d of relay 1RO and lead 334 to terminal b of storage unit 1ES, and thence through the winding of relay 1H to terminal N of the battery.

Electronic storage unit 1ES has an input circuit extending from terminal b of bias unit 11, in FIG. 2, previously described, over front contact a of relay ATP (FIG. 2) lead 215, terminal q of panel 1RP (FIG. 9), and over front contact e of relay 1A and lead 335 to terminal a of electronic storage unit 1ES and through the unit to ground at grounded terminal d. Electronic storage unit 1ES has an output circuit extending between grounded terminal d and terminal c and from terminal c over lead 212 to front contact f of relay 1RO and thence over lead 336 to output terminal k of panel 1RP. The circuit from terminal k is completed to ground through a selecting network, to be described, and a utilization network selected from a group of such networks located at each of the group retarders, in a manner to be described.

Panel 2RP (FIGS. 9 and 10) comprises an electronic storage unit 2ES, including a relay 2H; and three additional relays 2RO, 2A, and 2B.

Relay 2RO (FIG. 9) has an energizing circuit similar to that described for relay 1RO which extends from terminal B of the battery through a transfer circuit, to be described, which is completed when it is desired to read out the storage in panel 2RP, and which circuit terminates in lead 217 (FIG. 9) which is connected to terminal a of panel 2RP and thence through the winding of relay 2RO to terminal N of the battery. Relay 2RO has two stick circuits. The first extends from terminal B of the battery over front contact c of relay ATP in FIG. 2, the front point of contact c of relay RI, lead 208, terminal r of panel 1RP, the front point of contact b of relay 1B, terminal d of panel 1RP, terminal r of panel 2RP, through a rectifier 218, which serves to prevent sneak circuits, and over front contact a of relay 2RO and through the winding of the relay to terminal N of the battery. The second stick circuit for relay 2RO is the same as the previously traced circuit except that it includes in the path from terminal r of panel 1RP to terminal d of panel 1RP front contact b of relay 1RO instead of the front point of contact b of relay 1B.

Relay 2A (FIG. 9) has a pickup circuit extending from terminal B of the battery over front contact c of relay ATP in FIG. 2, the front point of contact c of relay RI, lead 208, terminal r of panel 1RP, and from terminal r to terminal d of panel 1RP over two alternate paths, the first including front contact b of relay 1RO, and the second including the front point of contact b of relay 1B, from terminal d of panel 1RP to terminal r of panel 2RP, over the back point of contact b of relay 2B, back contact c of relay 2RO, and through the winding of relay 2A to terminal N of the battery. Relay 2A has a first stick circuit extending from terminal B of the battery over back contact d of relay 2H, lead 339, front contact a of relay 2A, and through the winding of the relay to terminal N of the battery. Relay 2A has a second stick circuit which extends from terminal B of the battery over back contact c of relay 2B, front contact a of relay 2A, and through the winding of the relay to terminal N of the battery.

Relay 2B (FIG. 9) has a pickup circuit which extends from terminal B of the battery over front contact c of relay ATP in FIG. 2, back contact c of relay RI, lead 210, terminal p of panel 1RP, terminal f of panel 1RP, terminal p of panel 2RP, the front point of contact c of relay 2A, through rectifier 219, which serves to prevent sneak circuits, and through the winding of relay 2B to terminal N of the battery. Relay 2B has a stick circuit extending from terminal B of the battery over the back point of contact d of relay 2RO, front contact a of relay 2B, and through the winding of the relay to terminal N of the battery. Relay 2H (FIG. 10) has two pickup circuits. The first pickup circuit for relay 2H extends from terminal B of the battery over front contact d of relay 2B and lead 344 to terminal b of unit 2ES and through the winding of relay 2H to terminal N of the battery. The second pickup circuit for relay 2H extends from terminal B of the battery over the front point of contact d of relay 2RO and thence over lead 344 to terminal b of unit 2ES and through the winding of relay 2H to terminal N of the battery.

Storage unit 2ES has an input circuit, extending from ground through bias unit 11 in FIG. 2 to terminal b of unit 11, over lead 296, front contact a of relay ATP, lead 215, terminal q of panel 1RP, terminal e of panel 1RP, terminal q of panel 2RP, and over front contact e of relay 2A and lead 345 to input terminal a of unit 2ES. Storage unit 2ES has an output circuit extending from ground terminal d through the unit to output terminal c, and over lead 220 to front contact f of relay 2RO and lead 346 to output terminal k of panel 2RP. The circuit is completed from terminal k through transfer circuits and one of a group of utilization devices associated with each of the group retarders in a manner which will hereinafter be fully described.

Panels 3RP through 5RP (FIGS. 18 and 19) are identical with panel 2RP just described, their internal circuitry corresponding to the circuits connected to terminals a through r in panel 2RP, with the exception to be noted hereinafter concerning the tangent acceleration code which has an individual combination for each panel.

Panel 6RP (FIGS. 18 and 19) comprises an electronic storage unit 6ES, including a relay 6H; and three additional relays 6RO, 6A, and 6B.

Relay 6RO (FIG. 18) has a pickup circuit extending from terminal B of the battery through selection networks associated with the group retarders, to be hereinafter described, terminating in a lead 224 to terminal a of panel 6RP, and thence through the winding of relay 6RO to terminal N of the battery. Relay 6RO has a multiple stick circuit extending from terminal B of the battery over front contact c of relay ATP in FIG. 2, the front point of contact c of relay RI, lead 208, terminal r of panel 1RP, from terminal r to terminal d of panel 1RP over alternate paths, the first including front contact b of relay 1RO and the second including the front point of contact b of relay 1B, from terminal d of panel 1RP to terminal r of panel 2RP, from terminal r to terminal d of panel 2RP over two alternate paths, the first including front contact b of relay 2RO and the second including the front point of contact b of relay 2B, respectively, from terminal r to terminal d of each of panels 3RP through 5RP over paths identical with that traced for panel 2RP, from terminal d of panel 5RP to terminal r of panel 6RP, through rectifier 225 which serves to prevent sneak paths, and over front conatct a of relay 6RO and through the winding of the relay to terminal N of the battery.

Relay 6A (FIG. 18) has a multiple pickup circuit extending from terminal B of the battery over front contact c of relay ATP in FIG. 2, the front point of contact c of relay RI, lead 208, terminal r, of panel 1RP, over either front contact b of relay 1RO or the front point of contact b of relay 1B to terminal d of panel 1RP, from terminal d of panel 1RP to terminal r of panel 2RP, from terminal r to terminal d of each of panels 2RP through 5RP over a front contact of either the RO or the B relay in each panel; for example front contact b of relay 2RO or the front point of contact b of relay 2B in panel 2RP; from terminal d of panel 5RP to terminal r of panel 6RP, over the back point of contact b of relay 6B, back contact c of relay 6RO, and through the winding of relay 6A to terminal N of the battery. Relay 6A has a first stick circuit extending from terminal B of the battery over back contact d of relay 6H, lead 349, front contact a of relay 6A, and through the winding of the relay to terminal N of the battery. Relay 6A has a second stick circuit extending from battery terminal B over back contact c of relay 6B, front contact a of relay 6A, and through the winding of the relay to battery terminal N.

Relay 6B (FIG. 18) has a pickup circuit which extends from terminal B of the battery over front contact c of relay ATP in FIG. 2, the back point of contact c of relay RI, lead 210, terminal p of panel 1RP and thence over a continuous lead including terminal f of panel 1RP, and terminals p and f of each of panels 2RP through 5RP, terminal p of panel 6RP, the front point of contact c of relay 6A, through a rectifier 226 included to prevent sneak circuits, and through the winding of relay 6B to terminal N of the battery. Relay 6B has a stick circuit extending from terminal B of the battery over the back point of contact d of relay 6RO, front contact a of relay 6B, and through the winding of the relay to terminal N of the battery.

Relay 6H (FIG. 19) has two pickup circuits. The first pickup circuit extends from terminal B of the battery over front contact d of relay 6B, and lead 355 to terminal b of storage unit 6ES and through the winding of relay 6H to terminal N of the battery. The second circuit for relay 6H extends from terminal B of the battery over the front point of contact d of relay 6RO and thence over lead 355 to terminal b of unit 6ES and through the winding of relay 6H to terminal N of the battery.

Storage unit 6ES (FIG. 19) has an input circuit which extends from ground in bias unit 11 in FIG. 2 to terminal b of unit 11, lead 296, and thence over front contact a of relay ATP, lead 215, and over a continuous lead including terminals q and e of panels 1RP through 5RP to terminal q of panel 6RP, and over front contact e of relay 6A and lead 356 to input terminal a of unit 6ES and through the unit to ground terminal d. Unit 6ES has an output circuit extending between grounded terminal d and output terminal c and from output terminal c over lead 227 to front contact f of relay 6RO and thence over lead 357 to output terminal k of panel 6RP. The output circuit is completed from terminal k through translation circuits and utilization devices associated with the group retarders as will hereinafter be described.

It will be noted that a group of three leads runs through each of panels 1RP through 6RP. A first lead 231 extends over a path including terminals o and g of panels 1RP through 5RP, and terminal o of panel 6RP. A second lead 232 extends over a path including terminals n and h of panels 1RP through 5RP, and terminal n of panel 6RP. The third lead 233 extends over a path including terminals m and i of panels 1RP through 5RP, and terminal m of panel 6RP. Within each of the panels is included a contact or combination of contacts of the A relay for the panel which energizes leads 231 through 233 in an individual code combination for each panel. In the illustrated embodiment of my invention, since six panels are shown, not all of the energized and deenergized combinations of leads 231, 232 and 233 are required to identify the panels. As illustrated, the panel identifying code chosen is a binary code ranging from binary 1, or 001, to binary 6, or 110, where a 1 indicates an energized line and a 0 indicates a deenergized line in the manner well known in the art. In panel 1RP, as will hereinafter appear, selection of the panel for the storage of a voltage results in the pick up of relay 1A, which energizes lead 233 from terminal B of the battery over the front contact d of relay 1A and leaves leads 231 and 232 deenergized, to generate the binary code combination 001. Similarly, in panel 3RP front contact d of relay 2A connects terminal B of the battery to lead 232 to generate the code sequence 010. Similar contacts of the A relays in panels 2RP through 5RP are used to energize leads 231 and 232 in the respective code sequences 011, 100 and 101, respectively. In panel 6RP, front contacts d and b of relay 6A energize leads 231 and 232 to generate the identifying sequence 110. The code on leads 231, 232 and 233 will henceforth be called the tangent acceleration code, and the relays for storing this code will include the letters TAC as part of their designation.

Before describing the storage and transfer of the tangent acceleration code and the read-out and cancellation circuitry associated with the group retarders, the operation of the storage equipment described up to this point in storing a measurement of tangent track rolling resistance and generating a code identifying the selected storage panel will be described.

*Operation of the Tangent Rolling Resistance Storage and Code Generating Equipment*

Initially, all relays concerned in the operation to be described are released, except for track relay ATR (FIG. 2), which is normally picked up over the track circuit associated with section AT, and relay ATCP, which is normally held up over its circuit previously traced and including the back point of contact b of relay ATP. Now assume that a car rolling down the hump enters track section AT and shunts track relay ATR (FIG. 2), closing its back contact a and causing relay ATP (FIG. 2) to pick up over its previously traced pickup circuit. With relay ATP picked up, and with the car rolling in section AT in the path of antenna 199 of radar velocity meter 9, the output of radar velocity meter 9 which is differentiated in differentiator 10 and biased in bias unit 11 as previously described, is connected from terminal b of bias unit 11 over lead 296, front contact a of relay ATP and lead 215 to terminal q of panel 1RP and thence through a continuous lead in panels 1RP through 6RP. However, the circuit to the storage unit ES is interrupted in each of the panels at the open front contact e of relays 1A through 6A.

With relay ATP up, relay RI is now picked up over its previously traced circuit including the front point of contact b of relay ATP, and front contact b of relay ATCP, and sticks up over its previously traced stick circuit including back contact c of relay R1TP and front contact a of relay RI. Since relay R1TP is down when relay ATP and RI are both picked up, all the circuits for relay ATCP are interrupted and this relay will release after its time delay, which is adjusted to a small value just sufficient to insure the pick up of relay RI.

With relays ATP and RI picked up the previously traced circuit for relay 1A, which includes front contact c of relay ATP, the front point of contact c of relay RI, lead 208, the back point of contact b of relay 1B, back contact c of relay 1RO, and the winding of relay 1A, is completed and relay 1A picks up.

With relay 1A picked up, the input circuit for storage unit 1ES is completed from the previously traced energizing circuit for lead 215 from bias unit 11 over lead 296 and front contact a of relay ATP, and this circuit is now completed from terminal q of panel 1RP over the front point of contact e of relay 1A and lead 335 to terminal a of storage unit 1ES. The measured value of rolling resistance for the cut in section AT is now continuously applied to the input terminal a of electronic storage unit 1ES, but no output voltage appears at terminal c of unit 1ES because relay 1H is released.

As the cut approaches the end of section AT, it is assumed that the rolling resistance measurement has become stabilized and can now be made final and stored. Accordingly, as the cut enters section MR1T (FIG. 2), dropping relay R1TR and causing repeater relay R1TP (FIG. 2) to pick up, the holding circuit for relay RI is broken at the open back point of contact c of relay R1TP and relay RI is released.

With relay ATP still up, since at this time the cut is shunting both sections AT and MR1T, a circuit is completed from terminal B of the battery over front contact c of relay ATP, the back point of contact c of relay RI, and lead 210 to terminal p of panel 1RP, and thence over the front point of contact c of relay 1A and through rectifier 211 and the winding of relay 1B to terminal N of the battery. Relay 1B is accordingly picked up.

With relay 1B picked up, the pickup circuit for relay 1H is completed from terminal B of the battery over front contact d of relay 1B and lead 334 to terminal b of unit 1ES and through the winding of relay 1H to terminal N of the battery.

Relay 1H will now pick up, interrupting the input circuit for storage unit 1ES and transferring the final value of rolling resistance measurement to the storage circuit, to be described, causing an output voltage to appear at terminal c of unit 1ES which is proportional to the acceleration of the cut moving in the path of antenna 199 of velocity meter 9.

With relays 1B and 1H up, the previously traced stick circuit for relay 1A is interrupted at the open back point of contact c of relay 1B and the open back contact d of relay 1H, and relay 1A accordingly releases. Relay 1B remains held up over its stick circuit including the back point of contact d of relay 1RO and its own front contact a. It may now be assumed that the cut clears track section AT and then clears section MR1T, restoring the apparatus to its initial condition except that relays 1B and 1H are picked up and storage unit 1ES contains a measured value of rolling resistance.

During the interval that relay 1A was picked up, during the preceding cycle of operations, leads 231, 232 and 233 were energized in the code combination 001, identifying panel 1RP, by the connection of terminal B of the battery to lead 233 over front contact d of relay 1A. The utilization of this code will be described later.

The storage sequence just described is adapted to be repeated for any number of measurements up to 6, and the storage will be made in the first vacant unit in the series from 1RP to 6RP. As will appear from the above description of panel 1RP, in any available unit each of the RO, A, B and H relays are released. In any unit in which a voltage has been stored, the B and H relays are energized and the RO and 1A relays are released.

To give an example of the manner in which the circuits of my invention seek the first available storage unit, assume that panels 1RP and 3RP through 6RP are occupied with storages, and hence have their B and H relays picked up, and that panel 2RP is unoccupied and hence has all of its relays released. Now, assume that a train enters section AT, causing a rolling resistance measurement to appear at terminal b of bias unit 11 and causing relay ATR to drop and relay ATP to pick up.

When relay ATP picks up, relay RI is picked up over the circuits previously described and lead 208 is energized from terminal B of the battery over front contact c of relay ATP and the front point of contact c of relay RI (FIG. 2). Since relay 1B in panel 1RP (FIG. 8) is picked up, lead 208 is connected to terminal r of panel 2RP over a circuit extending from terminal r of panel 1RP over the front point of contact b of relay 1B to terminal d of panel 1RP and hence to terminal r of panel 2RP. A circuit is now completed from terminal r of panel 2RP over the back point of contact b of relay 2B, back contact c of relay 2RO, and through the winding of relay 2A to terminal N of the battery. When relay 2A picks up, the code designation 010 is applied to leads 231, 232 and 233 by energizing lead 232 over front contact d of relay 2A. This code is utilized as later described. With relay 2A up, the measured value of rolling resistance from terminal b of unit 11 can be applied to terminal a of unit 2ES over the previously traced circuit including front contact e of relay 2A, lead 215, and front contact a of relay ATP. As soon as the cut enters section MR1T, relay RI will release and relay 2B will be picked up over its previously traced circuit including front contact c of relay ATP, the back point of contact c of relay RI, lead 210, and front contact c of relay 2A. With relay 2B up, relay 2H is picked up over its previously traced circuit, completing the storage cycle, and panel 2RP will then be in the same condition as panels 1RP and 3RP through 6RP.

In order to illustrate the operation of the storage panels when it is desired to read a stored voltage out, assume that a voltage is stored in typical panel 2RP and that relays 2B and 2H are picked up, and that relays 2RO and 2A are released. The external circuitry for accomplishing the read out operation will be described later; it is sufficient to point out here that the operation of this external circuitry will affect a connection from terminal k of panel 2RP through a suitable utilization device to ground, and that terminal B of the battery will be connected through an external circuit to terminal a of panel 2RP.

With terminal a energized from terminal B of the battery, relay 2RO will pick up, and if another cut happens to be in section AT at this time, and panel 1RP is holding a prior storage, it will stick up over its previously traced stick circuit including its own front contact a, rectifier 218, through panel 1RP to lead 208, the front point of contact c of relay RI and front contact c of relay ATP to prevent interference by the additional cut while the read out operation is taking place. With relay 2RO up, the output of storage unit 2ES from terminal c is applied to terminal k over front contact f of relay 2RO.

With relay 2RO up, the stick circuit for relay 2B previously traced is interrupted at the open back point of contact d of relay 2RO. Relay 2B is accordingly released. Relay 2H is held up at this time over its previously traced pickup circuit including the front point of contact d of relay 2RO.

When relay 2RO is released as a result of the interruption of the external circuit to terminal a, the circuit for relay 2H is interrupted causing the relay to release. The apparatus of panel 2RP will thus be restored to its initial condition and make it available for further storage.

Before discussing the tangent acceleration code transfer circuit, the switch control circuits and the automatic switching system will be described.

The Switch Control Circuits

The switch control circuits employed in the illustrated embodiment of my invention are substantially conventional and are shown principally to avoid confusion in understanding the timing of certain operations in the control apparatus.

Referring first to switch control 1–8WC, as shown in FIG. 4, the unit comprises a switch mechanism 1–8SM which may be of conventional construction and which is controlled to actuate switch 1–8W to its normal or reverse positions by actuating magnets NW or RW, respectively. The details of this apparatus form no part of my present invention and accordingly are not shown.

The switch control also includes a circuit controller unit 1–8CC which includes three circuit controllers D, E and F. Each of these circuit controllers comprises a contact arm which is moved by the switch machine 1–8SM in accordance with the movement of the points of switch 1–8W, as indicated schematically by dotted lines. The arm of circuit controller F engages a contactor attached to terminal $a$ over a small arc of travel with the switch in and adjacent its reverse position, and engages a contactor connected to its terminal $b$ over an arc including the normal position of the switch substantially as shown, with an open position between the contactors over a short range of travel of the switch towards the reverse position as shown. The switch arm of circuit controller E is electrically connected to its terminal $a$ over a range including the reverse position of the switch, and to its terminal $b$ over a short range of movement including the normal position of the switch, with a relatively small arc of open travel adjacent the normal position as shown. Circuit controller D has its switch arm electrically connected to its terminal $b$ over a range of movement including the normal position of the switch, and to its terminal $a$ over a range of movement including the reverse position of the switch, with a short interval of open travel in the central position of the switch as shown.

The switch control unit further includes normal and reverse repeater relays 1–8NWP and 1–8RWP, respectively, which may be conventional double coil directional relays of a type well known in the art. These relays each have two windings, either winding serving to pick up the contacts of the relay upon current flow therethrough in the direction of the arrow.

Relay 1–8NWP has a pickup circuit extending from terminal B of the battery through a suitable voltage dropping resistor, the upper winding of the relay, over terminal $b$ of circuit controller E and its associated switch arm in the normal position of switch 1–8W to terminal N of the battery. A second circuit for relay 1–8NWP, which serves to hold up the relay and in addition forms a stick circuit for relay 1–8WP, to be described, extends from terminal B of the battery over front contact $c$ of relay 1–8WP, through the winding of relay 1–8WP, over back contact $b$ of relay 1–8RWP, through the lower winding of relay 1–8NWP and over terminal $b$ of circuit controller E and its associated switch arm in the normal position of the switch to terminal N of the battery.

Relay 1–8RWP has a pickup circuit which extends from terminal B of the battery through a suitable voltage dropping resistor as shown, through the upper winding of relay 1–8RWP, and over terminal $a$ of circuit controller F and its associated switch arm in the reverse position of the switch to terminal N of the battery. Relay 1–8RWP has a second circuit which serves to hold up the relay and also serves as a second stick circuit for relay 1–8WP which extends from terminal B of the battery over front contact $c$ of relay 1–8WP, through the winding of relay 1–8WP, over back contact $a$ of relay 1–8NWP, through the lower winding of relay 1–8RWP, and over terminal $a$ of circuit controller F and its associated switch arm in the reverse position of the switch to terminal N of the battery.

Contacts $a$ of relay 1–8RWP and $b$ of relay 1–8NWP may be used to actuate suitable indication circuits, as indicated schematically. The indication circuits may be conventional, and as they do not form a part of my present invention, they will not be shown in detail.

Relay 1–8WP is a repeater relay which is energized in either extreme position of switch 1–8W. It has a pickup circuit extending from terminal B of the battery over back contact $g$ of track relay 1–8TR in the occupied condition of track section 1–8T, back contact $c$ of relay 1–8WP, through the winding of relay 1–8WP, and over alternative paths, depending on the position of switch 1–8W, the first including back contact $b$ of relay 1–8RWP, the lower winding of relay 1–8NWP, and over terminal $b$ of circuit controller E and its associated switch arm in the normal position of the switch to terminal N of the battery and the second extending over back contact $a$ of relay 1–8NWP, through the lower winding of relay 1–8RWP, and over terminal $a$ of circuit controller F and its associated switch arm in the reverse position of the switch to terminal N of the battery. Relay 1–8WP has a pair of stick circuits which correspond to the second circuits described for relays 1–8NWP and 1–8RWP, and which extend from terminal B of the battery over front contact $c$ of relay 1–8WP, through its winding, and through the two alternative paths previously traced for the pickup circuit.

The switch control unit 1–8WC further includes a manual controller 1–8MC which has three terminals N, A and R and a lever arm connected to battery terminal B as shown. With the lever in position R, the switch is controlled to the reverse position by a circuit extending from terminal B of the battery over terminal R of controller 1–8MC, front contact $a$ of track relay 1–8TR, to the upper side of the winding of reverse control magnet RW, and through the winding to terminal $b$ of circuit controller F, and its associated switch arm over a range extending from the normal position of the switch into a position on the reverse side of the mid position to terminal N of the battery. When the switch has moved to the position in which circuit controller F is open, a spring within switch mechanism 1–8SM completes the movement of the switch in a manner well known in the art, and reverse repeater relay 1–8RWP is picked up over its circuit previously traced. With lever 1–8MC in its normal or N position, a circuit extends from terminal B of the battery over terminal N of the lever and front contact $d$ of track relay 1–8TR, through normal magnet NW, and over terminal $a$ of circuit controller E and its associated arm in the reverse position of the switch to terminal N of the battery. When the switch moves sufficiently so that circuit controller E is open, the switch movement is completed by spring action and normal repeater relay 1–8NWP is picked up by its previously traced circuit.

If an attempt is made to move the switch and during the switch movement track section 1–8T becomes occupied, releasing relay 1–8TR, circuit controller D operates to return the switch to its nearest extreme position. For example, if the switch is on the normal side of the mid position, a circuit extends from terminal B of the battery over back contact $f$ of relay 1–8TR, over the arm of circuit controller D to terminal $b$ of circuit controller D, through normal magnet NW and through terminal $a$ of circuit controller E and its associated arm to terminal N of the battery. If the switch is in its normal position or within the range of adjustment at which circuit controller E is open, the switch will automatically be returned to its normal position by a spring action. Similarly, if the switch is on the reverse side of its mid position but not within the range in which it will be automatically spring-restored to the reverse position, a circuit will extend from terminal B of the battery over back contact *f* of relay 1-8TR, the arm of circuit controller D and terminal *a* of circuit controller D, through the reverse magnet RW, and over terminal *b* and the associated arm of circuit controller F to terminal N of the battery until the switch is moved sufficiently toward the reverse position to open circuit controller F, at which time the spring action of switch machine 1-8SM will complete the movement of the switch toward its reverse position. It will be noted that at all times during which the detector section 1-8T is occupied, the other circuits to magnets RW and NW are opened at contacts *a* and *d*, respectively, of track relay 1-8TR.

With manual lever 1-8MC in its automatic or A position, a circuit extends from terminal B of the battery, over terminal A of manual controller 1-8MC, lead 100, front contact *h* of relay 1-8AD (FIG. 12), to be described, in the A bank of the 1-8 automatic switching storage unit, over back contact *e* of relay 1-8AT in the A bank of the 1-8 storage unit, to be described, and the front or back point of contact *a* of relay 1-8A1 in the A bank of the 1-8 storage unit, to be described, over lead 101 or 102 (to FIG. 4) to contact *a* or contact *b* of relay 1-8WP, respectively, in accordance with the energized or released condition of route storage relay 1-8A1. Relay 1-8WP is sufficiently slow releasing to bridge the normal operation of the switch and is accordingly energized unless, due to a failure, the switch is stored in some intermediate position. Accordingly, if relay 1-8A1 is picked up and the previously traced circuit is completed up to contact *a* of relay 1-8WP, the circuit is continued over the front point of contact *a* of relay 1-8WP and front contact *a* of relay 1-8TR, through reverse magnet RW and through circuit controller F to terminal N of the battery until circuit controller F becomes open and the switch movement to its reverse position is completed by the spring action of switch machine 1-8SM. On the other hand, if relay 1-8A1 is down to direct a normal setting of switch 1-8W, the previously traced circuit is completed over front contact *b* of relay 1-8WP, front contact *d* of relay 1-8TR, through the winding of normal magnet NW and through circuit controller E to terminal N of the battery until the switch has been moved sufficiently close to its normal position so that circuit controller E is open and the switch movement is completed by spring action of switch machine 1-8SM.

In the event of a failure which would cause relay 1-8WP to be deenergized, a reverse action will take place. That is, the circuit previously traced over front contact *a* of relay 1-8WP to call for a reverse movement of the switch will now be completed over the back point of contact *a* of relay 1-8WP, front contact *d* of relay 1-8TR, and through normal magnet NW and circuit controller E to cause movement of the switch to its normal position. Similarly, if relay 1-8A1 is released with relay 1-8WP down, the switch operating circuit will be completed over the back point of contact *b* of relay 1-8WP and front contact *a* of relay 1-8TR through the reverse magnet RW and circuit controller F to direct a reverse movement of the switch. The purpose of this circuitry is to provide for the case in which the switch is physically blocked from completing its movement in one direction, and to attempt to position it in the other direction so that it will be in one or the other of its extreme positions when occupied and will not derail a car.

The circuits which include terminals *c, d, e, g* and *h* of switch control 1-8WC will be described later in connection with other units.

Switch control 1-4WC in FIG. 6 is substantially similar to switch control 1-8WC in most respects. The circuits for relays 1-4RWP, 1-4NWP, 1-4WP, the operating circuits for magnets RW and NW, the operation of switch machine 1-4SM, and the operation of circuit controller 1-4CC are identical with those described for switch control 1-8WC and this description will not be repeated. The operation of switch control 1-4WC in the N and R positions of lever 1-4MC is the same as that just described for switch control 1-8WC.

The switch control circuit in the automatic position of lever 1-4MC extends from terminal B of the battery over terminal A of lever 1-4MC, terminal *e* of switch control 1-4WC, terminal *w* of the A bank of the 1-4 storage unit, front contact *e* of relay 1-4AD, to be described, back contact *d* of relay 1-4AT, to be described, and the front or back point of contact *b* of relay 1-4A1, the route storage relay for switch 1-4W, which as will be described later is picked up to direct a reverse movement of switch 1-4W and is released to direct a normal movement of the switch, over lead 103 or 104, respectively, to terminal *c* or *b* of the A bank of the 1-4 storage unit (FIG. 13), and thence over lead 103 or 104 to terminal *a* or terminal *b*, respectively, of switch control 1-4WC (FIG. 6). Under normal conditions, with relay 1-4WP up, the circuit may be completed from terminal *a* of switch control 1-4WC, which is energized when relay 1-4A1 is picked up, over front contact *a* of relay 1-4WP, front contact *a* of relay 1-4TR, through reverse magnet RW, and through circuit controller F to terminal N of the battery to direct a reverse movement of the switch. If relay 1-4A1 is down, and trerminal *b* of switch control 1-4WC is energized over the circuit previously traced, the circuit is completed over front contact *b* of relay 1-4WP, front contact *c* of relay 1-4TR, through the normal magnet NW, and through circuit controller E to direct a normal setting of the switch. Under conditions where, due to failure, relay 1-4WP is deenergized, an opposite setting of the switch will be sought by circuits extending from terminal *a* or *b* of switch control 1-4WC and back contact *a* or back contact *b* of relay 1-4WP in the same manner as previously described for switch control 1-8WC.

The circuits including terminals *c, d, f* and *g* of switch control 1-4WC will be described later in connection with other units.

Switch control 5-8WC in FIG. 5 is identical in all respects to switch control 1-4WC and is shown in block form. The circuits connected to terminals *a* through *i* of 5-8WC correspond in detail to those shown connected to terminals *a* through *i* of switch control 1-4WC and are therefore not shown in detail.

Switch control 1-2WC in FIG. 8 is substantially identical with the previously described switch control units 1-8WC and 1-4WC in that relays 1-2RWP, 1-2NWP, 1-2TR, and 1-2WP have the same control circuits and cooperate with manual control lever 1-2MC and circuit controller 1-2CC to control 1-2SM in the same manner as previously described. Accordingly, these circuits will not be further described in detail.

The switch operating circuit for unit 1-2WC in the automatic position of manual control lever 1-2MC extends from terminal B of the battery over terminal A of lever 1-2MC, terminal *e* of switch control 1-2WC, terminal *d* of the A bank of the 1-2 storage location, front contact *b* of relay 1-2AD, to be described, back contact *b* of relay 1-2AT, to be described, and the front or back point of contact *b* of route storage relay 1-2A1, to be described, according as the relay is picked up to direct a reverse movement of the switch or released to direct a normal setting of the switch, to terminal *b* or *a* of the A bank of the 1-2 storage location, and thence to terminal *b* or *c*, respectively, of switch control 1-2WC. The circuits from these terminals to the magnets RW and NW are identical with those previously described in connection with switch controls 1-8WC and 1-4WC and will not be further described.

Switch control 3-4WC in FIG. 7 is identical with switch control 1-2WC just described, and its terminals *a* through *h* are connected to circuits similar to that of the corresponding terminals of switch control 1-2WC.

The Automtic Switching System

Initial storage unit 1–8 of the automatic switching system is partially shown in FIGS. 11 and 12. This unit comprises three storage banks A, B and C as shown. For purposes of illustration, only three push buttons 1PB through 3PB have been shown, but it is to be understood that in practice eight push buttons for setting routes 1 through 8 into the C bank of the storage unit are provided. In practice, it will also be apparent to those skilled in the art that other known means, such as an automtic tape storage system, could be used to supply this information if desired.

The C bank of the 1–8 storage unit comprises three control relays 1–8CT, 1–8CSC and 1–8CD, and eight storage relays 1–8C1C through 1–8C8C. For simplicity, however, only relays 1–8C1C through 1–8C3C are shown in the drawings. Relays 1–8CT and 1–8CD are made slow releasing by any suitable conventional means, as indicated by the arrow through their contacts, to ensure the proper sequence of operation of the control circuits actuated thereby.

Relay 1–8CT is a transfer control relay having a pickup circuit extending from terminal B of the battery over either back contact $a$ of relay 1–8BT or back contact $a$ of relay 1–8BD in the B bank of the 1–8 storage unit and through the winding of relay 1–8CT to terminal N of the battery.

Relay 1–8CSC is a storage cancellation relay having a pickup circuit extending from terminal B of the battery over the normally open contact $a$ of a cancellation push button 1–8CPB, front contact $b$ of relay 1–8CD and through the winding of relay 1–8CSC to terminal N of the battery. Relay 1–8CSC has a first stick circuit extending from terminal B of the battery over the normally open contact $a$ of cancellation push button 1–8CPB, its own front contact $b$, and through its winding to terminal N of the battery. A second stick circuit for relay 1–8CSC is provided over its front contact $d$ and front contact $c$ of relay 1–8CD to terminal B of the battery.

Relay 1–8CD is a storage detection relay which has a pickup circuit extending from terminal B of the battery over front contact $c$ of each of relays 1–8C1C through 1–8C8C and through the winding of relay 1–8CD to terminal N of the battery.

Each of relays 1–8C1C through 1–8C8C has a similar pickup circuit. The pickup circuit for relay 1–8C1C extends from terminal B of the battery over back contact $d$ of relay 1–8CD, back contact $b$ of relay 1–8BT, to be described, front contact $a$ of push button 1PB, the back point of contact $a$ of relay 1–8C1C, through the winding of relay 1–8C1C, and over front contact $b$ of relay 1–8CT and back contact $a$ of relay 1–8CSC to terminal N of the battery. Relay 1–8C1C has a stick circuit which extends from terminal B of the battery over the front point of its own contact $a$, through the winding of the relay, and over the common circuit which extends over front contact $b$ of relay 1–8CT and back contact $a$ of relay 1–8CSC to terminal N of the battery.

The pickup circuit for relay 1–8C2C is substantially identical with that for relay 1–8C1C except that it includes a back contact of the preceding push button 1PB. This pickup circuit extends from terminal B of the battery over back contact $d$ of relay 1–8CD, back contact $b$ of relay 1–8BT, to be described, back contact $a$ of push button 1PB, front contact $a$ of push button 2PB, the back point of contact $a$ of relay 1–8C2C, and through the winding of relay 1–8C2C to the common portion of the circuit previously traced, which extends over front contact $b$ of relay 1–8CT and back contact $a$ of relay 1–8CSC to terminal N of the battery. The stick circuit for relay 1–8C2C is similar to that for relay 1–8C1C and extends from a common bus connected to terminal B of the battery, over the front point of its make-before-break contact $a$, through the winding of the relay, and through the common portion of the circuit previously traced to terminal N of the battery. The pickup and stick circuits for the remaining relays 1–8C3C through 1–8C8C are similar to those previously traced except that in each case the pickup circuit includes the back contacts $a$ of all the preceding push buttons. For example, the pickup circuit for relay 1–8C3C includes back contacts $a$ of push buttons 1PB and 2PB and front contact $a$ of push button 3PB. Contact $a$ of each of relays 1–8C1C through 1–8C8C is of the make-before-break type as indicated by the arc shown across the contact arm, to permit stick circuits for the relays to be established before the pickup circuits are broken. The remaining details of these pickup and stick circuits are believed to be obvious from the preceding description and will not be further described.

The B bank of the 1–8 storage unit includes three control relays, transfer relay 1–8BT, storage cancellation relay 1–8BSC, and a slow release storage detection relay 1–8BD; and eight storage relays 1–8B1C through 1–8B8C. For simplicity only relays 1–8B1C through 1–8B3C are shown in the drawings. Relay 1–8BD is made slow to release by conventional means, not shown, as indicated by the arrow through its contacts, to ensure the correct sequence of operation of the circuits controlled thereby.

Transfer relay 1–8BT has a pickup circuit extending from terminal B of the battery over front contact $e$ of slow release relay 1–8CD, back contact $c$ of relay 1–8BD, and through the winding of relay 1–8BT to terminal N of the battery. Relay 1–8BT has two stick circuits. The first extends from terminal B of the battery over front contact $e$ of relay 1–8CD, front contact $c$ of relay 1–8BT and through the relay to terminal N of the battery. The second stick circuit for relay 1–8BT extends from terminal B of the battery over any of the front contacts $b$ of push buttons 1PB through 8PB, over front contact $d$ of relay 1–8BT, and through the winding of relay 1–8BT to terminal N of the battery.

Storage cancellation relay 1–8BSC has a pickup circuit extending from terminal B of the battery over the normally open contact $a$ of cancellation push button 1–8CPB, back contact $b$ of slow release relay 1–8CD, back contact $c$ of relay 1–8CSC, front contact $b$ of slow release detector relay 1–8BD, and through the winding of relay 1–8BSC to terminal N of the battery. Relay 1–8BSC has two stick circuits. The first extends from terminal B of the battery over contact $a$ of cancellation button 1–8CPB, back contact $b$ of relay 1–8CD, back contact $c$ of relay 1–8CSC, front contact $a$ of relay 1–8BSC and through the winding of the relay to terminal N of the battery. The second stick circuit for relay 1–8BSC extends from terminal B of the battery over front contact $d$ of detector relay 1–8BD, front contact $b$ of relay 1–8BSC, and through the winding of the relay to terminal N of the battery.

Slow release detector relay 1–8BD has a pickup circuit extending from terminal B of the battery over back contact $d$ of relay 1–8BSC, front contact $f$ of relay 1–8BT, through the winding of relay 1–8BD, and over either back contact $b$ of relay 1–8AT at back contact $b$ of relay 1–8AD in the A bank of the storage unit, to be described, to terminal N of the battery. Relay 1–8BD has a stick circuit extending from terminal B of the battery over back contact $d$ of relay 1–8BSC and front contact $e$ of relay 1–8BD, through the winding of relay 1–8BD, and over back contacts $b$, in multiple, of relays 1–8AT and 1–8AD, in the A bank of the storage unit, to terminal N of the battery.

Relays 1–8B1C through 1–8B8C have similar pickup circuits. These pickup circuits include a common portion extending from terminal B of the battery over front contact $e$ of relay 1–8BT, individual paths extending over front contact $b$ of the respective associated relay 1–8C1C through 1–8C8C to the back point of contact $a$ of the respective relay 1–8B1C through 1–8B8C and through the winding of the respective relay 1–8B1C through 1–8B8C, and a common bus extending over front contact *h* of relay 1-8BD to terminal N of the battery. Relays 1-8B1C through 1-8B8C have similar stick circuits, each extending from terminal B of the battery over a common bus to the front point of contact *a* of the respective relay 1-8B1C through 1-8B8C and through the winding of the relay to a common bus extending to terminal N of the battery over front contact *h* of relay 1-8BD. Contact *a* of each of relays 1-8B1C through 1-8B8C is of the make-before-break type, as indicated by the arc shown on the movable arm, to permit the stick circuits to be completed before the pickup circuits are broken.

The A bank of the 1-8 storage unit includes four control relays, a transfer control relay 1-8AT, a storage cancellation relay 1-8ASC, a slow release storage detector relay 1-8AD and a transfer locking relay 1-8AL. The A bank also includes eight storage relays 1-8A1C through 1-8A8C. For purposes of simplicity only relays 1-8A1C through 1-8A3C are shown in the drawings. A route code storage relay 1-8A1 and a cancellation push button 1-8ACPB are also shown.

Relay 1-8AT has a pickup circuit extending from terminal B of the battery over front contact *f* of relay 1-8BD in the B bank, back contact *g* of relay 1-8BT, back contact *a* of relay 1-8AD, and through the winding of relay 1-8AT to terminal N of the battery. Relay 1-8AT has a stick circuit extending from terminal B of the battery over front contact *f* of relay 1-8BD, back contact *g* of relay 1-8BT, its own front contact *a*, and through its winding to terminal N of the battery.

Storage cancellation relay 1-8ASC has a pickup circuit extending from terminal B of the battery over front contact *a* of cancellation push button 1-8CPB, back contact *b* of relay 1-8CD in the C bank, back contact *c* of relay 1-8CSC, back contact *b* of relay 1-8BD in the B bank, back contact *c* of relay 1-8BSC, front contact *c* of relay 1-8AD in the A bank, and through the winding of relay 1-8ASC to terminal N of the battery. Relay 1-8ASC has a first stick circuit which coincides with its pickup circuit previously traced up to back contact *c* of relay 1-8BSC, and is then continued over its own front contact *a* and through its winding to terminal N of the battery. Relay 1-8ASC has a second stick circuit extending from terminal B of the battery over front contact *d* of relay 1-8AD, its own front contact *b*, and through its winding to terminal N of the battery.

Relay 1-8AD has a pickup circuit extending from terminal B of the battery over normally closed contact *a* of cancellation push button 1-8ACPB, back contact *c* of relay 1-8ASC, front contact *c* of relay 1-8AT, through the winding of relay 1-8AD to terminal *b* of the A bank, and over lead 106 to terminal *c* of the B bank of the 5-8 storage unit (FIG. 5), over back contact *b* of relay 5-8BT and back contact *b* of relay 5-8BD in multiple, out of the B bank at terminal *m*, over lead 107 to terminal *c* of the B bank of the 1-4 storage unit (FIG. 6), and thence over back contact *d* of relay 1-4BT and back contact *d* of relay 1-4BD in multiple to terminal N of the battery. Relay 1-8AD has a stick circuit which extends from terminal B of the battery over contact *a* of cancellation push button 1-8ACPB (FIG. 12), back contact *c* of relay 1-8ASC, front contact *e* of relay 1-8AD, through the winding of relay 1-8AD to lead 106, and thence over the circuit path traced above to terminal N of the battery in the B bank of the 1-4 storage unit (FIG. 6).

Relay 1-8AL has a pickup circuit extending from terminal B of the battery in switch control unit 1-8WC (FIG. 4), back contact *c* of track relay 1-8TR, terminal *e* of unit 1-8WC, lead 108, terminal *c* of the A bank of the 1-8 storage unit (FIG. 12), over back contact *f* of relay 1-8AD, and through the winding of relay 1-8AL to terminal N of the battery. Relay 1-8AL has a stick circuit which extends from terminal B of the battery in switch control unit 1-8WC (FIG. 4), over back contact *c* of relay 1-8TR, over lead 108, over front contact *a* of relay 1-8AL, and through the winding of the relay to the terminal N of the battery.

Relays 1-8A1C through 1-8A8C have similar pickup circuits extending from terminal B of the battery over front contact *f* of relay 1-8AT (FIG. 12), front contact *b* of the corresponding one of relays 1-8B1C through 1-8B8C (FIG. 11), over the back point of make-before-break contact *a* of the respective relay 1-8A1C through 1-8A8C, and through the winding of the relay to a bus extending to terminal N of the battery over front contact *i* of relay 1-8AD. Relays 1-8A1C through 1-8A8C have similar stick circuits extending from terminal B of the battery over a common bus to the front point of contacts *a* of the relays 1-8A1C through 1-8A8C and through the winding of the relay and over front contact *i* of relay 1-8AD to terminal N of the battery.

The route indication stored in relays 1-8A1C through 1-8A8C is in the form of a relay contact associated with each track and indicating the selection of that track by being closed in its front position. For use in the remainder of the apparatus, it is convenient to translate this information into a code in which one bit is assigned to each switch in series in a route, each bit having a first condition in which the associated switch is to be reversed, and a second condition corresponding to the normal positioning of the switch. For this purpose, as applied to the eight track layout of the illustrated embodiment in which there are three switches in any given route, three bits of information are required. Accordingly, three lines 109, 110 and 111 are provided to transmit the required information. Line 109 is associated with switch 1-8W, line 110 is associated with the second switches 1-4W and 5-8W, and line 111 is associated with final switches 1-2W, 3-4W, 5-6W and 7-8W.

The first switch 1-8W is reversed for each of the routes leading to tracks 5T through 8T and is normal for the remaining routes leading to tracks 1T through 4T. Accordingly, line 109 is energized over front contacts of relays 1-8A5C through 1-8A8C, not shown. This circuit extends from terminal B of the battery over a common bus 288 and in multiple over front contacts of relays 1-8A5C through 1-8A8C, not shown, to line 109.

The energized or deenergized condition of line 109 is repeated by relay 1-8A1, which has its winding connected at one side to line 109 and at the other side to terminal N of the battery. Accordingly, relay 1-8A1 is picked up when it is required to reverse switch 1-8W and is released when switch 1-8W is required to be in its normal position. This relay controls the application of energy to lines 101 and 102 over its front or back points, respectively. Lines 101 and 102 are connected to terminals *a* and *b* of switch control 1-8WC in the circuits previously described.

Line 110 governs the operation of switches 1-4W and 5-8W. Switch 1-4W is reversed for the routes leading to tracks 3T and 4T. Switch 5-8 is reversed for the route leading to tracks 7T and 8T. Accordingly, line 110 is energized over a circuit extending from terminal B of the battery and common bus 288, in multiple over front contact *c* of relay 1-8A3C and front contacts of relays 1-8A4C, 1-8A7C and 1-8A8C, these latter three relays not being shown in the drawings.

Line 111 governs the operation of the end switches 1-2W through 7-8W. These switches are reversed for the routes leading to the even tracks 2T, 4T, 6T and 8T. Accordingly, line 111 is energized over a circuit extending from terminal B of the battery and common bus 288 in multiple over front contact *c* of relay 1-8A2C, and front contacts of relays 1-8A4C, 1-8A6C, and 1-8A8C, these latter three relays not being shown in the drawings.

Lines 110 and 111 are connected to terminals *h* and *i*, respectively, of the A bank of the 1-8 storage unit, and the information represented thereby is transmitted successively to the succeeding storage units by circuitry to be described.

The 1-4 storage unit is shown in FIGS. 6 and 13. For purposes of illustration, it is shown as having two banks A and B.

As shown in FIGS. 6 and 13, the B bank of the 1-4 storage unit comprises two control relays 1-4BT and 1-4BD, two route storage relays 1-4B1 and 1-4B2, and three tangent acceleration code storage relays B1TAC, B2TAC and B3TAC.

Relay 1-4BT has a pickup circuit extending from terminal B of the battery in bank A of the 1-8 storage unit (FIG. 12), over front contact $g$ of relay 1-8AD, back contact $d$ of relay 1-8AT, back contact $b$ of relay 1-8AL, terminal $a$ of the A bank of the 1-8 storage unit, lead 112, terminal $d$ of switch control unit 1-8WC (FIG. 4), back contact $e$ of relay 1-8TR, front contact $c$ of relay 1-8NWP in the normal position of the switch, terminal $h$ of switch control 1-8WC, lead 113, terminal $b$ of the B bank of the 1-4 storage unit (FIG. 6), back contact $c$ of relay 1-4BD, and through the winding of relay 1-4BT to terminal N of the battery. Relay 1-4BT has a stick circuit extending from terminal B of the battery in the A bank of the 1-8 storage unit (FIG. 12), over front contact $g$ of relay 1-8AD to terminal $d$ of the A bank of the 1-8 storage unit, lead 114, lead 115 (FIG. 5), to terminal $a$ of the B bank of the 1-4 storage unit (FIG. 6), over front contact $a$ of relay 1-4BT, and through the winding of the relay to terminal N of the battery.

Relay 1-4BD (FIG. 6) has a pickup circuit extending from terminal B of the battery over front contact $c$ of relay 1-4BT, through the winding of relay 1-4BD, and in multiple over back contact $c$ of relay 1-4AT and back contact $d$ of relay 1-4AD to terminal N of the battery. Relay 1-4BD has a stick circuit which extends from terminal B of the battery over its own front contact $a$, through the winding of the relay, and in multiple over back contact $c$ of relay 1-4AT and back contact $d$ of relay 1-4AD to terminal N of the battery. Relay 1-4BD is made relatively slow to release as indicated schematically in the drawing.

Relay 1-4B1 (FIG. 6) has a pickup circuit extending from terminal B of the battery over the multiple energizing circuit for lead 110 in the A bank of the 1-8 storage unit (FIG. 12), previously described, to terminal $h$ of the A bank of the 1-8 storage unit, such that lead 110 and terminal $h$ are connected to terminal B of the battery when it is desired to reverse either switch 1-4W or 5-8W, from terminal $h$ of the A bank of the 1-8 storage unit over lead 110; lead 118 (FIG. 5), to terminal $d$ of the B bank of the 1-4 storage unit (FIG. 6), over front contact $e$ of relay 1-4BT, through the winding of relay 1-4B1, and over front contact $e$ of relay 1-4BD to terminal N of the battery. Relay 1-4B1 has a stick circuit extending from terminal B of the battery over its own front contact $a$, through the winding of the relay, and over front contact $e$ of relay 1-4BD to terminal N of the battery.

Relay 1-4B2 (FIG. 13) has a pickup circuit extending from the multiple energizing circuit for lead 111 in storage bank A of the 1-8 storage unit (FIG. 12), previously described, which connects terminal B of the battery to lead 111 to indicate a reverse setting of the selected terminal swtich 1-2W through 1-8W when any route to even tracks 2T, 4T, 6T and 8T is selected, over lead 111 from terminal $i$ of the A bank of the 1-8 storage unit in FIG. 12 to lead 120 in FIG. 5, thence to terminal $e$ of the B bank of the 1-4 storage unit in FIG. 6, over front contact $f$ of relay 1-4BT, through the winding of relay 1-4B2 (FIG. 13), and over common bus 241 for the storage relays of the B bank and front contact $e$ of relay 1-4BD (FIG. 6) to terminal N of the battery. Relay 1-4B2 has a stick circuit extending from terminal B of the battery over its front contact $a$, through the winding of the relay, and over bus 241 and front contact $e$ of relay 1-4BD to terminal N of the battery.

The circuits just described comprise basic automatic switching apparatus which is conventionally supplied for the control of switches in a classification yard. The remaining relays in the B bank of the 1-4 storage unit perform additional functions which will be described below in connection with the particular functions performed.

The A bank of the 1-4 storage unit (FIGS. 6 and 13) comprises three control relays 1-4AT, 1-4AD and 1-4AL, two route storage relays 1-4A1 and 1-4A2, and three tangent acceleration code storage relays A1TAC, A2TAC and A3TAC.

Relay 1-4AT (FIG. 6) has a pickup circuit extending from terminal B of the battery in the B bank of the 1-4 storage unit over front contact $b$ of relay 1-4BD, back contact $b$ of relay 1-4BT, back contact $b$ of relay 1-4AD, and through the winding of relay 1-4AT to terminal N of the battery. Relay 1-4AT has a stick circuit extending from terminal B of the battery over front contact $b$ of relay 1-4BD in the B bank of the 1-4 storage unit, back contact $b$ of relay 1-4BT, its own front contact $a$, and through its winding to terminal N of the battery.

Slow release relay 1-4AD (FIG. 6) has a first pickup circuit extending from terminal B of the battery over normally closed contact $a$ of cancellation push button 1-4ACPB, front contact $b$ of relay 1-4AT, through the winding of relay 1-4AD, to terminal $u$ of the A bank of the 1-4 storage unit, over lead 121, lead 122 (FIG. 15), terminal $c$ of the B bank of the 1-2 phantom storage unit associated with group retarder 1-2GR, to terminal $d$ of the 1-2GR storage unit over either back contact $d$ of the relay 1-2GRBT or back contact $d$ of relay 1-2GRBD, to be described, from terminal $d$ over lead 124 to terminal $c$ of the 3-4 phantom storage location (FIG. 7) associated with group retarder 3-4GR, and over either back contact $b$ of relay 3-4GRBT or back contact $b$ of relay 3-4GRBD, to be described, to terminal N of the battery. Relay 1-4AD (FIG. 6) has a second pickup circuit extending from terminal B of the battery over normally closed contact $a$ of cancellation push button 1-4ACPB, front contact $b$ of relay 1-4AT, through the winding of relay 1-4AD to terminal $u$ of the A bank of the 1-4 storage unit, over lead 121, lead 123 and cable 289 (FIG. 15) to FIG. 8, where lead 123 is produced and connected to terminal $e$ of the B bank of the 1-2 storage location associated with switch 1-2W, over back contact $e$ of relay 1-2BT or back contact $e$ of relay 1-2BD, to be described, to terminal $d$ of the B bank of the 1-2 storage location, from terminal $d$ over lead 125 and cable 289 to FIG. 15, where lead 125 is produced, to terminal $c$ of the B bank of the 3-4 storage unit associated with switch 3-4W (FIG. 7), and over back contact $b$ of relay 3-4BT or back contact $b$ of relay 3-4BD to terminal N of the battery. Relay 1-4AD (FIG. 6) has a stick circuit over its own front contact $a$ which shunts contact $b$ of relay 1-4AT in the two pickup circuits previously traced. The remainder of the stick circuit is the same as for the two pickup circuits previously traced.

Transfer control relay 1-4AL (FIG. 6) has a pickup circuit extending from terminal B of the battery in switch control unit 1-4WC, over back contact $b$ of relay 1-4TR, terminal $d$ of switch control unit 1-4WC, terminal $x$ of the B bank of the 1-4 storage unit, over back contact $c$ of relay 1-4AD, and through the winding of relay 1-4AL to terminal N of the battery. Relay 1-4AL has a stick circuit which is the same as its previously traced pickup circuit except that its own front contact $a$ shunts contact $c$ of relay 1-4AD. Relay 1-4AL is made somewhat slow releasing as indicated to ensure the proper sequence of operation of the circuits controlled thereby.

Route storage relay 1-4A1 (FIG. 6) has a pickup circuit extending from terminal B of the battery over front contact $f$ of relay 1-4AT, front contact $b$ of relay 1-4B1, through the winding of relay 1-4A1, and over front contact $f$ of relay 1-4AD to terminal N of the battery. Relay 1-4A1 has a stick circuit extending from terminal B of the battery over its front contact *a*, through the winding of the relay, and over front contact *f* of relay 1–4AD to terminal N of the battery.

Route storage relay 1–4A2 (FIG. 13) has a pickup circuit extending from terminal B of the battery over front contact *f* of relay 1–4AT (FIG. 6), lead 253, front contact *b* of relay 1–4B2 (FIG. 13), through the winding of relay 1–4A2, and over bus 291 and front contact *f* of relay 1–4AD (FIG. 6) to terminal N of the battery. Relay 1–4A2 has a stick circuit extending from terminal B of the battery over bus 290 (FIG. 6), its own front contact *a*, through the winding of the relay, over bus 291, and over front contact *f* of relay 1–4AD (FIG. 6) to terminal N of the battery.

The remaining relays in the A bank of the 1–4 storage location perform functions other than switching functions and will be described below in connection with the circuits to which they pertain.

The 5–8 storage location associated with switch 5–8W (FIG. 5) is identical with the 1–4 location just described and accordingly only those elements of its circuits which are required to understand the interconnection of the units have been shown, the remainder being indicated schematically in block form.

The 1–2 storage location associated with switch 1–2W is illustrated (FIG. 8) as having two banks B and A. Bank B comprises a transfer control relay 1–2BT, a slow release storage detector relay 1–2BD, and a route storage relay 1–2B1.

Relay 1–2BT has a pickup circuit extending from terminal B of the battery in bank A of the 1–4 storage unit (FIG. 6), over front contact *g* of relay 1–4AD, back contact *e* of relay 1–4AT, back contact *b* of relay 1–4AL, terminal *v* of the A bank of the 1–4 storage unit, terminal *c* of unit 1–4WC, back contact *d* of relay 1–4TR, front contact *c* of relay 1–4NWP in the normal position of the switch, terminal *g* of unit 1–4WC, lead 126, lead 128 (FIG. 15), over cable 289 to FIG. 8, lead 128, terminal *b* of the A bank of the 1–2 storage unit, back contact *b* of relay 1–2BD, and through the winding of relay 1–2BT to terminal N of the battery. Relay 1–2BT has a stick circuit extending from terminal B of the battery in storage bank A of the 1–4 storage unit (FIG. 6), front contact *g* of relay 1–4AD, terminal *t* of the A bank of the 1–4 storage unit, lead 129, lead 131, lead 132 (FIG. 7), lead 299 (FIG. 15), cable 289 to FIG. 8, lead 299, terminal *a* of the 1–2 storage unit, and over front contact *a* of relay 1–2BT and through the winding of the relay to terminal N of the battery.

Slow release relay 1–2BD (FIG. 8) has a pickup circuit extending from terminal B of the battery over front contact *b* of relay 1–2BT, through the winding of relay 1–2BD, and over back contact *c* of relay 1–2AT and back contact *d* of relay 1–2AD in multiple to terminal N of the battery. Relay 1–2BD has a stick circuit extending from terminal B of the battery over its front contact *a* and through the winding of the relay over back contact *c* of relay 1–2AT and back contact *d* of relay 1–2AD in multiple to terminal N of the battery.

Relay 1–2B1 (FIG. 8) has a pickup circuit extending from terminal B of the battery in the A bank of the 1–4 storage unit (FIG. 13), over front contact *b* of relay 1–4A2, terminal *s* of the A bank of the 1–4 storage unit, lead 135, lead 137 (FIG. 14), lead 140 (FIG. 15), cable 289 to FIG. 8, lead 140, terminal *c* of the B bank of the 1–2 storage unit, over front contact *c* of relay 1–2BT, through the winding of relay 1–2B1, and over front contact *c* of relay 1–2BD to terminal N of the battery. Relay 1–2B1 has a stick circuit extending from terminal B of the battery over its own front contact *a*, through the winding of the relay, and over front contact *c* of relay 1–2BD to terminal N of the battery.

The A bank of the 1–2 storage unit (FIG. 8) comprises a transfer control relay 1–2AT, a slow release storage detector relay 1–2AD, a slow release locking relay 1–2AL, a route storage relay 1–2A1, and a cancellation push button 1–2CB.

Relay 1–2AT has a pickup circuit extending from terminal B of the battery in the B bank of the 1–2 storage unit over front contact *d* of slow release relay 1–2BD, back contact *d* of relay 1–2BT, back contact *f* of relay 1–2AD, in the A bank of the 1–2 storage unit, and through the winding of relay 1–2AT to terminal N of the battery. Relay 1–2AT has a stick circuit which extends from terminal B of the battery over front contact *d* of relay 1–2BD, back contact *d* of relay 1–2BT, front contact *e* of relay 1–2AT, and through the winding of the relay to terminal N of the battery.

Storage detection relay 1–2AD is a conventional relay, made slightly slow releasing in any conventional manner known in the art. It has a pickup circuit extending from terminal B of the battery over the normally closed contact of cancellation button 1–2CB, front contact *a* of relay 1–2AT, through the winding of the relay to terminal *c* of the A bank of the 1–2 storage unit, terminal *f* of switch control unit 1–2WC, and over front contact *e* of relay 1–2TR to terminal N of the battery. Relay 1–2AD has a second pickup circuit extending from terminal B of the battery over the normally closed contact of cancellation button 1–2CB, front contact *a* of relay 1–2AT, through the winding of the relay, and over front contact *b* of relay 1–2AL to terminal N of the battery. Relay 1–2AD has a pair of stick circuits which are the same as its previously traced pickup circuits except that its own front contact *a* shunts front contact *a* of relay 1–2AT.

Locking relay 1–2AL is made somewhat slow to release as indicated. It has a pickup circuit extending from terminal B of the battery in switch control unit 1–2WC (FIG. 8), back contact *c* of relay 1–2TR, terminal *d* of unit 1–2WC, terminal *e* of the A bank of the 1–2 storage unit, back contact *c* of relay 1–2AD, and through the winding of relay 1–2AL to terminal N of the battery. Relay 1–2AL has a stick circuit which is the same as its previously traced pickup circuit except that its own front contact *a* shunts back contact *c* of relay 1–2AD in the previously traced circuit.

Relay 1–2A1 (FIG. 8) has a pickup circuit extending from terminal B of the battery in the B bank of the 1–2 storage unit, front contact *b* of relay 1–2B1, front contact *d* of relay 1–2AT, through the winding of relay 1–2A1, and over front contact *e* of relay 1–2AD to terminal N of the battery. Relay 1–2A1 has a stick circuit which extends from terminal B of the battery over its own front contact *a*, through the winding of the relay, and over front contact *e* of relay 1–2AD to terminal N of the battery.

Switch storage units 3–4, 5–6, and 7–8, shown in FIGS. 7 and 5 are identical with the 1–2 storage unit just described, and accordingly no details of these units are shown, except for certain of the interconnecting circuits in the 3–4 storage unit in FIG. 7 which are included to facilitate an understanding of the operation of the apparatus of my invention.

While the apparatus described up to this point has been largely conventional, and its construction and operation have been described in the literature, a brief description of the normal operation of the switching system will be given in order to lay a basis for the later description of the additional functions which this equipment performs in the control system of my invention. For further details of the construction and operation of the automatic switching portion of the disclosed embodiment of my invention, reference should be had to the copending application for Letters Patent of the United States of John R. George and Sih Hsuin Tsiang, Serial No. 592,198, for Automatic Control of Railway Classification Yard Track Switches, filed on June 18, 1956, and assigned to the assignee of the present application, now Patent No. 2,863,992, issued December 9, 1958, and to Manual 517, entitled "Union" Automatic Switching for Classification Yards, published in January 1953 by Union Switch & Signal, Division of Westinghouse Air Brake Company, and the supplement thereto published June 21, 1955.

Before describing the operation of the automatic switching apparatus, however, the control circuits for the phantom locations associated with the group retarder will be described, since they operate in conjunction with the automatic switching units and affect the sequence of operations thereof.

Since all of the phantom locations may be identical, it will suffice to describe the 1–2 phantom location associated with group retarder 1–2GR. The use of the term "phantom" to describe these storage locations was derived from the fact that, previously, classification yard storage units have been associated with switch locations. Since these units are not associated with any switch, it has become customary to refer to them as phantom switch storage locations, or simply phantom locations. Reference is also made to the copending application for Letters Patent of the United States Serial No. 728,159, filed April 14, 1958, by Sih Hsuin Tsiang, for Information Transfer in Automatic Railroad Classification Yards, and assigned to the assignee of this present application, for additional illustration and description of such phantom storage locations.

Referring to FIGS. 15 and 16, the 1–2 phantom storage location is seen to comprise two banks, A and B. These banks control relays operating somewhat similarly to the switch storage location control relays, to receive and store information pertaining to a cut, to transfer it from one bank to the next when the next bank becomes available, and to cancel the information when it is no longer required.

Referring now to FIG. 15, the B bank of the 1–2 phantom location includes two control relays 1–2GRBT and 1–2GRBD. Also included in the B bank is a route storage relay 1–2GB1.

Relay 1–2GRBT (FIG. 15) has a pickup circuit which extends from terminal B of the battery over front contact g of relay 1–4AD (FIG. 6), back contact e of relay 1–4AT, back contact b of relay 1–4AL, terminal v of the A bank of the 1–4 storage location, terminal c of switch control unit 1–2WC, back contact d of track relay 1–4TR, front contact c of normal repeater relay 1–4NWP in the normal position of the switch, terminal g of units 1–4WC, lead 126, lead 127 (FIG. 15), terminal b of the B bank of the 1–2 phantom location, back contact c of relay 1–2GRBD, and through the winding of relay 1–2GRBT to terminal N of the battery. Relay 1–2GRBT has a stick circuit which extends from terminal B of the battery over front contact g of relay 1–4AD (FIG. 6), terminal t of the A bank of the 1–4 storage location, lead 129, lead 131 (FIG. 7), lead 132, lead 134 (FIG. 15), terminal a of the B bank of the 1–2 phantom location, and over its own front contact a and through its winding to terminal N of the battery.

Relay 1–2GRBD (FIG. 16) has a pickup circuit which extends from terminal B of the battery over front contact c of relay 1–2GRBT, through the winding of the relay, lead 948, and over back contact c of relay 1–2GRAT (FIG. 16) and back contact d of relay 1–2GRAD, to be described, in multiple to terminal N of the battery. Relay 1–2GRBD has a stick circuit which extends from terminal B of the battery over its own front contact a, through the winding of the relay, lead 948, and over back contact c of relay 1–2GRAT and back contact d of relay 1–2GRAD in multiple to terminal N of the battery.

Storage relay 1–2GB1 (FIG. 15) has a pickup circuit extending from terminal B of the battery over front contact b of relay 1–4A2 (FIG. 13), terminal s of the A bank of the 1–4 storage location, lead 135, lead 137 (FIG. 14), lead 139 (FIG. 15), terminal e of the B bank of the 1–2 phantom location, front contact e of relay 1–2GRBT, through the winding of relay 1–2GB1, and over front contact e of relay 1–2GRBD to terminal N of the battery. Relay 1–2GB1 has an obvious stick circuit including its own front contact a and front contact e of relay 1–2GRBD.

From the above description, it will be apparent that relay 1–2GRBT is picked up when the preceding switch 1–4W is in its normal position, detector track section 1–4T is occupied, information is stored in the A bank of the 1–4 storage location, and the B bank of the 1–2 phantom location is available, as indicated by the deenergized condition of relay 1–2GRBD. Once 1–2GRBT is picked up, relay 1–2GRBD may be picked up if either there is no information stored in the A bank of the 1–2 phantom location, or information is stored in this bank and its storage has been completed as indicated by the denergized condition of relay 1–2GRAT. Relay 1–2GB1 will be picked up if the corresponding route storage relay 1–4A2 in the A bank of the preceding switch storage location is picked up, and relays 1–2GRBT and 1–2GRBD are picked up.

The A bank of the 1–2 phantom location (see FIG. 16) includes control relays 1–2GRAT, 1–2GRAD, 1–2GRADP and route storage relay 1–2GA1.

Relay 1–2GRAT (FIG. 16) has a pickup circuit extending from terminal B of the battery over front contact b of relay 1–2GRBD (FIG. 15), back contact b of relay 1–2GRBT, lead 949, back contact b of relay 1–2GRAD (FIG. 16), and through the winding of relay 1–2GRAT to terminal N of the battery. Relay 1–2GRAT has a stick circuit extending from terminal B of the battery over front contact b of relay 1–2GRBD, back contact b of relay 1–2GRBT, lead 949, its own front contact a, and through its winding to terminal N of the battery.

Relay 1–2GRAD has a pickup circuit extending from terminal B of the battery over normally closed contact a of cancellation push button 1–2GACB (FIG. 16), front contact b of relay 1–2GRAT, through the winding of 1–2GRAD, and over alternate paths, a first extending over back contact a of relay 1–2GRADP to terminal N of the battery, and a second extending from terminal b of the A bank of the 1–2 phantom location over front contact a of relay CL4TP to terminal N of the battery. Relay 1–2GRAD has a stick circuit which is the same as its previously traced pickup circuit except that it includes its own front contact a in shunt around front contact b of relay 1–2GRAT.

Relay 1–2GRADP has a pickup circuit extending from terminal B of the battery over front contact c of relay 1–2GRAD, terminal a of the A bank of the 1–2 phantom location, lead 142, front contact b of relay CL4TP, lead 141, terminal c of the A bank of the 1–2 phantom location, and through the winding of relay 1–2GRADP to terminal N of the battery. Relay 1–2GRADP has a stick circuit extending from terminal B of the battery over front contact c of relay 1–2GRAD, its own front contact b, and through its winding to terminal N of the battery.

Relay 1–2GA1 has a pickup circuit extending from terminal B of the battery over front contact e of relay 1–2GRAT (FIG. 16), lead 370 front contact b of relay 1–2GB1 (FIG. 15), lead 468, front contact d of relay 1–2GRAT (FIG. 16), through the winding of relay 1–2GA1, and over front contact e of relay 1–2GRAD to terminal N of the battery. Relay 1–2GA1 has a stick circuit extending from terminal B of the battery over its own front contact a, through its winding, and over front contact e of relay 1–2GRAD to terminal N of the battery.

From the above description it will be apparent that relay 1–2GRAT is picked up, if the A bank is available for storage as indicated by the deenergized condition of relay 1–2GRAD, if there is information stored in the B bank, as indicated by the energized condition of relay 1–2GRBD, and if the storage of this information is complete, as indicated by the deenergized condition of relay 1-2GRBT. Relay 1-2GRAD is picked up if relay 1-2GRAT is picked up and relay 1-2GRADP is released, or if section CL4T is occupied. When section CL4T is occupied after relay 1-2GRAD is picked up, relay 1-2GRADP is picked up and is held up as long as relay 1-2GRAD is held up. Relay 1-2GA1 will also be held up as long as relay 1-2GRAD is held up. Since relay 1-2GRAD will remain up as long as section CL4T is occupied, it will be apparent that the information stored in the A bank of the phantom locations is not cancelled until a cut has occupied and then vacated section CL4T. In order to describe the operation of the switching circuits, it will be assumed that relay 1-8AL (FIG. 12) is deenergized, all of the route relays in each of the banks are deenergized, and relay 1-8CT (FIG. 11) is energized over its pickup circuit extending from terminal B of the battery over back contacts $a$, in multiple, of relays 1-8BT and 1-8BD and through the winding of relay 1-8CT to terminal N of the battery. It will also be assumed that switch control units 1-8WC (FIG. 4), 1-4WC (FIG. 6), 5-8WC (FIG. 5), 1-2WC (FIG. 8), 3-4WC (FIG. 7), 5-6WC (FIG. 5) and 7-8WC (FIG. 5) are in their normal conditions with the switches in their normal positions, the track relays picked up, the RWP relays released, and the WP and NWP relays energized over their previously traced circuits as shown. All of the relays in the storage units following the 1-8 storage unit are deenergized as shown.

With the conditions above assumed, further assume that it is desired to route a cut through the yard to track 2T. For this purpose, button 2PB in FIG. 11 will be briefly depressed. As push button 2PB is depressed, the previously described pickup circuit for relay 1-8C2C is completed at front contact $a$ of push button 2PB. As previously noted, this circuit extends from terminal B of the battery over back contact $d$ of relay 1-8CD, back contact $b$ of relay 1-8BT, back contact $a$ of push button 1PB, front contact $a$ of push button 2PB, back contact $a$ of relay 1-8C2C, through the winding of the relay, over front contact $b$ of relay 1-8CT, which is energized as previously described, and over back contact $a$ of relay 1-8CSC to terminal N of the battery. Relay 1-8C2C immediately picks up and sticks over its stick circuit previously traced, which includes its own front contact $a$, front contact $b$ of relay 1-8CT, and back contact $a$ of relay 1-8CSC.

With relay 1-8C2C picked up, relay 1-8CD picks up over its previously traced circuit extending from battery terminal B over front contact $c$ of relay 1-8C2C and through the winding of relay 1-8CD to terminal N of the battery.

With relay 1-8CD picked up, the previously traced pickup circuit for relay 1-8BT, extending from terminal B of the battery over front contact $e$ of relay 1-8CD, back contact $c$ of relay 1-8BD, and through the winding of relay 1-8BT to terminal N of the battery, will be completed and relay 1-8BT will pick up. Relay 1-8BT will stick up, as long as push button 2PB remains depressed over its first previously traced stick circuit including front contact $b$ of push button 2PB and front contact $d$ of relay 1-8BT. It is also held up over its stick circuit extending from terminal B of the battery over front contact $e$ of relay 1-8CD, front contact $c$ of relay 1-8BT and through the winding of the relay to terminal N of the battery.

With relay 1-8BT up, relay 1-8BD can pick up over its previously traced circuit extending from terminal B of the battery over back contact $d$ of relay 1-8BSC, front contact $f$ of relay 1-8BT, through the winding of relay 1-8BD, and over back contacts $b$ of relays 1-8AT and 1-8AD in multiple to terminal N of the battery.

With both relays 1-8BT and 1-8BD picked up, the previously traced energizing circuit for relay 1-8CT is interrupted in the open back points of contacts $a$ of relay 1-8BT and 1-8BD and relay 1-8CT accordingly releases at the end of its predetermined time delay. However, before relay 1-8CT releases and releases relay 1-8C2C by opening its front contact $b$, the previously traced pickup circuit for relay 1-8B2C in the B bank is completed. This circuit extends from terminal B of the battery over front contact $e$ of relay 1-8BT, front contact $b$ of relay 1-8C2C, back contact $a$ of relay 1-8B2C, through the winding of the relay, and over front contact $h$ of relay 1-8BD to terminal N of the battery. As soon as relay 1-8B2C picks up, it sticks up over its previously traced stick circuit including its own front contact $a$ and front contact $h$ of relay 1-8BD.

When relay 1-8CT releases, relay 1-8C2C is released by the interruption of its previously traced stick circuit at the open front point of contact $b$ of relay 1-8CT. The energizing circuit for relay 1-8CD is interrupted at the open front point of contact $c$ of relay 1-8C2C, and relay 1-8CD accordingly drops out after its predetermined time delay.

When relay 1-8CD releases, the previously traced second stick circuit for relay 1-8BT is interrupted at the open front point of contact $e$ of relay 1-8CD. Since its first stick circuit is interrupted at the open front point of contacts $b$ of the push buttons 1PB through 8PB, and its pickup circuit is interrupted at the open back point of contact $c$ of relay 1-8BP, relay 1-8BT will now release.

With relay 1-8BT released, the previously traced energizing circuit for relay 1-8CT is completed from terminal B of the battery over back contact $a$ of relay 1-8BT and through the winding of relay 1-8CT to terminal N of the battery. The apparatus of the C bank of the 1-8 storage unit is now restored to its initial condition.

With relay 1-8BD picked up and relay 1-8BT released, relay 1-8AT (FIG. 12) can now pick up over its energizing circuit extending from terminal B of the battery over front contact $f$ of relay 1-8BD (FIG. 11), back contact $g$ of relay 1-8BT, back contact $a$ of relay 1-8AD (FIG. 12), and through the winding of the relay to terminal N of the battery. When relay 1-8AT picks up, it is held up over its previously traced stick circuit including front contact $f$ of relay 1-8BD (FIG. 11), back contact $g$ of relay 1-8BT, front contact $a$ of relay 1-8AT (FIG. 12), and through the winding of the relay to terminal N of the battery.

With relay 1-8AT picked up, relay 1-8AD (FIG. 12) can pick up over its previously traced pickup circuit extending from terminal B of the battery over normally closed contact $a$ of cancellation button 1-8ACB, back contact $c$ of relay 1-8ASC, front contact $c$ of relay 1-8AT, through the winding of relay 1-8AD, terminal $b$ of the A bank of the 1-8 storage unit, over lead 106, to terminal $c$ of the B bank of the 5-8 storage unit (FIG. 5) and over back contacts $b$ of relays 5-8BT and 5-8BD in multiple to terminal $m$ of the B bank, over lead 107 to terminal $c$ of the B bank of the 1-4 storage unit (FIG. 6), and over back contact $d$ of relays 1-4BT and 1-4BD in multiple to terminal N of the battery.

With relays 1-8AT and 1-8AD up, relay 1-8A2C (FIG. 12) can pick up over its previously traced circuit including front contact $f$ of relay 1-8AT, front contact $b$ of relay 1-8B2C (FIG. 11), back contact $a$ of relay 1-8A2C (FIG. 12), through the winding of the relay, and over front contact $i$ of relay 1-8AD to terminal N of the battery. As soon as relay 1-8A2C picks up, it sticks up over its previously traced stick circuit including its front contact $a$ and front contact $i$ of relay 1-8AD.

At the time relay 1-8AD picks up, the stick circuit for relay 1-8BD (FIG. 11) previously traced, including back contact $d$ of relay 1-8BSC, front contact $e$ of relay 1-8BD, and back contacts $b$ of relays 1-8AT (FIG. 12) and 1-8AD, is open at both the back points of contacts $b$ of relays 1-8AT and 1-8AD. Accordingly, relay 1-8BD will release at the end of its predetermined time delay period and open the previously traced circuit for relay 1-8AT at the open front point of contact *f* of relay 1-8BD and relay 1-8AT drops away. The release of relay 1-8BD interrupts the previously traced stick circuit for relay 1-8B2C at the open front point of contact *h* of relay 1-8BD. The B bank of the storage unit is now in condition to receive another transfer.

With relay 1-8A2C held up as described, lead 111 is energized over its previously traced energizing circuit including front contact *c* of relay 1-8A2C, and lines 109 and 110 are deenergized, in the code pattern 001; which indicates that the first two switches 1-8W and 1-4W are to be set in their normal positions, and that the third switch 1-2W is to be set in its reverse position. The first route storage relay 1-8A1 in the A bank of the 1-8 storage unit accordingly remains deenergized, and with relay 1-8AT down, relay 1-8AD up, and relay 1-8A1 down, the previously traced circuit for insuring that switch 1-8W is set to its normal position is completed. The circuit will not be traced in detail, since it has been described in the discussion of switch control unit 1-8WC.

The information on leads 110 and 111, consisting, it will be recalled, of the deenergized condition of lead 110 and the energized condition of lead 111 by reason of its connection to terminal B of the battery over front contact *c* of relay 1-8A2C, is in condition to be transferred to the selected storage unit associated with the next switch, after switch 1-8 has been positioned and the appropriate repeater relay has been energized. However, in order to keep this transfer in step with progress of the car, it is delayed until detector track section 1-8T is occupied by the cut.

When the cut enters section 1-8T (FIG. 4), shunting track relay 1-8TR, a circuit is completed for relay 1-4BT (FIG. 6) which extends from terminal B of the battery in the A bank of the 1-8 storage unit (FIG. 12) over front contact *g* of relay 1-8AD, back contact *d* of relay 1-8AT, back contact *b* of relay 1-8AL, terminal *a*, lead 112, back contact *e* of track relay 1-8TR (FIG. 4), front contact *c* of relay 1-8NWP, which is picked up at this time to indicate the normal position of the switch, lead 113, back contact *c* of relay 1-4BD in the B bank of the 1-4 storage unit (FIG. 6), and through the winding of relay 1-4BT to terminal N of the battery. It will be noted that, had switch 1-8 been set to the reverse position, the circuit previously traced could be traced from back contact *e* of relay 1-8TR (FIG. 4) over front contact *c* of relay 1-8RWP to terminal *g* of unit 1-8WC, from terminal *g* of relay 1-8WC over lead 292 to terminal *b* of the B bank of the 5-8 storage unit, and thence over back contact *a* of relay 5-8BD and through the winding of relay 5-8BT to terminal N of the battery. Accordingly the T relay of the storage unit for the switch in advance of a given switch which is selected by the position of the given switch is picked up to direct the remaining bits of the route storage code to the proper storage unit.

With relay 1-4BT picked up, relay 1-4BD is picked up over a circuit extending from terminal B of the battery over front contact *c* of relay 1-4BT, through the winding of relay 1-4BD, and over either back contact *c* of relay 1-4AT or back contact *d* of relay 1-4AD to terminal N of the battery. The previously traced stick circuit for relay 1-4BD, including its own front contact *a* and back contacts *c* of relay 1-4AT and *d* of 1-4AD in multiple, is completed as soon as relay 1-4BD is picked up.

With relays 1-4BT and 1-4BD picked up (FIG. 6), the information stored in the A bank of the 1-8 storage unit (FIG. 12) can be transferred to the B bank of the 1-4 storage unit (FIGS. 6 and 13). Lead 110 at terminal *h* (FIG. 12) of the A bank of the 1-8 storage unit, which is not energized from terminal B of the battery in the example under consideration, has a first branch 117 (FIG. 5) connected to terminal *d* of the B bank of the 5-8 storage unit, which is open circuited at the open front point of contact *c* of relay 5-8BT, and a second branch 118 which is connected to terminal *d* of the B bank of the 1-4 storage unit (FIG. 6), and thence, over front contact *e* of relay 1-4BT, through the winding of relay 1-4B1 and over front contact *e* of relay 1-4BD to terminal N of the battery. Since lead 110 is not connected to terminal B of the battery, however, relay 1-4B1 remains deenergized.

Lead 111 at terminal *i* of the A bank of the 1-8 storage unit (FIG. 12) is connected to terminal B of the battery over front contact *c* of relay 1-8A2C, and has two branches (FIG. 5); one branch 119 being connected to terminal *e* of the B bank of the 5-8 storage unit and to an open circuit at the open front point of contact *d* of relay 5-8BT, and a second branch 120 which is connected to terminal *e* of the 1-4 storage unit (FIG. 6), and thence over front contact *f* of relay 1-4BT, through the winding of relay 1-4B2 (FIG. 13), lead 241, and over front contact *e* of relay 1-4BD (FIG. 6) to terminal N of the battery. Since lead 111 is energized from terminal B of the battery, relay 1-4B2 picks up and sticks up over its previously traced stick circuit including its own front contact *a* and front contact *e* of relay 1-4BD.

It will be noted that as soon as relays 1-4BT and 1-4BD pick up, to permit the transfer just described to the B bank of the 1-4 storage unit (FIGS. 6 and 13), the previously traced stick circuit for relay 1-8AD (FIG. 12) is interrupted at the open back points of contacts *d* of relays 1-4BT and 1-4BD (FIG. 6). Accordingly, at the end of its predetermined time delay, which is designed to be sufficient to permit the information transfer to take place, relay 1-8AD (FIG. 12) will release and will open its front contact *i*, interrupting the stick circuit for relay 1-8A2C. The A bank of the 1-8 storage unit is thus returned to its initial condition and is in condition to receive another route code.

The stick circuit for relay 1-4BT (FIG. 6), previously traced, extends from terminal B of the battery over front contact *g* of relay 1-8AD (FIG. 12), over leads 114 and 115 (FIG. 5) and front contact *a* of relay 1-4BT (FIG. 6), through the winding of the relay, and thence to terminal N of the battery. Accordingly, when relay 1-8AD releases at the end of its time delay period relay 1-4BT will release, due to the opening of its stick circuit at the open front point of contact *g* of relay 1-8AD.

With relay 1-4BT released and relay 1-4BD picked up (FIG. 6), a pickup circuit for relay 1-4AT is completed from terminal B of the battery over front contact *b* of relay 1-4BD, back contact *b* of relay 1-4BT, back contact *b* of relay 1-4AD, and through the winding of relay 1-4AT to terminal N of the battery. With relay 1-4AT picked up, it is held up over its previously traced stick circuit including its own front contact *a*, back contact *b* of relay 1-4BT, and front contact *b* of relay 1-4BD.

The previously traced pickup circuit for relay 1-4AD is also completed at this time, extending it will be recalled, from terminal B of the battery over normally closed contact *a* of cancellation button 1-4ACB, front contact *b* of relay 1-4AT, through the winding of relay 1-4AD to terminal *u* of the A bank of the 1-4 storage unit, over lead 121 (FIG. 15) and from lead 121 over two parallel paths, the first extending over lead 122 to terminal *c* of the 1-2 phantom storage location associated with group retarder 1-2GR, to be described, back contacts *d* of relays 1-2GRBT and 1-2GRBD in multiple, terminal *d* of the 1-2 phantom storage bank, and over lead 124 to terminal *c* of the 3-4 phantom storage B bank (FIG. 7), and thence over back contacts *b* of relays 3-4GRBT and 3-4GRBD in multiple to terminal N of the battery. The second circuit path from lead 121 (FIG. 15) extends over lead 123, cable 289 lead 123 (FIG. 8), terminal *e* of the B bank of the 1-2 storage unit, over back contacts *e* of relays 1-2BT and 1-2BD in multiple to terminal *d* of the 1-2 storage unit, over lead 125 to cable 289 and thence to FIG. 15, lead 125 from FIG. 15 to terminal *c* of the B bank of the 3-4 storage unit (FIG. 7), and over back contacts *b* of relays 3–4BT and 3–4BD in multiple to terminal N of the battery.

The phantom storage location and the switch storage location following the group retarder associated with each route receive information in parallel from the switch storage unit associated with the switch preceding the group retarder in the route. Accordingly, the purpose of the two paths previously traced in the pickup and holding circuits for relay 1–4AD is to insure that both the phantom location and the switch storage location have completed the receipt of the information from the preceding switch location before the D relay, in this case relay 1–4AD, is allowed to release.

With relays 1–4AT and 1–4AD picked up (FIG. 6), the previously traced transfer circuits for relays 1–4A1 and 1–4A2 (FIGS. 6 and 13) are prepared by the closing of front contacts $f$ of relays 1–4AT and 1–4AD. Since relay 1–4B1 is deenergized, the circuit for relay 1–4A1 will be open at the open front point of contact $b$ of relay 1–4B1, and 1–4A1 will accordingly remain deenergized. The circuit for relay 1–4A2 (FIG. 13) is completed over closed front contact $b$ of relay 1–4B2 and relay 1–4A2 is picked upon and held up over its previously traced stick circuit including its own front contact $a$ and front contact $f$ of relay 1–4AD (FIG. 6).

When relay 1–4AD (FIG. 6) picked up as previously described, the previously traced circuit for relay 1–4BD was opened at the open back points of contact $c$ of relay 1–4AT and $d$ of relay 1–4AD. Accordingly, at the end of its predetermined time delay, which is made sufficient to permit the previously described transfer, relay 1–4BD is released, and opens the circuits for relays 1–4B1 and 1–4B2 at the open front point of its contact $e$. The B bank of the 1–4 storage unit is thus restored to its initial condition, in which it is adapted to receive additional information.

With relay 1–4BD down, the previously traced holding circuit for relay 1–4AT is interrupted at the open front point of contact $b$ of relay 1–4BD, and relay 1–4AT is accordingly released.

With relay 1–4AT released and relay 1–4AD held up, a circuit is completed as previously described for ensuring that switch 1–4W is in its normal position, or for setting it to its normal position. This circuit extends from terminal B of the battery over contact A of manual controller 1–4MC, in its automatic position, to terminal $e$ of switch control 1–4WC, terminal $w$ of the A bank of the 1–4 storage unit, front contact $e$ of relay 1–4AD, back contact $d$ of relay 1–4AT, back contact $b$ of relay 1–4A1, lead 104, terminal $b$ of the A bank of the 1–4 storage unit (FIG. 13), lead 104, terminal $b$ of the 1–4WC unit (FIG. 6), front contact $b$ of relay 1–4WP, front contact $c$ of relay 1–4TR, through the normal magnet NW, and through circuit controller E to terminal N of the battery unless switch 1–4W is in its normal position or close enough thereto to be under the control of the spring action of switch machine 1–4SM.

When the cut occupies detector track section 1–4T (FIG. 6), relay 1–4TR is released. Since switch 1–4W is in its normal position, it is desired to energize the T relays in the B banks of the 1–2 switch storage location and the 1–2 phantom storage location associated with group retarder 1–2GR. The circuit for this purpose extends from terminal B of the battery over front contact $g$ of relay 1–4AD, back contact $e$ of relay 1–4AT, back contact $b$ of relay 1–4AL, terminal $v$ of the A bank of the 1–4 storage location, terminal $c$ of unit 1–4WC, back contact $d$ of relay 1–4TR, front contact $c$ of normal repeater relay 1–4NWP, terminal $g$ of unit 1–4WC, lead 126, and over a first branch (FIG. 15) including lead 127, terminal $b$ of the B bank of the 1–2 phantom storage unit, back contact $c$ of relay 1–2GRBD, and through the winding of relay 1–2GRBT to terminal N of the battery, and over a second path from lead 126 including lead 128, cable 289, lead 128 (FIG. 8), terminal $b$ of the B bank of the 1–2 storage location, back contact $b$ of relay 1–2BD, and through the winding of relay 1–2BT to terminal N of the battery. Relays 1–2GRBT and 1–2BT accordingly pick up.

With relay 1–2GRBT picked up (FIG. 15), the previously traced pickup circuit for relay 1–2GRBD is completed, which circuit extends from terminal B of the battery over front contact $c$ of relay 1–2GRBT, through the winding of relay 1–2GRBD, and over either back contact $c$ of relay 1–2GRAT or back contact $d$ of relay 1–2GRAD (FIG. 16) to terminal N of the battery.

With relays 1–2GRBT and 1–2GRBD picked up, the circuit is completed for the transfer of information to route storage relay 1–2GB1 (FIG. 15). This circuit extends from terminal B of the battery in the A bank of the 1–4 storage location (FIG. 13), over front contact $b$ of relay 1–4A2, to terminal $s$ of the A bank of the 1–4 storage location, over leads 135, 137 (FIG. 14) and 139 (FIG. 15) to terminal $e$ of the B bank of the 1–2 phantom storage location, over front contact $e$ of relay 1–2GRBT, through the winding of relay 1–2GB1, and over front contact $e$ of relay 1–2GRBD to terminal N of the battery. Relay 1–2GB1 is picked up, since relay 1–4A2 is picked up, and is held up over its previously traced stick circuit including its front contact $a$ and front contact $e$ of relay 1–2GRBD.

With relay 1–2BT (FIG. 8) picked up in the B bank of the 1–2 storage location, the previously traced circuit for relay 1–2BD, including front contact $b$ of relay 1–2BT, the winding of relay 1–2BD, and back contact $c$ of relay 1–2AT and back contact $d$ of relay 1–2AD in multiple, is completed and relay 1–2BD is picked up. When picked up, relay 1–2BD is held up over its previously traced stick circuit including its own front contact $a$ and either back contact $c$ of relay 1–2AT or back contact $d$ of relay 1–2AD.

With relays 1–2BT and 1–2BD both up, a circuit is completed for the transfer of information to storage relay 1–2B1. This circuit extends from terminal B of the battery in the A bank of the 1–4 storage location (FIG. 13) over front contact $b$ of relay 1–4A2, to terminal $s$ of the A bank of the 1–4 location, and thence over leads 135, 137 (FIG. 14), lead 140 (FIG. 15), cable 289, and lead 140 (FIG. 8) to terminal $c$ of the B bank of the 1–2 storage location, over front contact $c$ of relay 1–2BT, through the winding of relay 1–2B1, and over front contact $c$ of relay 1–2BD to terminal N of the battery. Relay 1–2B1 accordingly picks up and is held up over its stick circuit including its own front contact $a$ and front contact $c$ of relay 1–2BD.

As soon as relays 1–2BT and 1–2BD in the 1–2 storage location (FIG. 8) and relays 1–2GRBT and 1–2GRBD in the 1–2 phantom storage location (FIG. 15) are all up, the previously traced holding circuit for relay 1–4AD (FIG. 6) is interrupted at the open back contacts $e$ of relays 1–2BT and 1–2BD, and is interrupted in the parallel branch at the open back points of contacts $d$ of relays 1–2GRBT and 1–2GRBD. Accordingly, at the end of its predetermined time delay, which is made long enough to permit the previously described transfer, relay 1–4AD is released.

With relay 1–4AD released, the circuits for storage relays 1–4A1 and 1–4A2 (FIGS. 6 and 13) are interrupted at the open front point of contact $f$ of relay 1–4AD (FIG. 6), and any of these relays which were energized, are released. In the case under consideration, relay 1–4A2 will be released.

If section 1–4T is still occupied when relay 1–4AD is released, which would be a normal condition, relay 1–4AL will pick up over a circuit extending from terminal B of the battery in unit 1–4WC (FIG. 6), over back contact $b$ of relay 1–4TR, to terminal $d$ of unit 1–4WC and terminal $x$ of the A bank of the 1–4 storage location, and thence over back contact $c$ of slow release relay 1–4AD and through the winding of relay 1–4AL to terminal N of the battery. Relay 1–4AL will then hold up over a stick circuit which is the same as its previously traced pickup circuit except that it includes its own front contact *a* in shunt around contact *c* of relay 1–4AD.

It will be recalled that back contact *b* of relay 1–4AL was in the pickup circuits for the succeeding T relays of the phantom storage locations and switch storage locations. Accordingly, the pickup of relay 1–4AL will prevent a second transfer to these units as long as section 1–4T is occupied. As soon as section 1–4T becomes unoccupied, the circuit for relay 1–4AL will be interrupted at the open back point of contact *b* of relay 1–4TR, and at the end of its predetermined time delay, relay 1–4AL will be released and the A bank of the 1–4 storage location will be restored to its normal condition and become available for a subsequent transfer of information to succeeding units. It should be noted that the A bank of the 1–4 storage location is available for a storage input even though relay 1–4AL remains picked up, but the transfer of the stored information to succeeding storage locations cannot be made with relay 1–4AL picked up.

After relay 1–4AD is released, the previously traced stick circuits for relay 1–2GRBT in the phantom storage location (FIG. 15) and 1–2BT in the 1–2 switch storage location (FIG. 8) are interrupted. It will be recalled that the stick circuit for relay 1–2GRBT extended from terminal B of the battery in the A bank of the 1–4 storage location (FIG. 6) over front contact *g* of relay 1–4AD, terminal *t* of the A bank of the 1–4 location, over leads 129, 131 (FIG. 7), 132 and 134 (FIG. 15) to terminal *a* of the 1–2 phantom location, and thence over front contact *a* of relay 1–2GRBT and through the winding of the relay to terminal N of the battery. The corresponding stick circuit for relay 1–2BT extends from terminal B of the battery in the A bank of the 1–4 storage location over front contact *g* of relay 1–4AD (FIG. 6) to terminal *t* of the A bank and thence over leads 129, 131 (FIG. 7), 132, and 299 (FIG. 15), cable 289, lead 299 (FIG. 8), to terminal *a* of the B bank of the 1–2 storage location, and from terminal *a* over front contact *a* of relay 1–2BT and through the winding of the relay to terminal N of the battery. As soon as relay 1–4AD releases, the previously traced stick circuits for relays 1–2GRBT in the phantom location and 1–2BT in the switch storage location are interrupted at the open front point of contact *g* of relay 1–4AD in the A bank of the 1–4 storage unit. Accordingly, both these relays are released.

With relay 1–2GRBT released and relay 1–2GRBD energized (FIG. 15), relay 1–2GRAT (FIG. 16) can pick up over its previously traced circuit extending from terminal B of the battery over front contact *b* of relay 1–2GRBD, back contact *b* of relay 1–2GRBT, back contact *b* of relay 1–2GRAD, and through the winding of relay 1–2GRAT to terminal N of the battery. As soon as relay 1–2GRAT picks up, it is held up over its stick circuit including its own front contact *a*, back contact *b* of relay 1–2GRBT, and front contact *b* of relay 1–2GRBD.

We relay 1–2GRAT picked up, relay 1–2GRAD can pick up over its previously traced circuit extending from terminal B of the battery over normally closed contact *a* of cancellation button 1–2GACB, front contact *b* of relay 1–2GRAT, through the winding of the relay 1–2GRAD and over back contact *a* of relay 1–2GRADP to terminal N of the battery.

With relays 1–2GRAT and 1–2GRAD both up, the previously traced circuit for relay 1–2GRBD (FIG. 15) is interrupted at the open back point of contact *c* of relay 1–2GRAT (FIG. 16) and the open back point of contact *d* of relay 1–2GRAD, but relay 1–2GRBD does not release until the end of its predetermined time delay. In the meantime, the circuit for relay 1–2GA1 (FIG. 16) is completed, which circuit extends from terminal B of the battery over front contact *e* of relay 1–2GRAT, front cotact *b* of relay 1–2GB1 (FIG. 15), front contact *d* of relay 1–2GRAT, the winding of relay 1–2GA1, and over front contact *e* of relay 1–2GRAD to terminal N of the battery. Relay 1–2GA1 is accordingly picked up and held up over its stick circuit including its own front contact *a* and front contact *e* of relay 1–2GRAD.

At the end of its predetermined time delay, relay 1–2GRBD is released, opening the stick circuit for relay 1–2GB1 at contact *e* and opening the stick circuit for relay 1–2GRAT at the open front point of contact *b* of relay 1–2GRBD. Relay 1–2GRAT is accordingly released. With the release of relay 1–2GRBD, the B bank of the 1–2 phantom storage unit is restored to its initial condition and is adapted to receive an additional transfer.

When the cut occupies section CL4T (FIG. 7), relay CL4TR is released and relay CL4TP (FIG. 16) is picked up over an obvious circuit including back contact *a* of track relay CL4TR. When relay CL4TP is picked up, it completes the second previously traced stick circuit for relay 1–2GRAD (FIG. 16) at the front point of contact *a* of relay CL4TP (FIG. 16). The stored information in the A bank is thus retained as long as section CL4T is occupied.

The information represented by the energized or de-energized condition of relay 1–2GA1 of the A bank of the 1–2 phantom location is used to direct the operation of additional computer apparatus of the system of said copending application Serial No. 676,730 during the occupancy of section CL4T and will not be described herein as it forms no part of my present invention. After section CL4T has been vacated, the A bank is restored to its initial condition.

Returning now to the 1–2 storage bank (FIG. 8), with relay 1–2BT down and relay 1–2BD up, relay 1–2AT is energized over its previously traced pickup circuit extending from terminal B of the battery over front contact *d* of relay 1–2BD, back contact *d* of relay 1–2BT, back contact *f* of relay 1–2AD, and through the winding of relay 1–2AT to terminal N of the battery. Once relay 1–2AT is picked up, it is held up over its previously traced stick circuit including its own front contact *e*, back contact *d* of relay 1–2BT, and front contact *d* of relay 1–2BD.

With relay 1–2AT up, the previously traced pickup circuit for relay 1–2AD is completed. This circuit extends from terminal B of the battery over normally closed contact *a* of cancellation button 1–2CB, front contact *a* of relay 1–2AT, the winding of relay 1–2AD, terminal *c* of the A bank of the 1–2 storage location, terminal *f* of unit 1–2WC, and over front contact *e* of relay 1–2TR to terminal N of the battery. When relay 1–2AD picks up, it is held up over its first stick circuit which is the same as its pickup circuit except that it includes its own front contact *a* in shunt around contact *a* of relay 1–2AT.

With relays 1–2AT and 1–2AD both up, the previously traced stick circuit for relay 1–2BD is interrupted at the open back points of contact *c* of relay 1–2AT and contact *d* of relay 1–2AD. However, relay 1–2BD will not release until the end of its predetermined time delay period. In the meantime, relay 1–2A1 is picked up over its previously traced pickup circuit including front contact *b* of relay 1–2B1, front contact *d* of relay 1–2AT, the winding of the relay, and front contact *e* of relay 1–2AD. Relay 1–2A1 is then held up over its stick circuit including its own front contact *a* and front contact *e* of relay 1–2AD.

When relay 1–2BD drops away, relay 1–2B1 is released due to the opening of its stick circuit at front contact *c* of relay 1–2BD and relay 1–2AT is released due to the opening of its stick circuit at contact *d* of relay 1–2BD.

With relay 1–2AT released, relay 1–2AD picked up, and relay 1–2A1 picked up, the previously traced circuit for insuring that switch 1–2W is in its reverse position is completed from terminal B of the battery over terminal A of manual control 1–2MC in its automatic position, terminal e of switch control unit 1–2WC and terminal d of the A bank of the 1–2 storage location, front contact b of relay 1–2AD, back contact b of relay 1–2AT, front contact b of relay 1–2A1, terminal b of the A bank of the 1–2 storage location, terminal b of switch control unit 1–2WC, front contact a of relay 1–2WP, front contact b of relay 1–2TR, the winding of reverse magnet RW, and through circuit controller F to terminal N of the battery until the switch is moved to the position at which the spring action of switch machine 1–2SM will complete its movement to the reverse position. Reverse repeater relay 1–2RWP will then be picked up over its previously traced circuit which extends from terminal B of the battery through a suitable resistor, the upper winding of relay 1–2RWP, and over contact a of circuit controller F to terminal N of the battery. The picked up condition of relay 1–2RWP serves to actuate suitable indication circuits not shown.

When section 1–2T is occupied by the cut, the previously traced stick circuit for relay 1–2AD is interrupted at the open front point of contact e of relay 1–2TR. Relay 1–2AD accordingly releases at the end of its predetermined time delay period. Relay 1–2A1 is then released due to the interruption of its stick circuit at the open front point of contact e of relay 1–2AD.

If section 1–2T is still occupied when relay 1–2AD is released, which is the normal condition, relay 1–2AL is picked up over its previously traced circuit extending from terminal B of the battery over back contact c of track relay 1–2TR, terminal d of unit 1–2WC, terminal e of the A bank of the 1–2 storage location, back contact c of relay 1–2AD, and through the winding of relay 1–2AL to terminal N of the battery. When relay 1–2AL is picked up, it is held up over its stick circuit, which is the same as its pickup circuit except that its front contact a shunts contact c of relay 1–2AD.

With relay 1–2AL picked up, a second circuit for relay 1–2AD is completed over front contact b of relay 1–2AL, permitting relay 1–2AD to be picked up while section 1–2T is still occupied but preventing its release until section 1–2T has been unoccupied for a time in excess of the time delay of relay 1–2AL and again reoccupied. When section 1–2T becomes unoccupied, the apparatus is again restored to its initial condition.

*The Tangent Acceleration Code Transfer Circuits*

The transfer of the tangent acceleration code generated on lines 231, 232 and 233 in the storage cycle of panels 1RP through 6RP, as described above, will now be described. Referring briefly to FIG. 3 it will be seen that the tangent acceleration code is first transferred to three storage banks 54, 55 and 56 associated with the master retarder. The C bank 54 of the TAC storage unit associated with the master retarder comprises three storage relays 1CTAC, 2CTAC and 3CTAC (FIG. 3). These relays are energized from leads 231, 232 and 233, respectively, in an obvious manner by connecting the respective leads to one terminal of the winding of the respective relays and the other terminals of the relay windings to terminal N of the battery. Each of these relays is made slightly slow to release to insure that the circuits controlled by the relays will be closed for a sufficient length of time to perform their functions. Storage relays 1CTAC through 3CTAC have stick circuits including a common lead 363 from terminal B of the battery over front contact d of relay ATP (FIG. 2), and individual paths extending from this common lead over front contact a of each of the relays and through the winding of the relay to terminal N of the battery.

The B bank 55 of the TAC storage associated with the master retarder comprises three relays 1BTAC, 2BTAC and 3BTAC (FIG. 3). Each of these relays is made slightly slow to release in order to insure that its transfer circuit is closed for a sufficient time, as will appear. Each of these relays has a similar pickup circuit extending from terminal B of the battery over a back contact of relay R1TP (FIG. 2) and a front contact of the corresponding storage relay in the C bank previously described. For relay 1BTAC, the pickup circuit includes back contact b of relay R1TP, lead 364, and front contact b of relay 1CTAC. For relay 2BTAC, the pickup circuit includes back contact e of relay R1TP, lead 365, and front contact b of relay 2CTAC. The circuit for relay 3BTAC includes the back point of contact f of relay R1TP, lead 366, and front contact b of relay 3CTAC. Relays 1BTAC, 2BTAC and 3BTAC have similar stick circuits including a common path extending from terminal B of the battery over front contact f of relay R1TP, lead 367, and individual paths over front contacts a of each relay and through the winding of each relay to terminal N of the battery.

The A bank 56 of the TAC unit associated with the master retarder comprises three relays 1ATAC, 2ATAC and 3ATAC. Relay 1ATAC has a pickup circuit extending from terminal B of the battery over back contact d of relay GEC (FIG. 3), front contact b of relay 1BTAC, and through the winding of relay 1ATAC to terminal N of the battery. Relay 2ATAC has a pickup circuit extending from terminal B of the battery over back contact c of relay GEC, front contact b of relay 2BTAC, and through the winding of relay 2ATAC to terminal N of the battery. Relay 3ATAC has a pickup circuit extending from terminal B of the battery over back contact b of relay GEC, front contact b of relay 3BTAC, and through the winding of relay 3ATAC to terminal N of the battery. Relays 1ATAC through 3ATAC have similar stick circuits including a common path extending from terminal B of the battery over front contact b of relay R2TP (FIG. 3), and thence over the respective front contacts a and through the windings of the relays to terminal N of the battery.

The inforation from the A bank of the storage unit associated with the master retarder is transferred either to the B bank of the 1–4 storage location or the B bank of the 5–8 storage location according as switch 1–8 is set to its normal or to its reverse position. In order to explain the circuit for carrying out this function, reference should first be made to the B bank of the 1–4 storage location as shown in FIGS. 6 and 13.

Relays 1–4BT and 1–4BD in the 1–4 storage location, and their associated control circuits, have been described above in connection with the automtaic switching function. The TAC storage relays in this bank are relays B1TAC, B2TAC and B3TAC (FIG. 13).

It should be noted in FIG. 5 that, while all of the circuits in the B bank of the 5–8 storage unit are not shown, they are identical with the circuits for the B bank of the 1–4 storage location and the corresponding terminals a, b, c, d, e, g, h, and j are connected to corresponding circuit within the units. The additional terminal m on unit 5–8 is obviously not necessary in the 1–4 unit since the corresponding circuit in the 1–4 unit is terminated therewithin, as will be readily apparent from a comparison of FIGS. 5 and 6. Otherwise, the circuits are identical and only the circuits for the 1–4 unit will be described.

Relays B1TAC, B2TAC and B3TAC have similar pickup circuits extending from terminal B of the battery in FIG. 3 over front contacts b of relays 1ATAC, 2ATAC and 3ATAC, respectively, and over leads 243, 244 and 245, respectively, which are carried as a cable 246 to FIG. 12, where cable 246 branches into cables 368 and 369, each carrying parallel extensions of the same leads, and over leads 243, 244 and 245, respectively, to terminatls g, h and j, respectively, of the 1–4B bank, over the respective back points of make-before-break contacts a of relays B1TAC through B3TAC, respectively, through the winding of these relays to common lead 241, and from lead 241 over front contact *e* of relay 1–4BD to terminal N of the battery (FIG. 6). Each of relays B1TAC through B3TAC has a similar stick circuit extending from terminal B of the battery (FIG. 6) over common bus 242, the front point of contact *a* of each of the relays, through the winding of the relays, and over common lead 241 and front contact *e* of relay 1–4BD to terminal N of the battery.

The transfer circuits for the B bank of the 5–8 storage unit are similar to those shown for the B bank of the 1–4 storage location, and they will therefore be discussed only generally. The transfer lines for energizing terminals *g*, *h* and *j* of the B bank of the 1–4 unit to supply relays B1TAC through B3TAC correspond to similar circuits, referring first to FIG. 3, which extend from terminal B of the battery over front contacts *c* of relays 1ATAC, 2ATAC and 3ATAC, over leads 249, 250 and 251, respectively, through cable 252, to FIG. 5, and over the extension of leads 249, 250 and 251 to terminal *g*, *h* and *j* of the B bank of the 5–8 storage unit.

The A bank of the 1–4 storage unit comprises three TAC storage relays A1TAC, A2TAC and A3TAC (FIG. 13). Relays A1TAC through A3TAC have similar pickup circuits extending from terminal B of the battery over front contact *f* of relay 1–4AT (FIG. 6), previously described, a common bus 253, over front contacts *b* of each of the respective relays B1TAC through B3TAC, respectively, over the back point of make-before-break contact *a* of the respective relays A1TAC through A3TAC, through the windings of the respective relays, and over common lead 291 and front contact *f* of relay 1–4AD to terminal N of the battery (FIG. 6). Relays A1TAC through A3TAC have similar stick circuits extending from terminal B of the battery (FIG. 6) over battery bus 290, over the respective front points of contacts *a* of relays A1TAC through A3TAC, and through the winding of the respective relays to common lead 291 and thence over front contact *f* of relay 1–4AD to terminal N of the battery.

The TAC information stored in the A bank of the 1–4 storage unit is transferred to either the 1–2 phantom location or the 3–4 phantom location according as switch 1–4W is set to its normal or to its reverse position. Similarly, the TAC information stored in the A bank of 5–8 location is transferred either to the 5–6 phantom location or to the 7–8 phantom location according as switch 5–8W is set to its normal or to its reverse position. Since this latter transfer is identical with the transfer from the 1–4 storage location, only the transfer from the 1–4 storage location will be described, the transfer from the 5–8 location being indicated schematically by the dotted line 256 connecting the A bank of the 5–8 storage unit to the apparatus for tracks 5 and 6 and 7 and 8 shown in block form.

Referring again to the A bank of the 1–4 storage unit (FIG. 13), the TAC storage output circuits include a common portion extending from terminal B of the battery over bus 257 and individual circuit paths for each of the relays A1TAC through A3TAC extending over their respective front contacts *b* to terminals *r*, *q* and *k*, respectively. Terminals *r*, *q*, and *k* are therefore energized or not energized according to the energized or deenergized condition of the respective relays A1TAC through A3TAC, respectively.

Terminals *r*, *q* and *k* are connected over parallel paths to terminals *f*, *g* and *h*, respectively, of the B banks of the 1–2 phantom location and the 3–4 phantom location. The circuit from terminal *r* extends over leads 258, 259 and cable 260 to the B bank of the 3–4 phantom location, and extends over leads 258 and 261 to terminal *f* of the B bank of the 1–2 phantom location. A circuit from terminal *q* extends over leads 262 and 263 to cable 260 and thence to the B bank of the 3–4 phantom location, and over leads 262 and 264 to terminal *g* of the B bank of the 1–2 location. A circuit from terminal *k* extends over leads 265 and 266 and cable 260 to the B bank of the 3–4 phantom location, and over leads 265 and 267 to terminal *h* of the B bank of the 1–2 location.

Relays 1–2GRBT and 1–2GRBD in the B bank of the 1–2 phantom location (FIG. 15) have been previously described in connection with the automatic switching equipment. Also located in the B bank of this storage unit are three TAC storage relays B1TAC, B2TAC and B3TAC.

It will be recalled from the description of the automatic switching equipment that relays 1–2GRBT and 1–2GRBD are energized if switch 1–4W is set to its normal position upon the occupancy of detector section 1–4T, while relays 3–4GRBT and 3–4GRBD are energized if switch 1–4W is set to its reverse position. Therefore, although the code indications from relays A1TAC through A3TAC are applied simultaneously to terminals *f*, *g* and *h* of the 1–2 and 3–4 phantom locations, only the T and D relays of the selected storage bank are picked up at this time. Advantage is taken of this fact to route the TAC code to its proper location, as will appear.

Relays B1TAC through B3TAC in the B bank of the 1–2 phantom location (FIG. 15) have similar pickup circuits, including front contacts of relays A1TAC through A3TAC in the A bank of the 1–4 storage location and terminals *f*, *g* and *h*, respectively, of the B bank of the 1–2 phantom location, as previously described. The pickup circuit for relay B1TAC (FIG. 15) further includes front contact *f* of relay 1–2GRBT, the winding of the relay, and front contact *e* of relay 1–2GRBD which is connected to terminal N of the battery. Similarly, the circuits for relays B2TAC and B3TAC are continued from their respective terminals *g* and *h*, over front contacts *g* and *h*, respectively, of relay 1–2GRBT, through the windings of the relays, and over front contact *e* of relay 1–2GRBD to terminal N of the battery. Relays B1TAC through B3TAC have similar stick circuits, extending from terminal B of the battery over front contact *a* of each relay, through the winding of the relay, and over front contact *e* of relay 1–2GRBD to terminal N of the battery.

Relays 1–2GRAT, 1–2GRAD and 1–2GRADP in the A bank of the 1–2 phantom location (FIG. 16) have previously been described in connection with the automatic switching equipment. The A bank also includes three TAC storage relays A1TAC through A3TAC. These relays have common pickup circuits extending from terminal B of the battery over front contact *e* of relay 1–2GRAT (FIG. 16), lead 370, lead 371 (FIG. 15), over front contacts *b* of relays B1TAC through B3TAC and leads 372, 373 and 374, respectively, and through the windings of the respective relays A1TAC through A3TAC (FIG. 16) to a common circuit extending over front contact *e* of relay 1–2GRAD to terminal N of the battery. Relays A1TAC through A3TAC have similar stick circuits extending from terminal B of the battery over front contacts *a* of the respective relays, through the windings of the relays, and over front contact *e* of relay 1–2GRAD to terminal N of the battery.

*The Storage Interrogation and Cancellation Circuits*

Associated with each of the group retarder locations is a group of repeater relays for the tangent acceleration code which respond to this code by selecting the storage panel from the group 1RP through 6RP in which the tangent track rolling resistance for a particular cut is located, supplying the indication in that panel to the computer associated with the group retarder and cancelling the storage from the selected panel to make the panel available for further storage. Since this equipment is identical for each of the group retarders, only that associated with group retarder 1–2GR will be described in detail.

As shown in FIG. 17, three code repeater relays 1–2ART1, 1–2ART2 and 1–2ART3 are associated with group retarder 1–2GR and phantom storage location 1–2.

These relays have similar pickup circuits extending from terminal B of the battery over front contacts b of relays A1TAC, A2TAC and A3TAC, respectively, and through the windings of the relays to terminal N of the battery. Accordingly, relays 1–2ART1 through 1–2ART3 are direct front contact repeaters of relays A1TAC through A3TAC, respectively.

Relays 1–2ART1 through 1–2ART3 control a first group of circuits for connecting the output voltage of the proper selected one of panels 1RP through 6RP to a utilization device consisting of a computer 22. This computer is shown only in block diagram form in FIG. 17 as it forms no part of my invention. It is sufficient to point out for purposes of this description that computer 22 shown in FIG. 17 corresponds to V3 computer 22 shown in FIG. 13 of the aforementioned copending application, Serial No. 676,730, and shown in more detail in FIGS. 53, 54, 55, 64, 65 and 66 of said application. In the drawings of my present application the input lead to the computer is lead 268 from contact a of relay 1–2ART3 as shown in FIG. 17.

Referring now to FIGS. 10 and 19, the output leads from terminals k of panels 1RP through 6RP are supplied to respective leads 269, 270, 271, 272, 273 and 274, respectively, which are carried to FIG. 12 by means of a cable 275, where the cable branches into two cables 276 and 277 which carry parallel extensions of the same six leads. Cable 276 runs through cable 375 to group retarders 5–6GR and 7–8GR in FIG. 5. Cable 277 extends to FIG. 14 where the cable branches again into two parts, 278 and 279, which carry the same six leads. Cable 278 runs through cable 376 to the 3–4 group retarder in FIG. 7. Cable 279 extends to FIG. 17, where the original leads are again brought out at 269, 270, 271, 272, 273 and 274. Lead 269 from terminal k of panel 1RP is connected to computer input lead 268 over the back point of contact b of relay 1–2ART1, the back point of contact a of relay 1–2ART2 and the front point of contact a of relay 1–2ART3, which, it will be recalled, corresponds to the code combination 001 which is assigned to panel 1RP. Similarly, lead 270 from panel 2RP is connected to lead 268 in the code combination 010 over the back point of contact c of relay 1–2ART1, the front point of contact b of relay 1–2ART2, and the back point of contact a of relay 1–2ART3. Lead 271 from panel 3RP is connected to lead 268 in the code combination 011 over back contact a of relay 1–2ART1, the front point of contact a of relay 1–2ART2 and the front point of contact a of relay 1–2ART3. Lead 272 from panel 4RP is connected to output lead 268 in the code combination 100 over front contact d of relay 1–2ART1, the back point of contact b of relay 1–2ART2 and the back point of contact a of relay 1–2ART3. Lead 273 from panel 5RP is connected to lead 268 in the code combination 101 over the front point of contact b of relay 1–2ART1, the back point of contact a of relay 1–2ART2 and the front point of contact a of relay 1–2ART3. Lead 274 from panel 6RP is connected to lead 268 in the code combination 110 over the front point of contact o of relay 1–2ART1, the front point of contact b of relay 1–2ART2 and the back point of contact a of relay 1–2ART3.

Relays 1–2ART1 through 1–2ART3 control a second group of circuits for connecting terminal B of the battery to readout terminals a of panels 1RP through 6RP. Referring now to FIGS. 9 and 18, terminals a of panels 1RP through 6RP are connected to leads 207, 217, 280, 281, 282, and 224, respectively, and thence over cable 283 to FIG. 12, where the cable is branched to carry the six leads over cables 284 and 285. Cable 284 is carried through cable 375 to group retarders 5–6GR and 7–8GR (FIG. 5). Cable 285 extends to FIG. 14 where the cable branches again to carry parallel extensions of the same six leads over cables 286 and 287. Cable 286 is carried through cable 376 to group retarder 3–4GR (FIG. 7). Cable 287 extends to FIG. 17 where the original leads 207, 217, 280, 281, 282 and 224 are produced. These leads are connected to terminal B of the battery over relays 1–2ART1 through 1–2ART3 in the same code combinations as the output leads previously described. Thus, lead 207 is connected to terminal B of the battery over the back point of contact f of relay 1–2ART1, the back point of contact c of relay 1–2ART2 and the front point of contact b of relay 1–2ART3. Lead 217 from panel 2RP is connected to terminal B of the battery over the back point of contact g of relay 1–2ART1, the front point of contact d of relay 1–2ART2 and the back point of contact b of relay 1–2ART3. Lead 280 from panel 3RP is connected to terminal B of the battery over back contact e of relay 1–2ART1, the front point of contact c of relay 1–2ART2 and the front point of contact b of relay 1–2ART3. Lead 281 from panel 4RP is connected to terminal B of the battery over front contact h of relay 1–2ART1, the back point of contact d of relay 1–2ART2, and the back point of contact b of relay 1–2ART3. Lead 282 from panel 5RP is connected to terminal B of the battery over the front point of contact f of relay 1–2ART1, the back point of contact c of relay 1–2ART2, and the front point of contact b of relay 1–2ART3. Lead 224 from panel 6RP is connected to terminal b of the battery over the front point of contact g of relay 1–2ART1, the front point of contact d of relay 1–2ART2, and the back point of contact b of relay 1–2ART3.

*The Operation of the Rolling Resistance Storage and Transfer Equipment*

For the purpose of describing the operation of the rolling resistance storage equipment, it will be assumed that all of the apparatus is in its normal condition as shown in the drawings and that a car routed to track 2T passes through the yard.

As the car descends the hump and occupies track section AT (FIG. 2), relay ATR is released and relay ATP is picked up over its previously traced circuit including back contact a of relay ATR and lead 293 (FIG. 2). At the same time, the speed of the car is measured by radar velocity meter 9 in response to reflected energy received by antenna 199. The velocity signal appearing at output terminal a of velocity meter 9 is applied to input terminal a of differentiator 10. An output signal proportional to the acceleration of the car now appears at terminal b of differentiator 10 and is applied to input terminal a of bias unit 11. As previously explained, the output signal appearing at terminal b of bias unit 11 is representative of the tangent track rolling resistance measurements to be stored and transferred by the apparatus of my invention. This signal is stored in unit 1ES in the manner previously described.

As previously described, with relay ATP up, relay RI is picked up and held up over back contact c of relay R1TP. Relay 1A is then picked up. At the time that relay 1A is picked up, a tangent acceleration code (TAC) is applied to leads 231, 232 and 233 by connecting terminal B of the battery over front contact d of relay 1A to lead 233, leaving leads 231 and 232 deenergized, thus generating the code 001 to designate that the information is stored in the first panel. This information is stored in bank 54 of the master retarder storage location in relays 1CTAC, 2CTAC and 3CTAC (FIG. 3). With lead 233 energized, relay 3CTAC is picked up and is then held up over front contact d of relay ATP, front contact a of relay 3CTAC, and through the winding of the relay to terminal N of the battery.

Terminal q of panel 1RP is energized with the rolling resistance signal to be stored as previously described. This signal is now supplied to storage unit 1ES over the front point of contact e of relay 1A.

When the cut enters section MR1T in FIG. 2, relay R1TR is released and relay R1TP is picked up. The stick circuit for relay RI is then interrupted at the open back point of contact c of relay R1TP and relay RI is released. Relay 1B is then picked up as previously described, and is held up over the back point of contact *d* of relay 1RO and its own front contact *a*.

With relay 1B up, relay 1H is picked up as previously described. The stick circuit for relay 1A is then interrupted at the open back points of contacts *c* of relay 1B and *d* of relay 1H. Relay 1A is accordingly released.

When track section AT is vacated, relay ATR is again picked up and relay ATP is released. Relay ATCP is picked up over back contact *b* of relay ATP. This portion of the apparatus is then in condition to accept a subsequent measurement.

When section MR1T is vacated, picking up relay R1TR and causing relay R1TP to release, the tangent acceleration code stored in relays 1CTAC through 3CTAC is transferred to the B group of relays 1BTAC through 3BTAC (FIG. 3). Since relay 3CTAC is picked up, relay 3BTAC is picked up over a circuit extending from terminal B of the battery over back contact *f* of relay R1TP (FIG. 2), lead 366, front contact *b* of relay 3CTAC, and through the winding of relay 3BTAC to terminal N of the battery. Similar circuits are prepared for relays 1BTAC and 2BTAC, but these circuits are interrupted at the open front points of contacts *b* of relays 1CTAC and 2CTAC.

Since under the assumed conditions there is no cut ahead of the cut under consideration, relay GEC (FIG. 3) is down, and the information stored in relays 1BTAC through 3BTAC can immediately be transferred to relays 1ATAC through 3ATAC. Relay 3ATAC is accordingly picked up over a circuit extending from terminal B of the battery over back contact *b* of relay GEC, front contact *b* of relay 3BTAC, and through the winding of the relay to terminal N of the battery. Similar circuits are prepared for relays 1ATAC and 2ATAC, but these circuits are interrupted at the open front points of contacts *b* of relays 1BTAC and 2BTAC.

As soon as the cut occupies section MR2T, releasing relay R2TR and causing relay R2TP to pick up as previously described, a stick circuit is established for relay 3ATAC which extends from terminal B of the battery over front contact *b* of relay R2TP (FIG. 3), front contact *a* of relay 3ATAC, and through the winding of the relay to terminal N of the battery. Therefore, relay 3ATAC is held up as long as section MR2T is occupied.

As soon as the cut occupies detector track section 1-8T (FIG. 4), the route information stored in the A bank of the 1-8 storage unit (FIG. 12) is transferred to the succeeding switch location selected by the position of switch 1-8W. In the case under consideration, with a cut routed to track 2T, this information will be transferred to the 1-4 storage location associated with switch 1-4W (FIGS. 6 and 13). As previously described, relay 1-4BD (FIG. 6) will accordingly be picked up. The TAC information stored in relays 1ATAC through 3ATAC (FIG. 3) is transferred to the 1-4 storage location at this time. Since the stored TAC is 001, relays B1TAC and B2TAC in FIG. 13 will remain deenergized and relay B3TAC will be picked up over a circuit extending from terminal B of the battery over front contact *b* of relay 3ATAC (FIG. 3), lead 245, cable 246 of FIG. 12, cable 368, lead 245 to terminal *j* of the B bank of the 1-4 storage location (FIG. 13), over the back point of make-before-break contact *a* of relay B3TAC, through the winding of the relay, lead 241, and over front contact *e* of relay 1-4BD (FIG. 6) to terminal N of the battery. Once picked up, relay B3TAC is held up over its previously traced stick circuit including its own front contact *a*, lead 241, and front contact *e* of relay 1-4BD.

Since, under the conditions assumed, the A bank of the 1-4 storage unit is unoccupied at this time, relays 1-4AT and 1-4AD can pick up as described in connection with the automatic switching equipment, and the information stored in relays B1TAC through B3TAC is transferred to relays A1TAC through A3TAC in the A bank of the 1-4 storage location. The circuit for relay A3TAC extends from terminal B of the battery in FIG. 6 over front contact *f* of relay 1-4AT, lead 253, front contact *b* of relay B3TAC (FIG. 13), the black point of make-before-break contact *a* of relay A3TAC, through the winding of the relay, over lead 291, and over front contact *f* of relay 1-4AD (FIG. 6) to terminal N of the battery. Similar circuits are prepared for relays A1TAC and A2TAC, but these circuits are interrupted at the open front points of contacts *b* of relays B1TAC and B2TAC, respectively.

Once picked up, relay A3TAC is held up over its stick circuit including its own front contact *a* and front contact *f* of relay 1-4AD.

When section 1-4T (FIG. 6) is occupied by the cut, T and D relays in the phantom storage location associated with the group retarder selected by the position of switch 1-4W are picked up as previously described in connection with the automatic switching apparatus. In the case under consideration, relays 1-2GRBT and 1-2GRBD (FIG. 15) are picked up. Circuits are accordingly prepared for relays B1TAC through B3TAC in FIG. 15. The circuits for relays B1TAC and B2TAC are interrupted at the open front points of contacts *b* of relays A1TAC and A2TAC in FIG. 13.

The circuit for relay B3TAC in the B bank of the 1-2 phantom storage location (FIG. 15) extends from terminal B of the battery in FIG. 13, over lead 257, front contact *b* of relay A3TAC, terminal *k* of the A bank of the 1-4 storage location, lead 265, lead 267 (FIG. 14), terminal *h* of the B bank of the 1-2 phantom storage location (FIG. 15), front contact *h* of relay 1-2GRBT, through the winding of relay B3TAC, and over front contact *e* of slow release relay 1-2GRBD to terminal N of the battery. Relay B3TAC accordingly picks up and is held up over its stick circuit including its own front contact *a* and contact *e* of relay 1-2GRBD.

At the time that detector section 1-4T was occupied, and relays 1-2GRBT and 1-2GRBD were picked up, relays 1-2BT and 1-2BD in the B bank of the storage location associated with switch 1-2W (FIG. 8) were also picked up, thus interrupting the stick circuit for relay 1-4AD and allowing this relay to release at the end of its predetermined time delay period, which is long enough to permit the above described transfer of information to take place. When relay 1-4AD is released, the A bank of the 1-4 storage location is cleared of information and is in condition for a subsequent transfer.

Since there is no cut ahead of the cut under consideration, the transfer of information from the B to the A bank of the 1-2 phantom storage location takes place at once. As previously described, relays 1-2GRAT and 1-2GRAD (FIGURE 16) are picked up, and relay A3TAC is then picked up over a circuit extending from terminal B of the battery over front contact *e* of relay 1-2GRAT, lead 370, lead 371, front contact *b* of relay B3TAC, lead 374, through the winding of relay A3TAC, and over front contact *e* of relay 1-2GRAD to terminal N of the battery. Similar circuits are prepared for relays A1TAC and A2TAC, but these are interrupted at the open front points of contacts *b* of relays B1TAC and B2TAC.

With relay A3TAC picked up, a circuit is completed for energizing relay 1-2ART3 which extends from terminal B of the battery over front contact *b* of relay A3TAC to terminal *k* of the A bank of the 1-2 phantom storage location, and through the winding of relay 1-2ART3 to terminal N of the battery. Relays 1-2ART1 and 1-2ART2 have similar pickup circuits which, however, are interrupted at the open front points of contacts *b* of relays A1TAC and A2TAC, respectively.

With relays 1-2ART1 and 1-2ART2 released and relay 1-2ART3 picked up, a circuit is completed for momentarily picking up relay 1RO (FIG. 9) which extends from terminal B of the battery over the front point of contact *b* of relay 1–2ART3 (FIG. 17), the back point of contact *c* of relay 1–2ART2, the back point of contact *f* of relay 1–2ART1, lead 207, cable 287, cable 285 (FIG. 14), cable 283 (FIG. 12), lead 207 (FIG. 18), terminal *a* of panel 1RP (FIG. 9) and through the winding of relay 1RO to terminal N of the battery.

With relay 1RO picked up, a circuit is completed for supplying the value of rolling resistance stored in unit 1ES which extends from terminal *c* of storage unit 1ES over lead 212, front contact *f* of relay 1RO, lead 336, terminal *k* of panel 1RP, lead 269, cable 275, cable 277 (FIG. 12), cable 279 (FIG. 14), lead 269 (FIG. 17), the back point of contact *b* of relay 1–2ART1, the back point of contact *a* of relay 1–2ART2, the front point of contact *a* of relay 1–2ART3, lead 268, computer 22 to grounded lead 302 and thence to grounded terminal *d* of storage unit 1ES in FIG. 10. The signal thus supplied actuates the computer in a manner which is described in detail in the aforesaid copending application, Serial No. 676,730.

When the cut occupies section CL4T (FIG. 7), relay CL4TP (FIG. 16) is picked up and the circuit for picking up relay 1–2GRADP is completed over front contact *b* of relay CL4TP. The stick circuit for relay 1–2GRAD is interrupted at back contact *a* of relay 1–2GRAD but the multiple stick circuit for relay 1–2GRAD is completed over front contact *a* of relay CL4TP and relay 1–2GRAD remains picked up. Both relays 1–2GRAD and 1–2GRADP remain energized, therefore, during the period CL4T is occupied by the cut. When the cut vacates track section CL4T the stick circuit for relay 1–2GRAD is opened at front contact *a* of relay CL4TP and relay 1–2GRAD is released. Relay 1–2GRAD releasing opens the stick circuit for relay 1–2GRADP at front contact *c* of relay 1–2GRAD, and the pickup circuit for relay 1–2GRADP being open at front contact *b* of relay CL4TP, relay 1–2GRADP is also released. The release of relay 1–2GRAD interrupts the circuits for relay A3TAC in FIG. 16 at the open front point of contact *e* of relay 1–2GRAD. With relay A3TAC released, the circuit for relay 1–2ART3 is interrupted at the open front point of contact *b* of relay A3TAC and relay 1–2ART3 is accordingly released, restoring this portion of the apparatus to its initial condition.

When relay 1RO picked up (FIG. 9), the previously traced stick circuit for relay 1B is interrupted at the open back point of contact *d* of relay 1RO. Relay 1B is accordingly released. With relay 1B released, when relay 1RO releases, one of the previously traced circuits for relay 1H is interrupted at the open front point of contact *d* of relay 1B, and the second circuit is interrupted at the open front point of contact *d* of relay 1RO. Relay 1H is accordingly released and the apparatus is restored to its initial condition.

While I have thus described the operation of the apparatus of my invention for but a single cut of cars proceeding from the hump over a series of track switches to one classification track in the yard, it will be apparent from the description that the apparatus will similarly operate to store and transfer the tangent track rolling resistance measurement for a series of cuts moving from the hump toward their destined classification tracks.

Although I have herein shown and described only one form of apparatus embodying my invention, it will be understood that various changes and modifications may be made therein within the scope of the appended claims without departing from the spirit and scope of my invention.

Having thus described my invention, what I claim is:

1. In combination, a series of signal storage devices, circuit means for successively selecting the first device of said series void of a signal storage and storing in each selected device one of a succession of signals, means for establishing a code identifying each said selected storage device, means for transferring each said code over a circuit network to a selected point, relay means at each said selected point for interpreting each said code and interrogating the signal storage device identified with each said code, circuit network means for transferring to each said selected point the signal stored in each interrogated signal storage device, and circuit means controlled by each said transferred signal.

2. In a signal storage system, in combination, a control relay; a first signal storage device comprising a first relay, a second relay, a third relay, a fourth relay and a signal storage unit; means controlled by said control relay and said second and fourth relays for energizing said first relay, means controlled by said first relay for supplying a first of a series of consecutive signals to said storage unit, means controlled by said first relay and said control relay for energizing said second relay, means controlled by said second relay for energizing said third relay, means controlled by said third relay for storing said first of said signals in said storage unit; a series of identical signal storage devices following said first signal storage device, each comprising apparatus identical to said first device and each operating, when void of a signal storage and each preceding device contains a signal storage, in a manner identical to said first device to store one of said series of consecutive signals; and means controlled by each fourth relay for reading out of its associated signal storage device, at any time, the signal stored therein.

3. In a signal storage system, in combination, a control relay; a series of signal storage devices each comprising a first relay, a second relay, a third relay, a fourth relay, and a storage unit; means controlled by said control relay and said second and fourth relays of the first of said series of signal storage devices, for energizing said first relay of said first device; means controlled by said first relay of said first device for supplying a first of a series of consecutive signals to said storage unit of said device, means controlled by said first relay of said first device and said control relay for energizing said second relay of said first device, means controlled by said second relay for energizing said third relay of said first device, means controlled by said third relay of said first device for storing said first of said series of consecutive signals in said storage unit of said first device; means controlled by said control relay, said second relay of all preceding signal storage devices, and the second and fourth relays of each succeeding signal storage device, for energizing the first relay of the associated succeeding device when all preceding storage units contain a signal storage; means controlled by said first relay of each succeeding signal storage device for supplying one of said series of consecutive signals to the storage unit of the associated succeeding device when all preceding storage units contain a signal storage, means controlled by said first relay of each succeeding signal storage device and said control relay for energizing said second relay of the associated succeeding device, means controlled by said second relay of each succeeding signal storage device for energizing the third relay of the associated succeeding device, means controlled by said third relay of each succeeding signal storage device for storing said one of said series of consecutive signals in said storage unit of the associated succeeding device; and means controlled by said fourth relays of each signal storage device for reading out of each associated device, at any time, the signal stored therein.

4. In a signal storage system, in combination, a control relay; a first signal storage device comprising a first relay, a second relay, a third relay, a fourth relay and a signal storage unit; circuit means comprising a front contact of said control relay, a back contact of said fourth relay and a back contact of said second relay for energizing said first relay; a stick circuit for said first relay comprising one of its own front contacts, and a back contact of said second relay and a back contact of said third relay in a multiple circuit; circuit means comprising a back contact of said control relay and a front contact of said first relay for energizing said second relay; a stick circuit for said second relay comprising one of its own front contacts and a back contact of said fourth relay, circuit means comprising a front contact of said second relay and a front contact of said fourth relay in a multiple circuit for energizing said third relay, circuit means comprising a front contact of said first relay and a back contact of said third relay for supplying one of a succession of signals to said signal storage unit; a series of identical signal storage devices following said first signal storage device, each comprising apparatus and circuit means identical to said first device; circuit means comprising back contacts of the first and fourth relays of each of said series of said identical signal storage devices and front contacts of the first and fourth relays of the next preceding storage device, for supplying a different one of said succession of signals to the signal storage unit of each of said series of storage devices when said each device is void of a signal storage and all preceding said devices contain a signal storage; and circuit means comprising front contacts of the third and fourth relays of each said signal storage device for reading out of the associated device the signal stored in said associated device.

5. In combination, a series of devices each for storing at different times different signals, circuit means for successively selecting the first device of said series void of a signal storage and storing in each selected device one of a succession of signals, means for establishing a code identifying each said selected device, a plurality of circuit networks connecting said code establishing means to preselected points, means for successively transferring each established code over said circuit networks to said preselected points, relay means at each preselected point for interpreting each code transferred to that point and interrogating the storage device identified with that code, a plurality of circuit networks connecting each storage device to said preselected points, means for transferring from each interrogated storage device over the last-mentioned circuit networks to the respective interrogating point the signal stored in that interrogated storage device, and circuit means controlled by each transferred signal.

6. In an information storage and transfer system, in combination, a series of information storage devices, means for selecting a vacant one of said storage devices and storing in the selected device information corresponding to a function to be performed, circuit means for deriving a code identifying the selected device, circuit network means for transferring the code to a preselected point at which said function is to be performed, relay means at said preselected point for interpreting the transferred code, readout circuit means including contacts of the relay means at said preselected point for reading out the bit of information for the function to be performed at the preselected point, function controlling apparatus controlled by the readout circuit means, and circuits for performing said functions controlled by said function controlling apparatus.

7. In combination, a series of information storage devices, circuit means for selecting one of said storage devices void of information, circuit means for storing information in said selected device, circuit means for establishing a binary code for identifying the selected device, means for transferring the code over a circuit network to a selected point of a plurality of points in said network, relay means at the selected point for interpreting the code, circuit network means including contacts of the relay means for reselecting the selected storage device and interrogating the device for said information, first apparatus at the selected point controlled by the last-mentioned circuit network means for receiving said information, and means controlled by said apparatus for utilizing said information.

8. In an information handling system, the combination comprising, a series of signal storage devices, means for selecting the first vacant device of said series when one of a succession of signal is available for storage and storing in the selected device the available signal, means responsive to said selecting means for deriving a code identifying the selected device, and means responsive to interpretation of said code for reselecting the selected device and reading out the signal stored therein.

9. In an information handling system, the combination comprising, an intermittently available signal storage device, means for storing in the device when available one of a series of signals; means for establishing, when the signal is stored, a binary code identifying the device; and means employing said code for reading out from the device the signal stored therein.

10. In an information storage system, the combination comprising, a series of storage panels, each capable of storing quantities of information in analog form, means for selecting each first vacant one of the series of panels and supplying thereto when available one of said quantities of information; means for deriving, when each said quantity of information is stored, a code identifying the selected panel; means for successively interpreting and transferring each said code to a selected point in a circuit network, and means for interrogating the panel identified by each code when the information stored in that panel is to be transferred to one of said selected points.

11. In a signal storage system, the combination comprising, a succession of signal storage devices, a succession of signals in analog form, means for supplying each successive signal to the next vacant one of the storage devices for storage therein, a distinct binary code for identifying each storage device, means for transferring the codes to preselected points in a circuit network where at least one of the stored signals is to be utilized, and mean a each said preselected point for interpreting each transferred code and reading out from the storage device identified by the code the signal to be utilized at that point.

12. In combination, a series of information storage devices, means for selecting one of said devices void of information when information in analog form is to be stored, means for storing in the selected device said information when said device is selected, means responsive to said selection means when said device is selected for establishing a binary code identifying the device, means for transferring said code over a circuit network to a selected point in the network when the information stored in the sleceted device is to be utilized at that point, means at said point for interpreting the transferred code when the transfer of the code is completed, means responsive to said interpreting means when the code is interpreted for reselecting the selected storage device and interrogating the device for said information; means responsive to said interrogation means, when the interrogation is made, for transferring the interrogated information to said selected point; and means responsive to the last-mentioned transferring means for receiving information when the selected device is interrogated for that information and the information is transferred.

13. An information storage panel comprising in combination, a storage unit for storing information in analog form, a first control relay, a second control relay, a storage unit control relay, a cancellation relay, a circuit including a back contact of the second control relay for energizing the first control relay when information in analog form is to be stored, a circuit including a front contact of the first control relay for energizing the second control relay when said information is supplied to the panel for storage, a stick circuit for the first control relay including in parallel a back contact of the second control relay and a back contact of the storage unit control relay, a stick circuit for the second control relay including a back contact of the cancellation relay, an energizing circuit for the storage unit control relay including a front contact of the second control relay, means for storing said information in analog form in said storage unit when the storage unit control relay is energized, and means for energizing the cancellation relay when the information storage is to be cancelled.

14. A storage panel comprising in combination, a signal input terminal for receiving a signal to be stored; first, second and third control terminals, first, second and third control relays; a cancellation relay, a signal storage unit, means for picking up the first control relay when energy is supplied to the first control terminal, means for picking up the second control relay when energy is supplied to the second control terminal and the first control relay is picked up, means for maintaining the first control relay picked up when the second control relay is released, means for maintaining the first control relay picked up when the third control relay is released, means for maintaining the second control relay picked up when the cancellation relay is released, means for picking up the third control relay when the second control relay is picked up; means for storing in said storage unit, when the first and third control relays are picked up, a signal supplied to the signal input terminal, and means for picking up the cancellation relay when energy is supplied to the third control terminal.

15. A storage panel having a distinct binary code assignment and comprising in combination, a storage unit for storing a signal in analog form, a first input terminal, means for storing in the storage unit an analog signal when the signal is supplied to said input terminal, an output terminal on said storage unit, means for continuously supplying to said output terminal the signal stored in the storage unit, a plurality of code output terminals, means for energizing a specific combination of the code output terminals in accordance with the distinct binary code assignment for the panel when the storage unit contains an analog signal storage, an electrically actuated cancellation device, a cancellation input terminal, and means for actuating the cancellation device and thereby restoring the panel to its normal non-storage condition when electrical energy is supplied to the cancellation input terminal thereafter removed therefrom.

16. A storage panel having a specific and distinct binary code assignment and comprising in combination, a storage unit for storing a bit of information in analog form, an electrically actuated control device, a control terminal, means for actuating the control device when electrical energy is supplied to the control terminal, a first signal input terminal, means for supplying information in analog form to the storage unit when said information is supplied to said signal input terminal and the control device is actuated, an output terminal for said storage unit, means for continuously supplying to said output terminal any information stored in the storage unit, a plurality of code output terminals, means for energizing a specific combination of the code output terminals in accordance with said specific and distinct binary code assignment when the control device is actuated, an electrically actuated cancellation device, a cancellation input terminal, and means for actuating the cancellation device and thereby restoring the panel to its normal non-storage condition when electrical energy is supplied to the cancellation input terminal and thereafter removed therefrom.

17. A storage panel comprising, a first control relay, a second control relay, a cancellation relay, a signal storage unit, a third control relay, an input terminal on said panel for each of the first three mentioned relays and said unit, a source of current, a pickup circuit for the first control relay extending from its input terminal to the winding of the relay and including a back contact of the second control relay, a holding circuit for the first control relay extending from a terminal of said source of current to the winding of the relay and including one of its own front contacts and back contacts in multiple of the second and third control relays, a pickup circuit for the second control relay extending from its input terminal to the winding of the relay and including a front contact of the first control relay, a holding circuit for the second control relay extending from said terminal of said source of current to the winding of the relay and including one of its own front contacts and a back contact of the cancellation relay, a pickup circuit for the third control relay extending from said terminal of said source of current to the winding of the relay and including a front contact of the second control relay, an energizing circuit for the storage unit extending from its input terminal on the panel to an input terminal on the unit and including a front contact of the first control relay, an output terminal on said panel for the storage unit, an output circuit for the storage unit extending from an output terminal on the unit to said output terminal on the panel and including a front contact of the cancellation relay, a pickup circuit for the cancellation relay extending from its input terminal to the winding of the relay, and a holding circuit for the cancellation relay extending from the input terminal for the first control relay to the winding of the cancellation relay and including one of its own front contacts.

18. A storage panel comprising in combination, a first control relay, a first input terminal for said relay, a second control relay, a second input terminal for said second relay, a third control relay, a cancellation relay, a third input terminal for said cancellation relay, a signal storage device, an input and an output terminal for said storage device, a control circuit for the first control relay including the first input terminal and a back contact of the second control relay, a stick circuit for the first control relay including one of its own front contacts and back contacts in multiple of the second and third control relays, a control circuit for the second control relay including the second input terminal and a front contact of the first control relay, a stick circuit for the second control relay including one of its own front contacts and a back contact of the cancellation relay, a control circuit for the third control relay including a front contact of the second control relay, a storage circuit for said storage device including the input terminal for the device and a front contact of the first control relay, an output circuit for the storage device including a front contact of the cancellation relay and the output terminal for the device, a plurality of code output terminals, circuits for supplying energy to a combination of the code output terminals in accordance with a specific and distinct binary code assigned to the panel and including at least one front contact of the first control relay, a control circuit for the cancellation relay including said third input terminal, and a stick circuit for the cancellation relay including one of its own front contacts and said first input terminal.

References Cited in the file of this patent

UNITED STATES PATENTS

| 2,587,532 | Schmidt | Feb. 26, 1952 |
| 2,700,728 | Brixner | Jan. 25, 1955 |
| 2,847,657 | Hartley | Aug. 12, 1958 |
| 2,863,991 | Mishelevich | Dec. 9, 1958 |
| 2,898,452 | Berti | Aug. 4, 1959 |
| 2,900,497 | Vande Sande | Aug. 18, 1959 |

FOREIGN PATENTS

| 746,735 | Great Britain | Mar. 1, 1956 |

UNITED STATES PATENT OFFICE
CERTIFICATE OF CORRECTION

Patent No. 3,162,405 December 22, 1964

William A. Robison, Jr.

It is hereby certified that error appears in the above numbered patent requiring correction and that the said Letters Patent should read as corrected below.

Column 44, line 4, for "signal" read -- signals --; line 37, for "mean a" read -- means at --; same column 44, line 50, for "sleceted" read -- selected --.

Signed and sealed this 20th day of April 1965.

(SEAL)
Attest:

ERNEST W. SWIDER
Attesting Officer

EDWARD J. BRENNER
Commissioner of Patents